United States Patent [19]

Katagiri et al.

[11] Patent Number: 5,327,263
[45] Date of Patent: * Jul. 5, 1994

[54] IMAGE PROCESSING APPARATUS EMPLOYING A SPATIAL LIGHT MODULATOR

[75] Inventors: Masayuki Katagiri; Noritoshi Kako; Yoji Noguchi, all of Nara, Japan

[73] Assignee: Sharp Kabushiki Kaisha, Osaka, Japan

[*] Notice: The portion of the term of this patent subsequent to Aug. 10, 2000 has been disclaimed.

[21] Appl. No.: 63,780

[22] Filed: May 20, 1993

Related U.S. Application Data

[63] Continuation of Ser. No. 624,729, Dec. 11, 1990, Pat. No. 5,235,437.

[30] Foreign Application Priority Data

| Dec. 18, 1989 | [JP] | Japan | 1-327636 |
| Dec. 25, 1989 | [JP] | Japan | 1-335304 |
| Jan. 5, 1990 | [JP] | Japan | 2-300 |
| Jan. 5, 1990 | [JP] | Japan | 2-301 |
| Feb. 22, 1990 | [JP] | Japan | 2-42093 |
| Feb. 22, 1990 | [JP] | Japan | 2-42094 |
| Feb. 22, 1990 | [JP] | Japan | 2-42095 |
| Mar. 14, 1990 | [JP] | Japan | 2-63793 |
| Apr. 6, 1990 | [JP] | Japan | 2-91728 |
| Jun. 8, 1990 | [JP] | Japan | 2-150526 |

[51] Int. Cl.⁵ .............. H04N 1/028; H04N 3/15; G02F 1/135; C09K 19/04

[52] U.S. Cl. .............. 358/471; 359/72; 359/250; 359/252; 359/104; 355/32; 348/761

[58] Field of Search .............. 358/471, 213.13; 359/72, 250, 252, 103–106

[56] References Cited

U.S. PATENT DOCUMENTS

| 3,761,172 | 9/1973 | Letzer . | |
| 4,150,396 | 4/1979 | Hareng et al. . | |
| 4,515,879 | 5/1985 | Kuehnle et al. . | |
| 4,533,215 | 8/1985 | Trias et al. . | |
| 4,614,609 | 9/1986 | Inoue et al. | 359/104 |
| 4,676,925 | 6/1987 | Inoue et al. | 359/104 |
| 4,831,452 | 5/1989 | Takanashi et al. . | |
| 4,844,597 | 7/1989 | Katagiri et al. | 359/104 |
| 4,876,027 | 10/1989 | Yoshinaga et al. | 359/104 |
| 4,931,208 | 6/1990 | Furukawa et al. | 359/104 |
| 4,945,423 | 7/1990 | Takanashi et al. . | |
| 5,120,466 | 6/1992 | Katagiri et al. | 359/104 |
| 5,167,857 | 12/1992 | Yoshinaga et al. | 359/104 |

FOREIGN PATENT DOCUMENTS

| 55-45003 | 3/1980 | Japan . |
| 59-081627 | 5/1984 | Japan . |
| 60-4922 | 1/1985 | Japan . |
| 61-278826 | 12/1986 | Japan . |
| 62-266518 | 11/1987 | Japan . |

Primary Examiner—Edward L. Coles, Sr.
Assistant Examiner—Scott A. Rogers
Attorney, Agent, or Firm—Nixon & Vanderhye

[57] ABSTRACT

An image processing apparatus comprises a liquid modulator having a photoconductive material including an image-writing plane, a liquid crystal layer laminated on the photoconductive material, a pair of electrodes sandwiching the photoconductive material and the liquid crystal layer, and a spacer inserted between the photoconductive material and one of the electrodes. Also provided are an analog writing system for analogously writing an original image in the light modulator; a digital reading system for digitally reading the image written in the light modulator; a processing section for image-processing the read image data; a digital writing system for digitally writing processed image data in the light modulator; and, an analog reading system for analogously reading an image written in the light modulator. The liquid crystal layer is either a phase-transition type liquid crystal, a p-type smectic A liquid crystal providing a storage function, or a ferroelectric liquid crystal providing a storage function. The phase-transition type liquid crystal is selected from a group consisting of (1) a p-type cholesteric liquid crystal and (2) a mixture of p-type cholesteric liquid crystal and p-type nematic liquid crystal. The ferroelectric liquid crystal is selected from a group consisting of (1) a chiral smectic C liquid crystal, (2) a mixture of chiral smectic C liquid crystal and non-chiral smectic C liquid crystal, and (3) a mixture of chiral smectic C liquid crystal and a photoactive material.

8 Claims, 25 Drawing Sheets

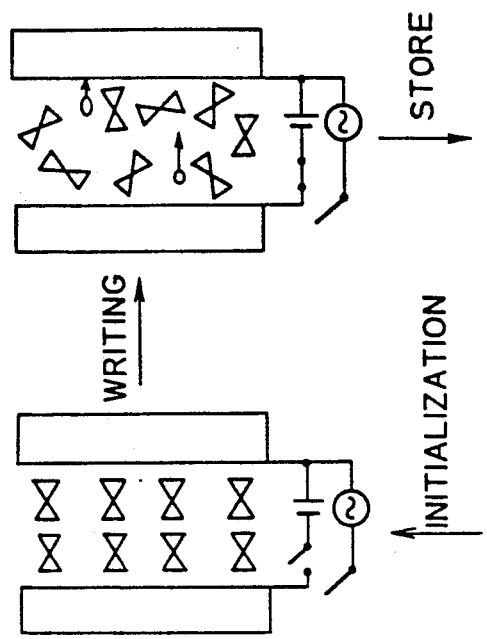
Fig. 25A  Fig. 25B
Fig. 25C  Fig. 25D
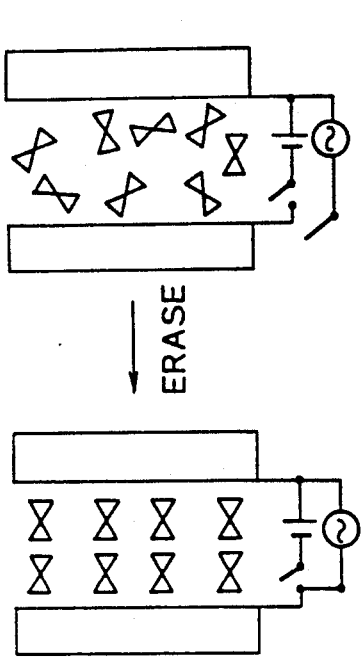
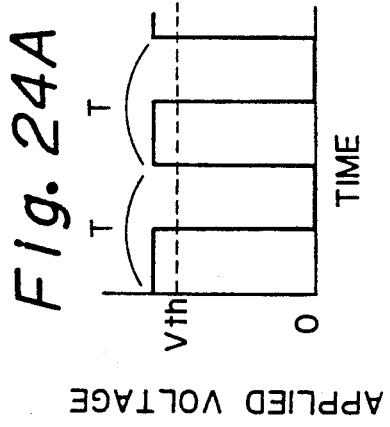
Fig. 24A
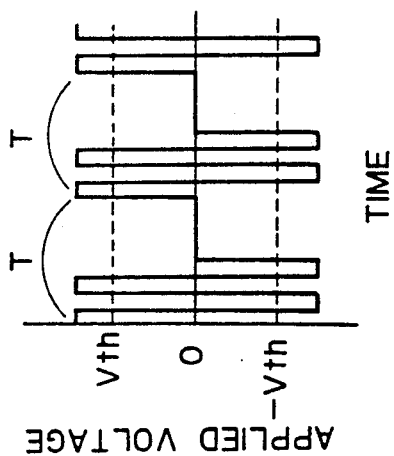
Fig. 24B

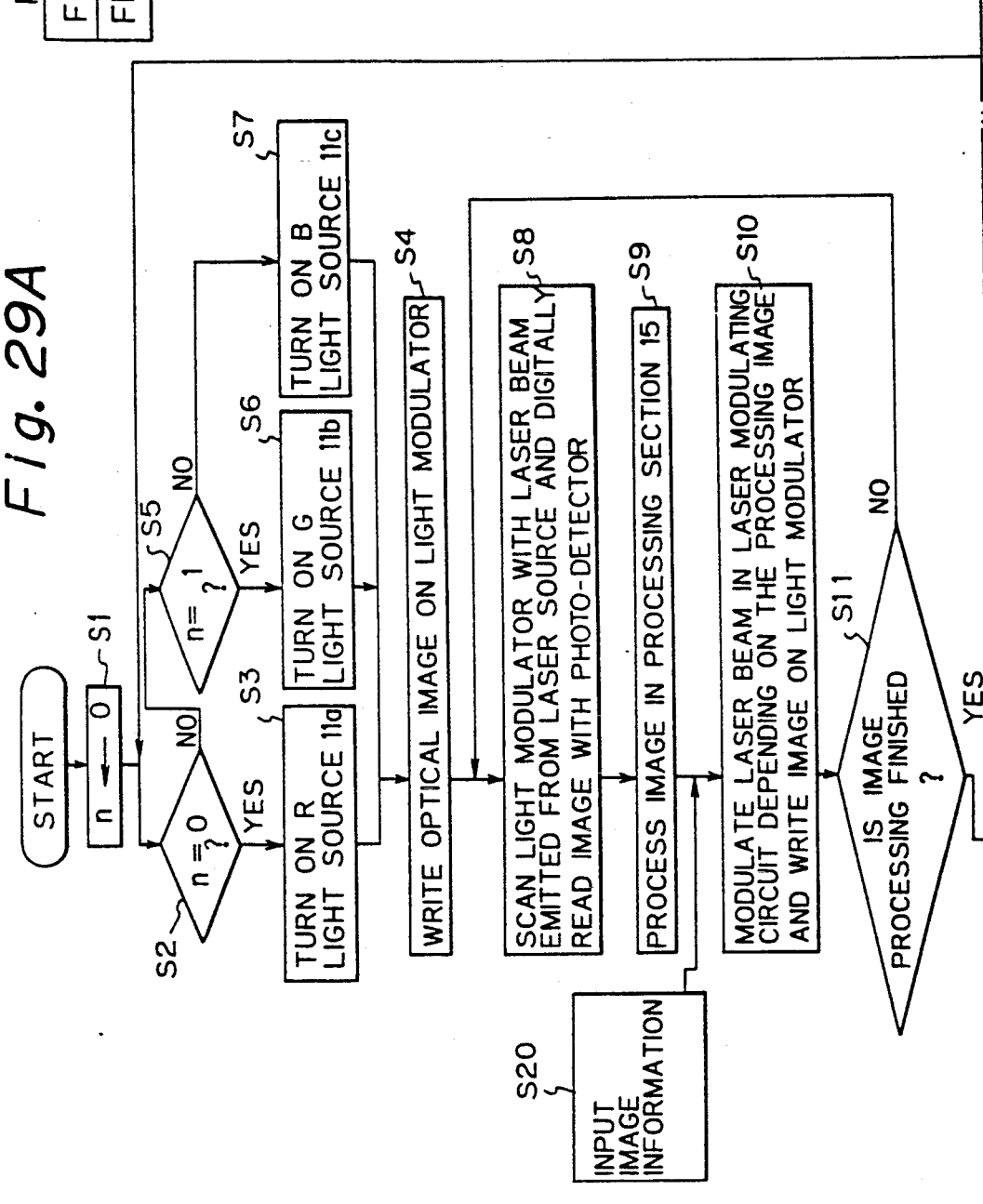

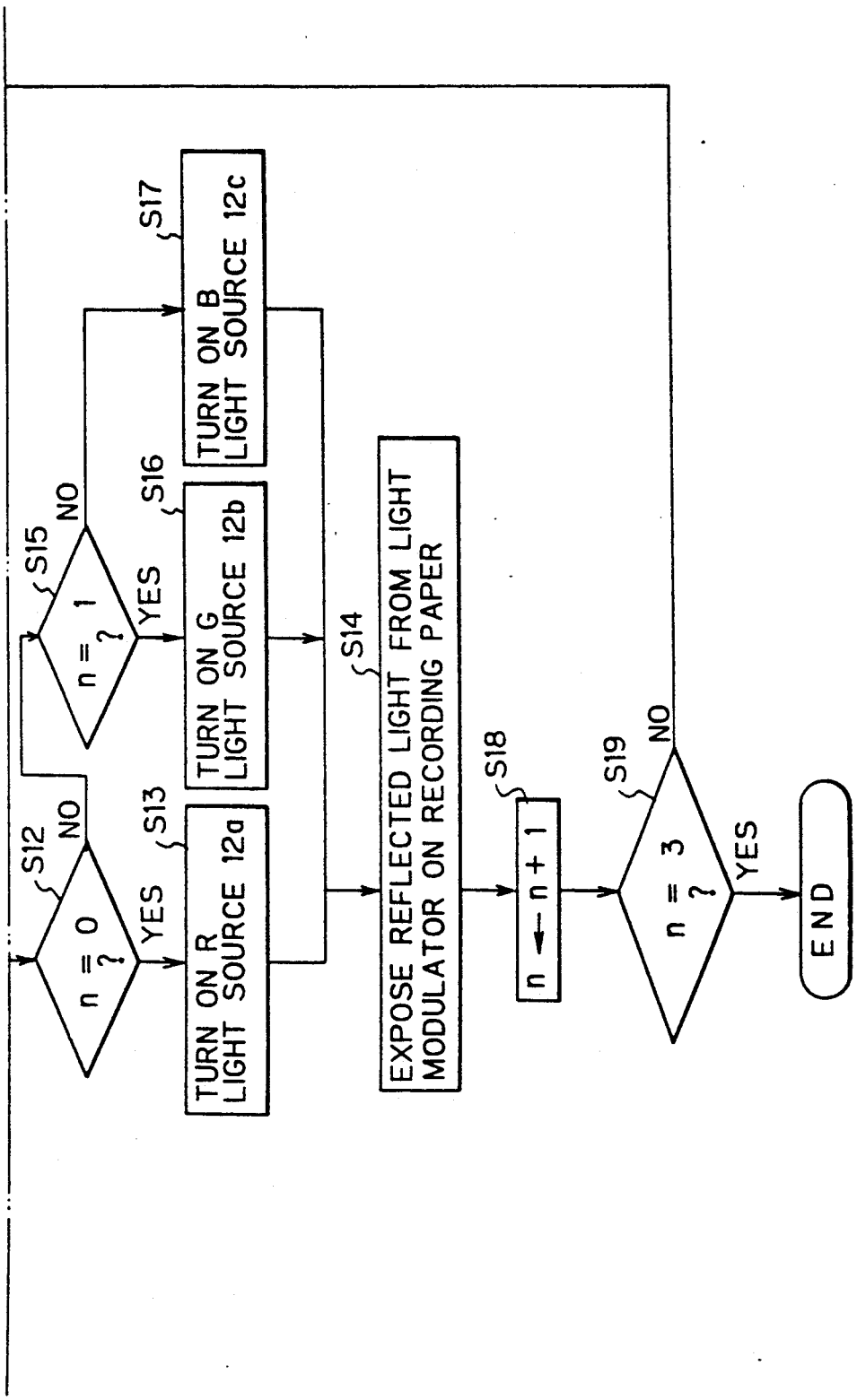

IMAGE PROCESSING APPARATUS EMPLOYING A SPATIAL LIGHT MODULATOR

This is a continuation of application Ser. No. 07/624,729, filed Dec. 11, 1990 now U.S. Pat. No. 5,235,437.

BACKGROUND OF THE INVENTION

1. Field of the Invention

The present invention relates to an image processing apparatus employing a spatial light modulator (termed as light modulator). More particularly, the invention relates to a color image processing apparatus which can input and store an image on a two-dimensional light modulator, process the image, and write the processed image on a paper.

2. Description of the Related Art

As a typical image processing apparatus, there has been known a color copying machine for creating, editing and copying a color image. This color copying machine can be divided into two types, that is, an analog type and a digital type, each of which has its own advantages and disadvantages.

The analog type color copying machine is inferior to the digital type machine in image processing such as color correction or tone processing, because the former machine directly uses an optical image for exposure and development in creating a color copy. On the other hand, the latter machine can more easily implement the image processing, because it takes the steps of converting an original image into a digital signal with an image scanner and creating a color copy based on the digital signal with a printer.

Herein, the term "image processing" means a wide range of processing including tone processing (gamma correction, shading correction), sharpness intensity, area specification (trimming, masking), color processing (color reproduction, painting function, color cutting), movement (rotation), and edition (insert-synthesizing, character synthesizing).

In comparing the color copies created by both machines with each other, the analog type color copying machine offers smooth image quality (the resolution is about 800 DPI), however it has difficulty in implementing a color masking function (separation of black from chromatic colors), so that it cannot offer excellent color reproduction. Concretely, a dark line often appears on the color copy. On the other hand, the digital type machine can easily implement color masking, so that it is superior in color reproduction, however, it has difficulty in fining the copy scale more. Though it may have more pixels for fining the copy scale more, the digital type machine has to handle more quantity of data so that it may require a high-speed processor and a large-capacity memory. This means that the digital type machine is far more costly than the analog type one.

It will be apparent from the above description that the analog type color copying machine is superior in copying a large number of papers, while the digital type machine is superior in color reproduction. It is thus suitable for fine graphic materials or printing a small number of copies.

The foregoing compared results between the analog type color copying machine and the digital type one are summarized in Table 1.

TABLE 1

|  | Analog Type | Digital Type |
| --- | --- | --- |
| Color Reproduction | Normal | Excellent |
| Black Reproduction | Normal | Excellent |
| Graininess | Excellent | Normal |
| Character Reproduction (Smoothness) | Excellent | Normal |

As mentioned above, as the analog and digital type copying machines have their respective advantages and disadvantages, these machines are used for the proper graphic materials (pictures, writing, printing, etc.), which are respectively determined on a copy kind, a purpose and way of use.

Traditionally, however, there has been provided no apparatus functioning as both the analog and the digital type copying machines. For using a right machine for a right graphic material, it has been necessary to prepare at least two machines.

Moreover, there has been traditionally provided no apparatus which is capable of realizing both of the superior processings in the analog type and the digital type machines. Hence, it has been necessary to employ an expensive digital type copying machine for creating a color copy on which the high-fining quality and excellent color reproduction are realized.

Traditionally, no apparatus has been provided which an analog image is mixed with a digital image on one display.

Further, a known color copying machine, though it is a digital type or analog type, has the restriction that the scanning density of a light beam depends on the image-writing or -reading speed or the image quality. That is, as the scanning density becomes more coarse, the image quality becomes inferior but the scanning and transmission time becomes shorter, because the information quantity is reduced. For obtaining an expanded image, it is possible to read an image at a fine scanning density and write it at a normal scanning density.

Traditionally, however, the known color copying machine has a shortcoming that the diameter of a laser beam spot restricts the scanning density. That is, the fine scanning density is disallowed to be more fine than the beam spot. It results in dwarfing improvement of image quality.

Conversely, the small beam spot is disallowed to exactly represent an image formed at coarse scanning density. In particular, the small beam spot brings about a large error in reading a pattern having a spacial frequency close to the scanning density.

A known image processing apparatus suffers from another shortcoming that each graphic material has the corresponding quantity of reflected light because of the paper quality and color when analogously writing the image reflected from the graphic material. The difference of the reflected light of the graphic material makes it quite difficult to constantly record an excellent image with high contrast in the light modulator. As a result, it is difficult to constantly output a high-quality image.

Another shortcoming the normal image processing apparatus may suffer from is ununiformity brightness with which an image is spatially written in the light modulator. The ununiformity brightness results from two-dimensional ununiformity of lightning to a subject graphic material, variations of an optical characteristic of an image-forming lens system and a characteristic of a light modulator, and the like.

Further, a known color-image processing apparatus has been traditionally required to repeat the process of analogously writing an image in the light modulator, digitally reading it out of the light modulator, processing it, digitally rewriting it in the light modulator, and analogously reading it out of the light modulator with respect to a red-, a green-, and a blue-component colors. The repetition of the process results in increasing dead processing and lowering the processing speed. Further, the known color image processing apparatus is uncapable of reading an image of a moving object.

Turning to another type image processing apparatus, herein, an image input device can be considered. The most common one is a linear image sensor. The linear image sensor includes a pixel row functioned as main scanning, an image sensor and an optical system to be mechanically moved as sub scanning with respect to a subject graphic material. Both main scanning and sub scanning results in obtaining image information.

The linear image sensor is divided into two types, that is, a reduction type image sensor and a contact type image sensor.

The reduction type image sensor is a sensor which includes a lens and a charge coupled device (CCD) and serves to reduce a subject graphic material through a lens and read the reduced image with the CCD. The contact type image sensor, on the other hand, is an equal-magnification sensor designed to have a longer length than the width of the subject graphic material. As the contact type, there have been provided a multi-chip type image sensor employing CCDs, a film type image sensor employing the combination of a film type image sensor and a lens array, a closely-contact type image sensor allowing the film type image sensor to directly contact the subject graphic material without using the lens array, and the like. The contact image sensor has some advantages such as small-size and simple construction of the optical system. Due to these advantages-, the demand for the contact type has been rising.

A color image input device basically employs a linear image sensor. As the linear color image sensor, there have been provided a color-filter type image sensor and a three-light-source type color image sensor, for example. The former image sensor provides three color filters located in sequence before the pixel row. The three colors are R (red), G(green) and B(blue) or yellow, cyan and magenta. The latter sensor is designed to repeat the main scanning done by the linear image sensor three times for each emission of three colors R, G and G. The-color-filter type image sensor can offer just one-third time as low resolution as the monochrome image sensor, while the three-light-source type color image sensor needs three times as long a reading time as the monochrome image sensor.

Recently, however, the color image input device has been requested to enhance the resolution and scanning speed.

To improve the resolution of the linear image sensor, it is necessary to make the photoelectric elements more dense. As the photoelectric element becomes more dense, the area per one pixel becomes smaller, the output signal becomes lower, and the sensitivity becomes inferior. The longer reading time of a signal from the photoelectric elements may compensate for the inferior sensitivity. However, the longer reading time is added to a delay caused by the photoelectric elements increased as a result of densifying them, resulting in remarkably lowering the image scanning speed. Further, the main-scanning linear image sensor having more integrated photoelectric elements requires higher precision and scanning speed for the sub-scanning mechanical driving system. Today, the precision and the scanning speed have substantially reached its limit. Besides, it is difficult to improve the performance of the mechanical driving system.

As mentioned above, the linear color image sensor needs higher resolution and an improved scanning time if it reaches the same capability as the monochrome image sensor.

SUMMARY OF THE INVENTION

It is therefore a first object of the present invention to provide an image processing apparatus which can offer high resolution and excellent color reproduction and be manufactured at low cost.

It is a second object of the present invention to provide a color image processing apparatus which can handle an image having an analog image and a digital image mixed and melt thereon.

It is a third object of the present invention to provide an image processing apparatus which can obtain the most excellent image quality at the specified scanning density even if the scanning density of a laser beam is changed in digital reading and writing systems and output an image with little error.

It is a fourth object of the present invention to provide an image processing apparatus which can compensate for ununiformity brightness of an image to be written in the light modulator so that a high-quality image is allowed to be output.

It is a fifth object of the present-invention to provide a color-image processing apparatus which can implement high-speed processing.

It is a sixth object of the present invention to provide a color-image processing apparatus which can implement high-speed processing and being easily assembled.

It is a seventh object of the present invention to provide a color image inputting device which can perform high-resolution and high-speed reading of a subject graphic material.

In carrying out the objects, according to a first aspect of the present invention, the image processing apparatus includes a light modulator having an image-writing plane, a digital reading system for digitally reading the image written in the light modulator by applying a laser beam for scanning on the light modulator in two dimensions, a processing section for image-processing the read image data, and a digital writing system for digitally writing the processed image data on the light modulator.

According to a second aspect of the invention, the image processing apparatus includes a light modulator having an image-writing plane, an analog writing system for analogously writing an original image in the light modulator, a digital reading system for digitally reading the image written in the light modulator by emitting a laser beam for scanning the light modulator in two dimensions, a processing section for image-processing the read image data, a digital writing system for digitally writing the processed image data in the light modulator by applying the laser beam for scanning on the light modulator in two dimensions, and an analog reading system for analogously reading the image written in the light modulator.

According to a third aspect of the invention, the image processing apparatus includes a light modulator having a photoconductive material composing an image-writing plane, a phase-transition type liquid crystal layer laminated on the photoconductive material and providing a storage function and a pair of electrodes sandwiching the photoconductive material and the liquid crystal layer, an analog writing system for analogously writing an original image to the light modulator, a digital reading system for digitally reading the image written in the light modulator with a laser bee scanned on the light modulator in two dimensions, a processing section for image-processing the read image data, a digital writing system for digitally writing the processed image data to the light modulator with the laser beam scanned on the light modulator in two dimensions, and an analog reading system for analogously reading the image written in the light modulator.

According to a fourth aspect of the invention, the image processing apparatus includes a light modulator having a photoconductive material composing an image-writing plane, a P-type smectic A liquid crystal layer laminated on the photoconductive material and providing a storage function and a pair of electrodes sandwiching the photoconductive material and the liquid crystal layer, an analog writing system for analogously writing an original image to the light modulator, a digital reading system for digitally reading the image written in the light modulator with a laser beam scanned on the light modulator in two dimensions, a processing section for image-processing the read image data, a digital writing system for digitally writing the processed image data to the light modulator with the laser beam scanned on the light modulator in two dimensions, and an analog reading system for analogously reading the image written in the light modulator.

According to a fifth aspect of the invention, the image processing apparatus includes a light modulator having a photoconductive material composing an image-writing plane, a ferroelectric liquid crystal layer laminated on the photoconductive material and providing a storage function and a pair of electrodes sandwiching the photoconductive material and the liquid crystal layer, an analog writing system for analogously writing an original image to the light modulator, a digital reading system for digitally reading the image written in the light modulator with a laser beam scanned on the light modulator in two dimensions, a processing section for image-processing the read image data, a digital writing system for digitally writing the processed image data to the light modulator with the laser beam scanned in two dimensions, and an analog reading system for analogously reading the image written in the light modulator.

According to a sixth aspect of the invention, the image processing apparatus includes a light modulator having a photoconductive material composing an image-writing plane, a liquid crystal layer laminated on the photoconductive material, and a pair of electrodes sandwiching the photoconductive material and the liquid crystal layer, an analog writing system for analogously writing an original image to the light modulator, a digital reading system for digitally reading the image written in the light modulator with the laser beam scanned on the light modulator in two dimensions, a processing section for image-processing the read image data, a digital writing system for digitally writing the processed image data to the light modulator with the laser beam scanned in two dimensions, an analog reading system for analogously reading the image written in the light modulator, means for variably controlling the scanning density of the laser beam to a desired value, and means for adjusting a beam spot diameter of the laser beam depending on the controlled scanning density.

According to the seventh aspect of the invention, the image apparatus includes a light modulator composing an image-writing plane, an analog writing system for analogously writing an original image to the light modulator, a digital reading system for digitally reading the image written in the light modulator with the laser beam scanned on the light modulator in two dimensions, a processing section for image-processing the read image data, a digital writing system for digitally writing the processed image data to the light modulator with the laser beam scanned on the light modulator in two dimensions, an analog reading system for analogously reading the image written in the light modulator, means for sensing brightness of the image written in the light modulator by the analog writing system, and means for adjusting an input sensitivity of the light modulator according to the output of the sensing means.

According to the eighth aspect of the invention, the image processing apparatus includes a light modulator composing an image-writing plane, an analog writing system for analogously writing an original image to the light modulator, a digital reading system for digitally reading the image written in the light modulator with the laser beam scanned on the light modulator in two dimensions, a processing section for image-processing the read image data, a digital writing system for digitally writing the processed image data to the light modulator with the laser beam scanned on the light modulator in two dimensions, an analog reading system for analogously reading the image written in the light modulator, means for sensing brightness of the image written in the light modulator by the analog writing system, and means for adjusting intensity of the light applied to a subject graphic material depending on the output of the sensing means.

According to the ninth aspect of the invention, the image processing apparatus includes a light modulator composing an image-writing plane, an analog writing system for analogously writing an original image to the light modulator, a digital reading system for digitally reading the image written in the light modulator with a laser beam scanned on the light modulator in two dimensions, a processing section for image-processing the read image data, a digital writing system for digitally writing the processed image data to the light modulator with the laser beam scanned on the light modulator in two dimensions, an analog reading system for analogously reading the image written in the light modulator, means for sensing brightness of the image written in the light modulator by the analog writing system, the light modulator having a photoconductive material composing an image-writing plane, a liquid crystal layer laminated on one side of the photoconductive material, and a pair of electrodes sandwiching the photoconductive material and the liquid crystal layer, at least one of those electrodes being divided into a plurality of regions to be independently driven.

According to the tenth aspect of the invention, the image processing apparatus includes a plurality of light modulators, each having a photoconductive material composing an image-writing plane, a liquid crystal plate laminated on one side of the photoconductive material, and a pair of electrodes sandwiching the photoconductive material and the liquid crystal plate, the liquid crystal having a storage function, an analog writing system for decomposing an original image into a plurality of color-component images and analogously writing each color-component image to the light modulators, a digital reading system for scanning each light modulator in two dimensions with a laser beam and digitally reading the image written in each light modulator, a processing section for processing the read image data, a digital writing system for digitally writing the processed image data to each light modulator, and an analog reading system for analogously reading the image written in each light modulator and forming an output image.

According to the eleventh aspect of the invention, the color image processing apparatus includes a single light modulator having a photoconductive material composing an image-writing plane, a liquid crystal plate laminated on one side of the photoconductive material, and a pair of electrodes sandwiching the photoconductive material and the liquid crystal plate, an analog writing system for decomposing an original image into a plurality of color-component images and analogously writing each color-component image on the corresponding regions of the light modulator, a digital reading system for scanning each region of the light modulator in two dimensions with a laser beam and digitally reading the image written in each region of a light modulator, a processing section for processing the read image data, a digital writing system for digitally writing the processed image data in the corresponding region of the light modulator, and an analog reading system for analogously reading the image written in each region of the light modulator and forming an output image.

According to the twelfth aspect of the invention, the color image inputting apparatus includes a plurality of light modulators each having an image-writing plane, an optical system for decomposing an original image into a plurality of color-component images, image-forming a plurality of images on the image-writing planes included in the light modulators, a plurality of laser beam sources, a plurality of laser beam scanning systems for scanning the light modulators with laser beams emitted from the laser beam sources, and a plurality of photo-detecting - systems for receiving light obtained from the light modulators with the laser beams scanned in two dimensions.

In operation, the first arrangement according to the first aspect of the present invention, at first, reads out the image written in the light modulator in a pixel-by-pixel manner with the laser beam scanned on the light modulator. The read image data are properly image-processed and then are digitally rewritten in the light modulator with the laser beam.

It results in the image processing apparatus having the first arrangement being capable of flexibly realizing various kinds of digital image-processings relative to an analog image.

The second arrangement according to the second aspect of the present invention analogously writes an optical image to the light modulator. The written image is digitally read out in a pixel-by-pixel manner with a laser beam scanned on the light modulator in two dimensions. Then, the read image data are properly image-processed and are digitally written in the light modulator with the laser beam. Finally, the image is analogously read out from the light modulator.

It results in the image processing apparatus having the second arrangement being capable of realizing high resolution and excellent color reproduction relative to an image and being manufactured at low cost.

The third arrangement according to the third aspect of the present invention employs the phase-transition type liquid crystal having a storage function in the light modulator. Hence, the reading laser beam is allowed to be applied to any side of the light modulator. It indicates that the writing processing and the reading processing can be carried out on the same side of the light modulator.

In the fourth arrangement according to the fourth aspect of the present invention, an original image is analogously written in the light modulator and a laser beam is emitted for scanning the light modulator, thereby digitally reading the image out of the light modulator in a pixel-by-pixel manner. The read image data are processed and digitally rewritten in the light modulator with the laser beam. Finally, the image is analogously read out of the light modulator.

The light modulator employs the P-type smectic A liquid crystal so that the reading light is allowed to be applied to any side of the light modulator. It indicates that the writing processing and the reading processing can be carried out on the same side of the light modulator.

In the fifth arrangement according to the fifth aspect of the present invention, an original image is analogously written in the light modulator and a laser beam is emitted for scanning the light modulator, thereby digitally reading the image out of the light modulator in a pixel-by-pixel manner. The read image data are processed and digitally rewritten in the light modulator with the laser beam. Finally, the image is analogously read out of the light modulator.

The light modulator employs the ferroelectric liquid crystal so that the reading light is allowed to be applied to any side of the light modulator. It indicates that the writing processing and the reading processing can be carried out on the same side of the light modulator.

In the sixth arrangement according to the sixth aspect of the present invention, an original image is analogously written in the light modulator and a laser beam is emitted for scanning the light modulator, thereby digitally reading the image out of the light modulator in a pixel-by-pixel manner. The read image data are processed and digitally rewritten in the light modulator with the laser beam. Finally, the image is analogously read out of the light modulator.

In digitally reading or writing the image, the scanning density of the laser beam is variably controlled to a desired value. Then, depending the controlled scanning density, the beam spot diameter of the laser beam is adjusted so as to exactly match to the scanning density.

In the seventh or eighth arrangement according to the seventh or eighth aspect of the present invention, the arrangement of the image processing image takes the steps of applying the light to the subject graphic material so that an image of the graphic material is formed and analogously written in the image-writing plane of the light modulator, sensing the average brightness of the written image, and adjusting the input sensitivity of the light modulator or the intensity of light applied to the graphic material depending the sensed brightness. These steps result in constantly finishing the recording of an image with constant contrast in the light modulator. The laser beam is applied to the light modulator and scanned in two dimensions so that the image is digitally read out in a pixel-by-pixel manner. The image data are processed and digitally written in the light modulator with the laser beam. Finally, the image is analogously read out of the light modulator.

In the ninth arrangement according to the ninth-aspect of the present invention, by applying light to the subject graphic material, an image of the material is analogously image-formed on the image-writing plane contained in the light modulator. Then, the divided areas of the electrode are independently driven so as to control the writing characteristic at each area, resulting in allowing an image with even brightness to be written in the light modulator.

The laser beam is applied to the light modulator and scanned on the light modulator in two dimensions for digitally reading the image. The read image data are processed and are digitally rewritten in the light modulator with the laser beam. Finally, the image is analogously read out of the light modulator.

In the tenth arrangement according-to the tenth aspect of the present invention, the arranged color-image processing apparatus takes the steps of decomposing an original image into a plurality of color-component images, writing each image on the image-writing planes contained in a plurality of light modulators, scanning each light modulator in two dimensions with a laser beam for digitally reading the image out of each light modulator, processing each read image, digitally rewriting the processed image on each light modulator with the laser beam scanned in two dimensions, analogously reading the image out of each light modulator, and creating an output image from the read images.

For printing one image on several papers, it is necessary to repeat the process of analogously reading the final image stored in each light modulator and creating an output image from the read images the required number of times.

In the eleventh arrangement according-to the eleventh aspect of the present invention, an original image is decomposed into a plurality of color-component images and the resulting images are respectively written and stored in the corresponding regions located on the image-writing plane contained in the single light modulator. Then, the digital reading system emits a laser beam for scanning the light modulator in two dimensions so that the image is digitally read out of each region. The read image data are processed and are digitally rewritten in each region with a laser beam scanned in two dimensions. Finally, the image is analogously read out of each region of the light modulator and the read images are synthesized for creating an output image.

In the twelfth arrangement according to the twelfth aspect of the present invention, the original image is decomposed into a plurality of color-component images and is respectively image-formed on the image-writing planes included in the light modulating elements. The laser beams emitted from the laser beam sources are respectively scanned on the light modulators, The photo-detecting systems respectively receive the lights traveled through the light modulators, resulting in obtaining color image information.

Further objects and advantages of the present invention will be apparent from the following description of the preferred embodiments of the invention as illustrated in the accompanying drawings.

BRIEF DESCRIPTION OF THE DRAWINGS

FIGS. 24A and 24B are a view showing a waveform of a voltage applied to the liquid crystal layer;

FIGS. 25A to 25D are a view showing how the liquid crystal is operated in another kind of liquid crystal layer;

FIGS. 29A and 29B constitute a flowchart illustrating part of a control program used in the first embodiment;

DESCRIPTION OF THE PREFERRED EMBODIMENTS

Hereinafter, the embodiments of the invention will be detailed with reference to the drawings.

Figure 1:
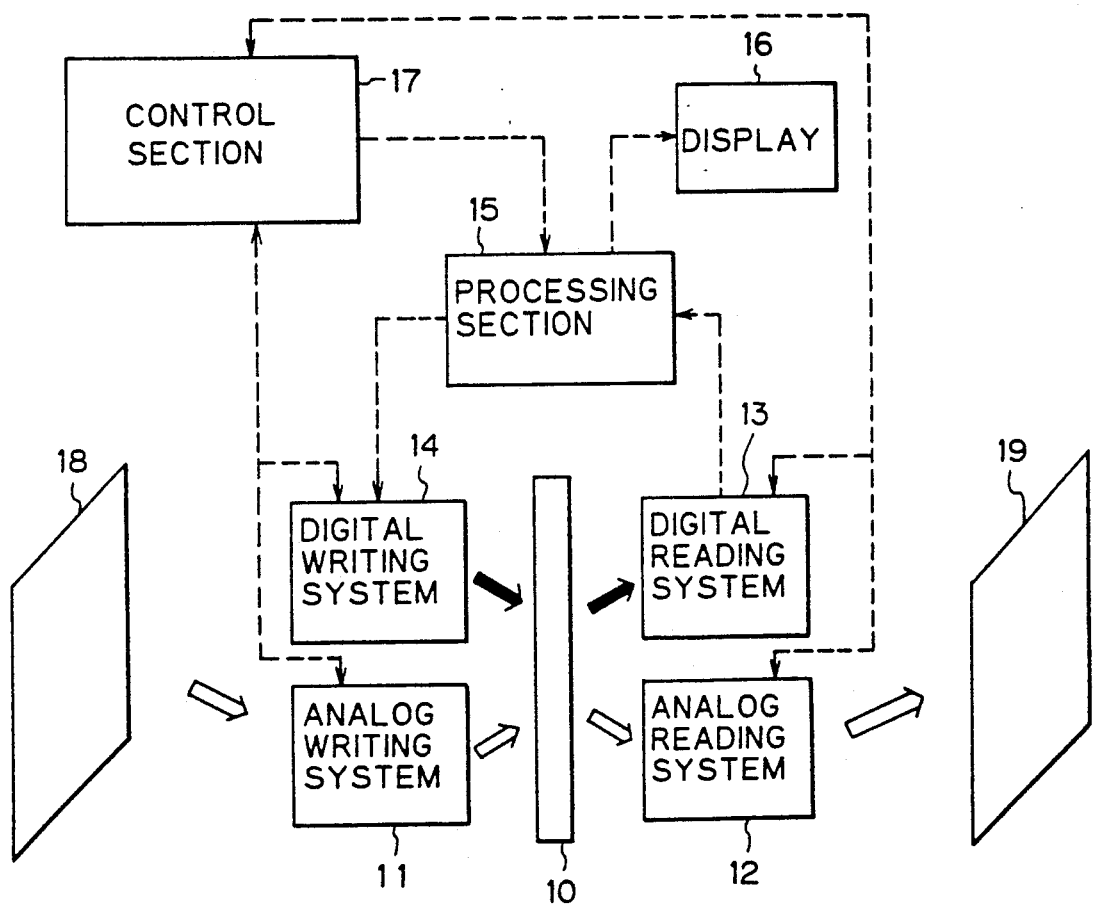
FIG. 1 is a block diagram schematically showing basic arrangement of a color-image editing, inputting and outputting apparatus according to a first embodiment of the invention.

FIG. 1 is a block diagram schematically showing basic arrangement of a color-image editing, inputting and outputting apparatus according to a first embodiment of the invention.

As shown in FIG. 1, 10 denotes a light modulator having an image-writing plane, 11 denotes an analog writing system, 12 denotes an analog reading system, 13 denotes a digital reading system, and 14 denotes a digital writing system.

The digital reading system 13 and the digital writing system 14 are both electrically connected to a processing section 15 for performing several kinds of image-processing. The processing section 15 is connected to a display 16 and a control section 17. Reference numeral 18 indicates a subject graphic material (pictures, writing, printing, etc.) which is to be copied. Later, the subject graphic material is termed as an original.

The control unit 17 mainly consists of a computer to which connected are the analog writing system 11, the analog reading system 12, the digital reading system 13, and the digital writhing system 14. In FIG. 1, white arrows indicate an analog optical image, black arrows indicate a digital optical image, and broken lines indicate an electric signal.

The light modulator 10 can temporarily store intensity distribution of light, that is, an image based on the phenomenon that the element 10 changes transmittance distribution, reflectance distribution and phase distribution depending on the two-dimensional intensity distribution of light being input thereto. When applying another light beam to the light modulator 10 in which the image is stored, the transmitted light, the reflected light or the scattered light is modulated depending on the stored image information. By detecting or exposing these modulated lights, the image is allowed to be read out of the light modulator 10.

The intensity distribution of planar light being input to the light modulator 10 employs which one of an analog image, that is, an optical image and a digital image formed by scanning an original 18 in two dimensions with a laser beam having constant intensity. And, by applying uniform light to the light modulator 10, the analog image may be read out of the light modulator 10. Or, by scanning the light modulator 10 with the laser beam, the digital image may be read out of the light modulator 10.

The analog writing system 11 has a function of writing an optical image of an original image printed on the original 18 in the light modulator 10. It mainly consists of a light source for illuminating the original 18 and an optical system for image-forming the optical image of the original image.

The analog reading system 12 has a function of projecting an optical image written in the light modulator 10 onto a recording paper 19 such as a photosensitive paper. It mainly consists of a light source for illuminating the light modulator 10 and an optical system for image-forming an image stored in the light modulator 10 on the recording paper 19.

The digital reading system 13 has a function of time-serially reading the image stored in the light modulator 10 by scanning the light modulator 10 with the laser beam. It mainly consists of a laser beam source, a laser beam scanning system and a light receiving system.

The digital writing system 14 has a function of writing a digital image in the light modulator 10 based on the image signal given from the processing section 15. It mainly consists of a laser beam source, a laser beam scanning system and a laser beam modulating section.

The processing section 15 serves to process the digital image based on the image signal applied by the digital reading system 13 and output the processed image signal to the digital writing system 14. The result of the processing section 15 is displayed on the display 16.

The combination of the foregoing all arrangements results in realizing a function of editing, inputting and outputting an image. The combination of the light modulator 10, the digital reading system 13, the processing section 15, and the digital writing system results in realizing a function of editing an image. The combination of the analog writing system 11, the light modulator 10, and the digital reading system 13 results in realizing a scanning function. The combination of the digital writing system 14, the light modulator 10, and the analog reading system 14 results in realizing a printing function. The combination of the analog writing system 11, the light modulator 10, and the analog reading system 12 results in realizing an analog copying function. These functions are implemented by the computer included in the control section 17.

The feature of the invention can be divided into two parts, that is, the overall arrangement and the light modulator itself. At first, the description about the embodiments will be directed to the overall arrangement.

Figure 2:
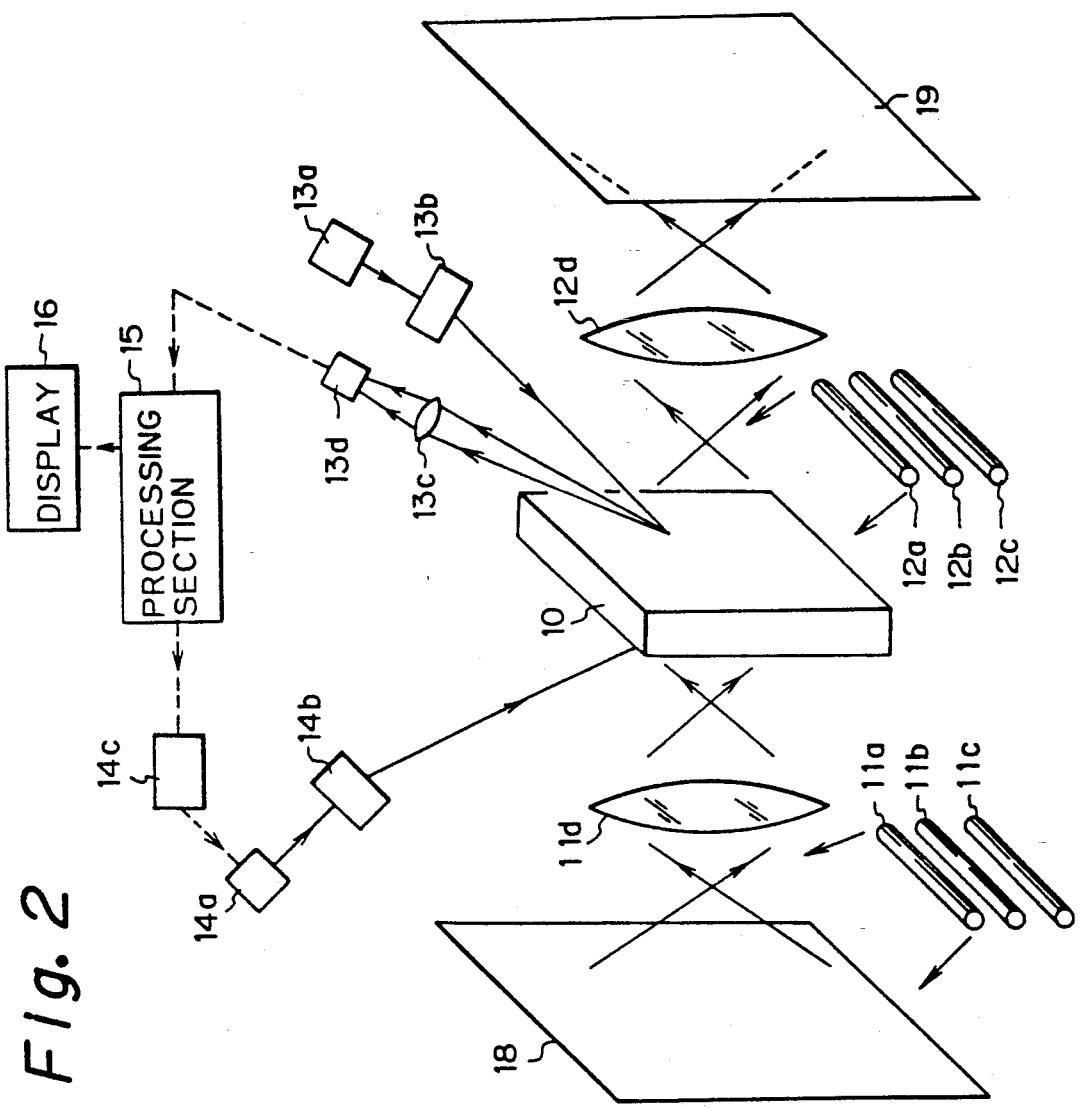
FIG. 2 is a view showing concrete arrangement of the embodiment shown in FIG. 1.

FIG. 2 illustrates the embodiment according to the concept of the invention shown in FIG. 1.

The analog writing system 11 shown in FIG. 1 consists of an optical system including three, R(red), G(green) and B(blue) light sources (luminous lamp) 11a, 11b, 11c and a lens 11d. The light sources 11a, 11b, 11c serially apply uniform light to the original 18 so that the optical image of the original 18 is reduction-projected onto the writing plane of the light modulator 10 through the lens 11d.

When the color image is separated into three colors, the processing is done for each color. That is, for the Red, the R light source 11a applies light to the original 18 for forming an optical image of an image printed on the original 18. Then, the optical image is written in the light modulator 10 and is read out. Next, for the Green, likewise, the G light source 11b applies light to the original 18 for forming an optical image of an image printed on the original 18. Then, the optical image is written in the light modulator 10 and is read out. Next, for the Blue, the same processing is carried out.

For obtaining each separated-color image, it is also possible to employ a color filter system (to be described later relative to FIG. 3) in addition to the foregoing light source switching system.

The color filter system is a system in which R, G and B color filters are provided between the lens 11d and the light modulator 10 and are serially switched for obtaining each separated-color image. Concretely, the R, G and B color filters are attached on a rotating body and the rotating body is rotated for serially switching the R, G and B colors. The color filter system employs a white light source such as a halogen lamp.

In addition, the light source switching system and the color filter system may employ three colors of cyan, yellow and magenta in place of red, green and blue.

The digital reading system 13 includes a laser beam source 13a, a laser beam scanning system 13b, a condenser lens 13c and a photo-detector 13d. The laser beam with constant light intensity emitted from the laser beam source 13a is applied to the laser beam scanning system 13b in which the laser beam is deflected vertically and horizontally. The resulting laser beam is allowed to be scanned on the light modulator 10 in two dimensions. The transmitted light, the reflected light or the scattered light is modulated according to the image information stored at each pixel matching to a laser beam spot and then these resulting lights are applied to the photo-detector 13d through the condenser lens 13c in which these lights are converted into an electric signal. The foregoing operation allows the image information written in the light modulator 10 to be read out time-serially. For obtaining color image information, it is necessary to carry out the reading operation for each of the separated-color R, G and B images. The read image information is applied to the processing section 15.

The laser beam source 13a usually employs a laser diode or a gas laser such as a He-Ne (Helium-Neon) laser. The laser diode is so small in size that the overall apparatus can be reduced in size. The gas laser offers so excellent an interference characteristic that the diameter of the laser beam spot may be made small, resulting in enhancing reading resolution.

The laser beam scanning system 13b mainly consists of a main scan section and a sub scan section. The main scan section serves to scan on the light modulator 10 one line by one line with a laser beam spot. The sub scan section applies the laser beam spot orthogonally to that emitted by the main scan section for scanning on the light modulator 10. That is, after the main scanning of one line is finished, the sub scan section serves to move the laser beam spot to the next line. The operation of the main scan section and the sub scan section results in allowing the laser beam spot to be scanned on the light modulator 10.

The photo-detector 13d is composed of a rapid-responsive photodiode. If the laser beam is formed like such a slit as extending in the sub-scanning direction, that is, the vertical direction, the photo-detector 13d may employ a diode array or a charge-coupling element (CCD).

The digital writing system 14 shown in FIG. 1 includes a laser beam source 14a, a laser beam scanning system 14b, and a laser modulating circuit 14c.

The processing section 15 applies a signal to the laser modulating circuit 14c in which the intensity of the laser beam emitted from the laser beam source 14a is modulated depending on the signal. If the laser beam source 14a employs a laser diode, the intensity of the laser beam can be modulated simply by modulating the driving current of the laser beam source 14a. If the laser beam source 14a employs a gas laser, it is necessary to provide a modulator (not shown) for modulating the emitted laser beam outside of the laser beam source 14a.

The modulated laser beam is applied to the laser beam scanning system 14b in which the laser beam is deflected vertically and horizontally, resulting in allowing the laser beam to be scanned on the light modulator 10. The arrangement of the laser beam scanning system 14b is identical to that of the laser beam scanning system 13b. The laser beam spot located on the light modulator 10 corresponds to one pixel, so that the light intensity of the laser beam spot represents the corresponding pixel tone.

The laser modulating circuit 14c operates in synchronism with the laser beam scanning system 14b so that the digital image can be written in the light modulator 10 depending on the signal given by the processing section 15. For handling the color image information, the writing operation has to be performed for each color of R, G and B.

The analog reading system 12 includes three R, G and B light sources (luminous lamp, for example) 12a, 12b and 12c, and an optical system consisting of a lens 12d. The light sources 12a, 12b and 12c serially apply uniform light onto the image written in the light modulator 10 and pass through the lens 12d so that the image is expansion-projected on the recording paper 19.

When the R image is being written in the light modulator 10, the R light source 12a is activated to apply a light beam to the light modulator 10 and the reflected light exposes the recording paper 19. The similar processing is repeated for the G and the B images. It results in developing the recording paper 19 on which the R, G and B images are exposed, thereby realizing a color hardcopy.

The analog reading system 12 may employ a color filter system in place of the light source switching system like the analog writing system 11. In addition, it may employ cyan, yellow and magenta in place of the colors R, G and B.

The processing section 15 mainly consists of a computer including a microprocessor, a memory, and the like. The processing section 15 receives an image signal photoelectric-converted by the photo-detector 13d and performs various processings relative to the image signal. The various processings include tone processing (gamma correction, shading correction), sharpness intensity, area specification (trimming, masking), color processing (color reproduction, painting function, color cutting), moving (rotation), edition (embedded synthesizing, character synthesizing), and the like. The processed result of the image signal is displayed on the display 16. Hence, a user can interactively perform the desired processing as he or she is making sure of the result. The processed image signal is output to the laser modulating circuit 14c.

In FIG. 2, the control section 17 shown in FIG. 1 is left out.

Figure 3:
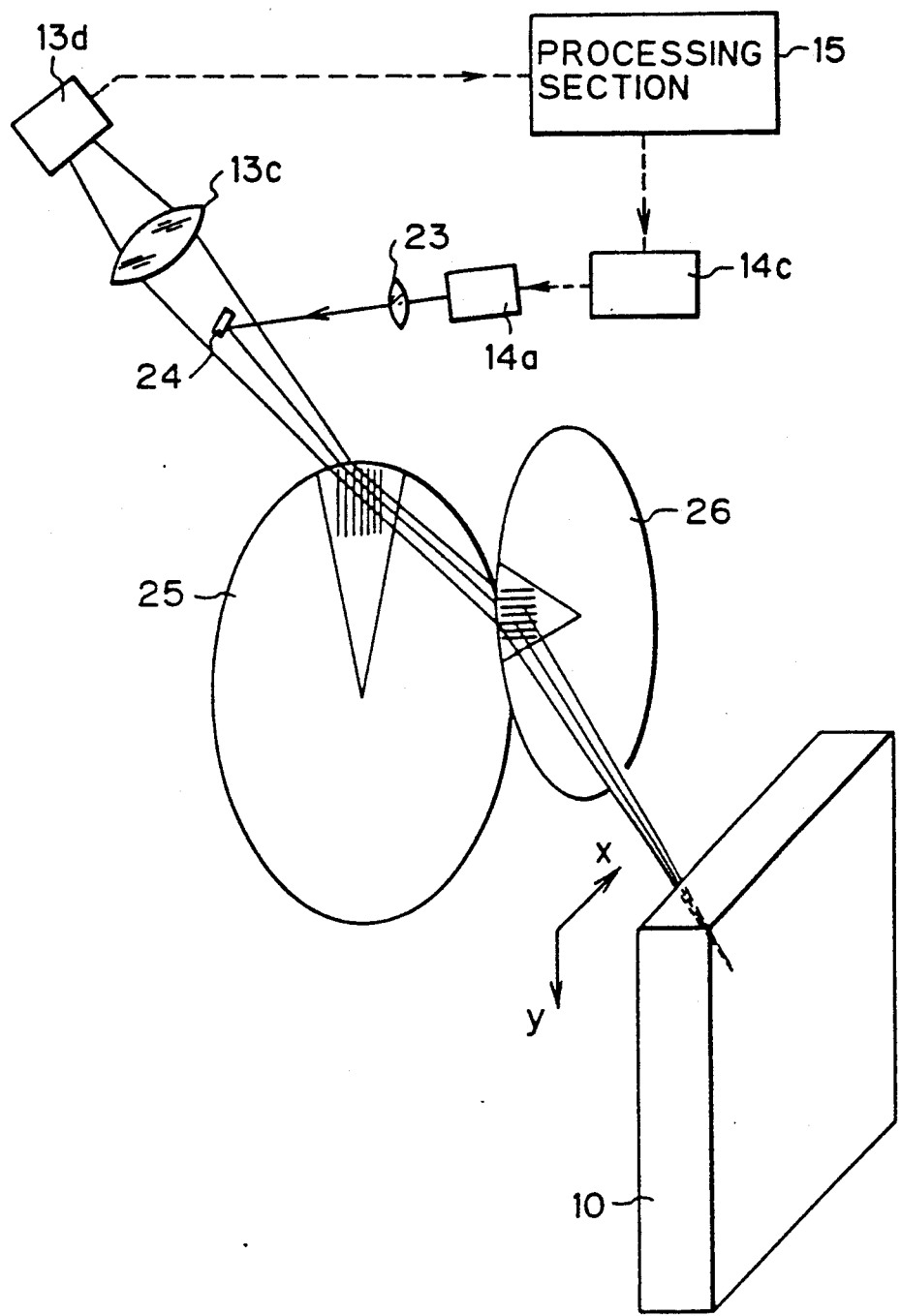
FIG. 3 is a view showing concrete arrangement of a digital reading system and a digital writing system employed in the embodiment shown in FIG. 1.

FIG. 3 shows another embodiment of the digital reading system 13 and the digital writing system 14 shown in FIG. 1. Herein, the light modulator 10 has a storage function (to be described later), which allows information to be written in or read out of the same side of the light modulator 10. The same components as those shown in FIG. 2 have the same reference numbers and function in the similar manner to those shown in FIG. 2.

Next, the writing operation will be discussed below.

Based on the signal sent from the processing section 15, the laser beam source 14a emits the laser beam modulated by the laser modulating circuit 14c. The emitted laser beam is converted into parallel ray through a lens 23. Then, the parallel ray is reflected on a mirror 24 and applied to a hologram disk 25 included in the main scan section. The hologram disk 25 includes a plurality of hologram lens attached thereon. Each hologram lens has an image-forming function toward the main scanning direction (X direction shown in FIG. 3). By rotating the hologram disk 25, therefore, the slender laser beam is allowed to be scanned on the light modulator 10 in the main scanning direction, The laser beam deflected in the main scanning direction is applied onto a hologram disk 26 included in the sub scan section. The hologram disk 26 includes a plurality of hologram lens attached thereon. Each hologram has an image-forming function toward the sub-scanning direction (Y direction shown in FIG. 3). By rotating the hologram disk 26, therefore, the laser beam is allowed to be scanned on the light modulator 10 in the sub-scanning direction (Y direction shown in FIG. 3). The laser beam is applied to the light modulator 10 orthogonally to the main scanning direction.

Upon finishing the scan of one line of the light modulator 10 toward the main-scanning direction, the laser beam is allowed to move in a stepwise manner. That is, the laser beam is scanned on the light modulator 10 in the sub-scanning direction. The section of the laser beam is formed to be circular with a small diameter by the lens 23. The hologram disk 25 included in the main scan section serves to slenderize the laser bee toward the sub-scanning direction (Y direction shown in FIG. 3). Then, the slender laser beam is transformed into the laser beam spot by virtue of the Y-direction lens effect caused by the hologram 26 of the sub scan section. It results in the laser beam spot being struck on the light modulator 10.

The laser modulating circuit 14c, the hologram 25 of the main scan section and the hologram 26 of the sub scan section are activated in synchronism.

As set forth above, for implementing the writing operation, the intensity of the laser beam is converted based on the signal sent from the processing section 15 and the resulting laser beam is scanned on the light modulator 10 in two dimensions.

The reading operation will be discussed below.

The laser beam source 14a applies a laser beam with constant intensity to the light modulator 10 through the same path as that of the writing operation, as the laser beam is being scanned on the element 10 in two dimensions. It results in the applied laser beam being changed into a scattered light (reflected light) modulated depending on the image information written in the light modulator 10.

The modulated scattered light (reflected light) passes through the reverse path to the light-incoming path, concretely, the hologram disk 26 of the sub scan section and the hologram disk 25 of the main scan section. The hologram disk 26 serves to focus the light in the Y direction and the hologram disk 25 serves to focus it in the X direction.

When the scattered light reaches the mirror 24, it has not a spot but an oval form. It is thus necessary to focus the light through the lens 13c before it reaches the photo-detector 13d. The photo-detector 13d serves to convert the light intensity into an electric signal and the resulting electric signal is transmitted to the processing section 15.

The photo-detector 13d, the hologram disk 25 of the main-scan section and the hologram disk 26 of the sub scan section are activated in synchronism. In addition, a beam splitter may be provided in place of the mirror 24.

As the main scan section and the sub scan section, a rotating polygon mirror, a ultrasonic deflector or a galvanometer may be used. The sub-scanning may be implemented by mechanically moving the spatial light.

Figure 4:
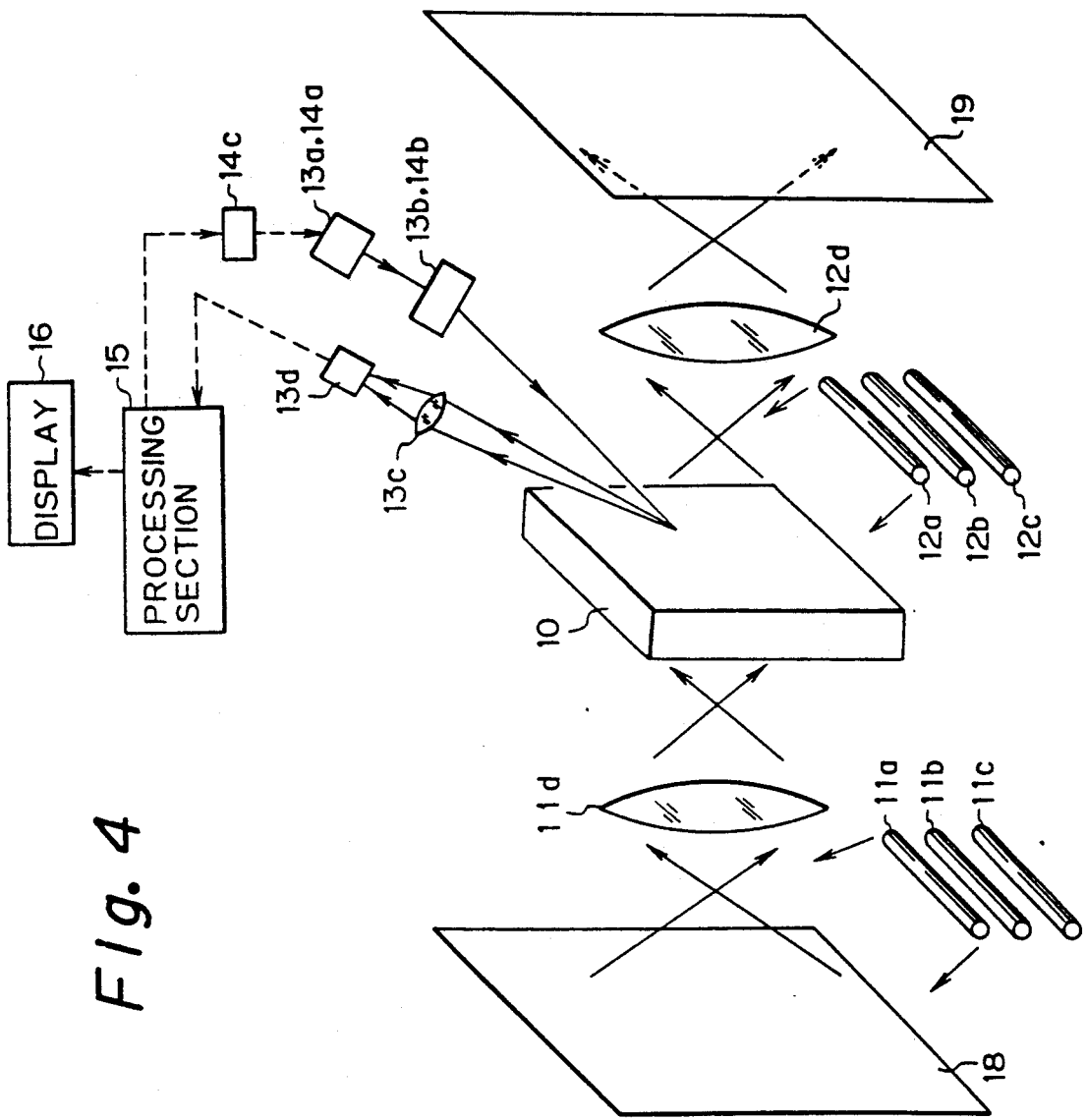
FIG. 4 is a view showing other concrete arrangement of the embodiment shown in FIG. 1.

FIG. 4 shows another arrangement of the digital writing system 14 and the digital reading system 13 in which both systems include one laser beam source 14a (13a), one laser beam scanning system 14b (13b) and one laser modulating circuit 14c. Hence, both systems 13 and 14 apply the laser beam to the same side of the light modulator 10. These components 14a (13a), 14b (13b) and 14c function in the similar manner. The other arrangement is the same as that shown in FIG. 2.

Figure 5:
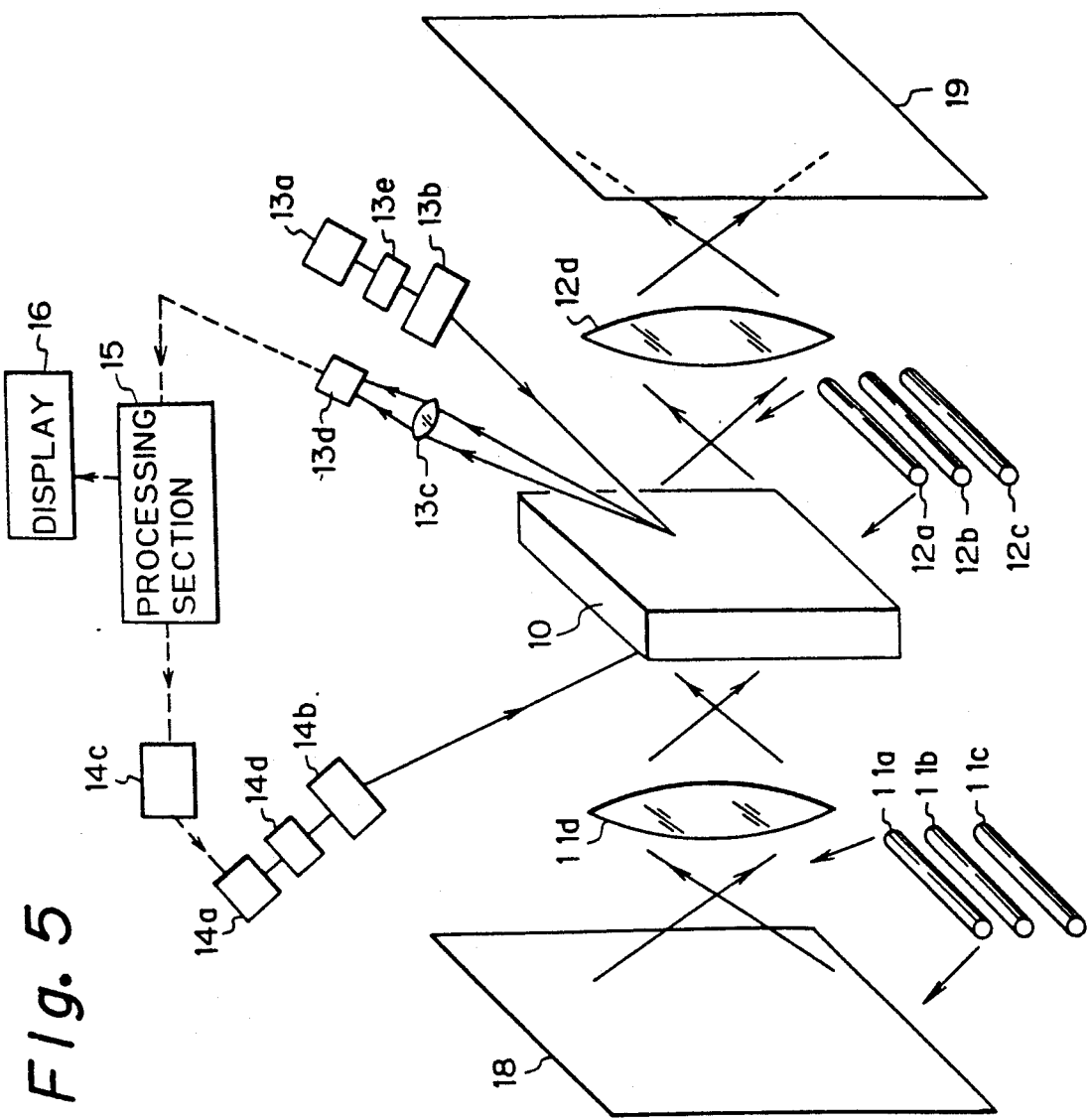
FIG. 5 is a view showing other concrete arrangement of the embodiment shown in FIG. 1.

FIG. 5 shows another arrangement of the digital writing system 14 and the digital reading system 13. The same components as those shown in FIG. 2 have the same reference numbers. The same components substantially function in the similar manner to those shown in FIG. 2.

In the arrangement, the digital reading system 13 includes a laser beam source 13a, a beam spot diameter adjusting section 13e, a laser beam scanning system 13b, a focusing lens 13c, and a photo-detector 13d. The laser beam source 13a applies a laser beam to the beam spot diameter adjusting section 13e in which the spot diameter of the laser beam is adjusted. Then, the diameter-adjusted laser beam is applied to the laser beam scanning system 13b in which the laser beam is deflected horizontally and vertically. The transmitted light, the reflected light or the scattered light modulated depending on the image information of a pixel matched to the laser beam spot is applied to the photo-detector 13d through the focusing lens 13c and is converted into an electric signal. This is how the image written in the light modulator 10 is time-serially read out.

How to obtain color image information is the same as that described relative to FIG. 2.

The laser beam source 13a and the photo-detector 13d have the same construction and functions in the same fashion as those shown in FIG. 2. The beam spot diameter adjusting section 13e and the laser beam scanning system 13b will be described later with reference to FIG. 6.

The digital writing system 14 includes a laser beam source 14a, a beam spot diameter adjusting section 14d having the same arrangement as the beam spot diameter adjusting section 13e, a laser beam scanning system 14b, and a laser modulating circuit 14c. The processing section 15 applies a signal to the laser modulating circuit 14c in which the intensity of the laser beam is modulated depending on the signal. If the laser beam source 14a employs a laser diode, the intensity of the laser beam can be modulated simply by modulating the driving current of the laser beam source 14a. If the laser beam source 14a employs a gas laser, it is necessary to provide another modulator (not shown) for modulating the emitted laser beam outside of the laser beam source 14a.

The modulated laser beam is applied to the beam spot diameter adjusting section 14d in which the spot diameter of the laser beam is adjusted. Then, the diameter-adjusted laser beam is applied to the laser beam scanning system 14b in which the laser beam is deflected vertically and horizontally, resulting in allowing the laser beam to be scanned on the light modulator 10 in two dimensions. The laser beam spot applied to the light modulator 10 matches to one pixel, so that the light intensity of the laser beam spot represents the corresponding pixel tone.

As mentioned above, the analog reading system 12 functions in the same fashion as that shown in FIG. 2 except the laser beam spot diameter adjusting section 14d, which will be described later with reference to FIG. 6.

The arrangement shown in FIG. 5 employs a light modulator designed so that the laser beam is allowed to be applied to the same side of the light modulator in reading and writing the image. Hence, it can use the almost components for the digital reading and writing systems. Further, the reading system has the scanning hologram lens served as a focusing lens, resulting in greatly simplifying the overall optical system.

Figure 6:
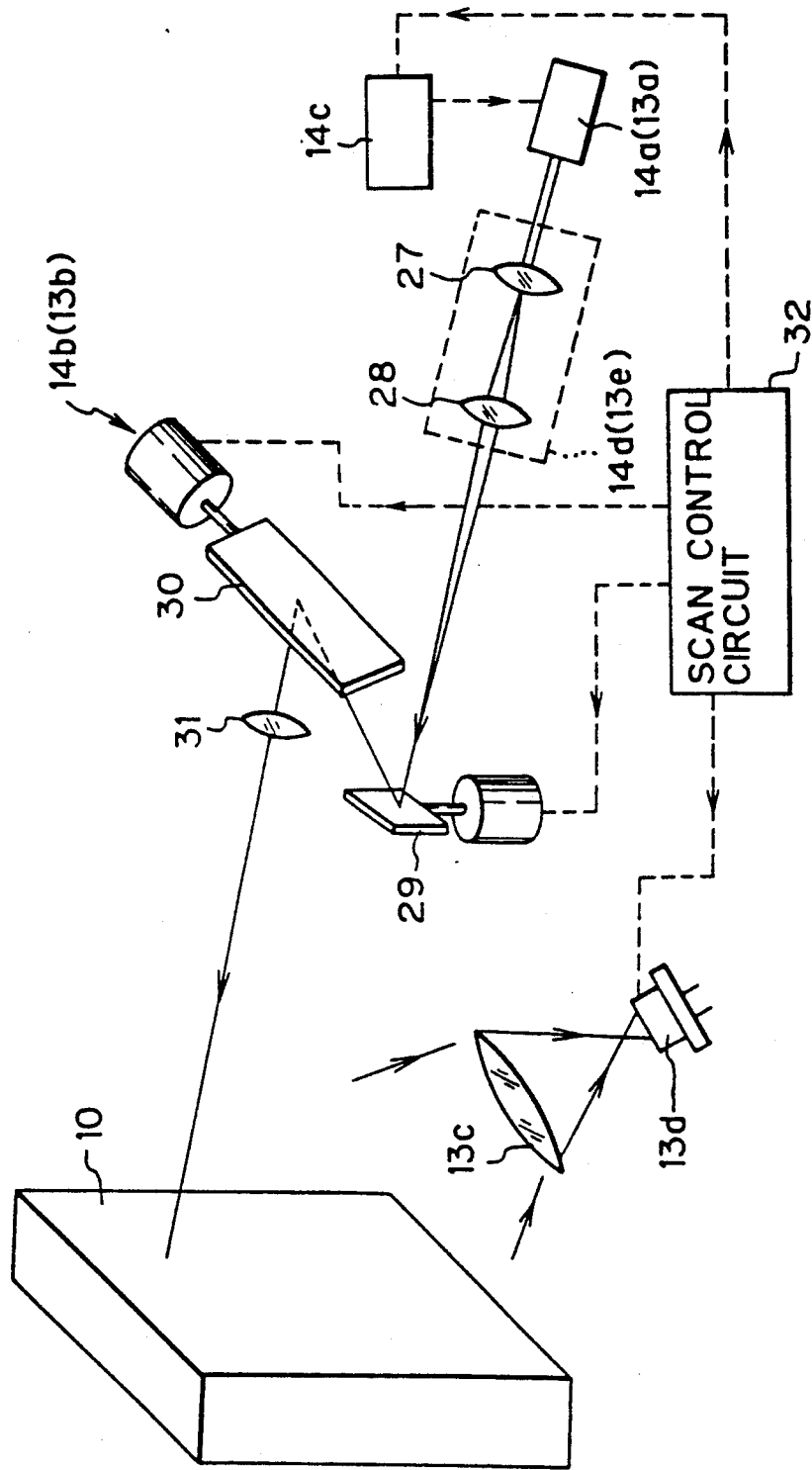
FIG. 6 is a view showing concrete arrangement of a laser beam scanning mechanism used in the embodiment shown in FIG. 5.

FIG. 6 schematically shows an embodiment of the laser beam scanning mechanism used in the arrangement shown in FIG. 5. The same components as those shown in FIG. 5 have the same reference numbers and function in a similar manner to those shown in FIG. 5.

As shown in FIG. 6, the laser beam source 14a (13a) applies a laser beam to the light modulator 10 through lens 27 and 28. The laser beam is image-formed on the light modulator 10. The laser beam is scanned by the laser beam scanning system 14b (13b) before it reaches the light modulator 10.

The laser beam scanning system 14b (13b) includes as main components a main scan galvanometer 29, a sub scan galvanometer 30, a scan lens 31, and a scan control section 32. The main scan galvanometer 29 serves to traverse the laser beam spot across one line of the light modulator 10. The sub scan galvanometer 30 serves to traverse the laser beam spot orthogonally to the main scan galvanometer 29. That is, upon finishing the main scanning of one line, the laser beam spot is moved to the next line. It means that the combination of the main scan galvanometer 29 and the sub scan galvanometer 30 enables the laser beam spot to be scanned on the light modulator 10 in two dimensions.

The light path length leading to the center of the light modulator 10 is different from that leading to the peripheral portion thereof. Hence, the laser beam spot focused on the center is disallowed to be focused on the peripheral portion. The scan lens 31 is located to overcome the shortcoming. This type of the scan lens 31 is, in general, termed as a F$\theta$ lens.

The scanning control circuit 32 transmits a control signal to the main scan galvanometer 29 and the sub scan galvanometer 30. In response to the control signal, the laser modulating circuit 14c and the photo-detector 13d operate in synchronism to the scanning control circuit 32.

The reading main scanning density depends on a sampling frequency of the photo-detector 13d. For changing the main scanning density, therefore, it is necessary to control the sampling frequency and the number of vibration of the sub scan galvanometer 30. It results in allowing the image to be read at low and high resolution.

For obtaining an expanded image, it is necessary to read out any portion of the light modulator 10 at high resolution and write the read signal on a larger area than the read portion at normal density. For obtaining a reduced image, it is necessary to perform the reverse operation.

For changing the main-scan density in writing the image, it is necessary to control the modulated frequency of the laser modulating circuit 14c and the number of vibration of the sub scan galvanometer 30.

The beam spot diameter adjusting section 14d (13e) is designed to adjust the beam spot diameter by changing the focal lengths of the lenses 27 and 28. Concretely, by moving the lens 28 toward the optical axis, the focal lengths are allowed to be changed. It has the same construction as a so-called zoom lens. Like the zoom lens, therefore, the lens is driven by a motor.

As another method for changing the focal length of the lens 28, it is possible to compose the lens 28 with a specific material. The material has a refraction (or apparent refraction) to be changed depending on the voltage applied to the lens 28. Such a material is an electric-optical material, liquid crystal or the like. The lens composed of the material makes it possible to reduce the overall apparatus in size and enhance the reliability of the apparatus, because the lens requires no mechanical driving section.

As another method, it is possible to use a lens array as the lens 28. The lens array serves to overlap several beams with one another for adjusting the beam spot diameter by selectively switching the lens elements of the lens array.

The driving section for changing the focal length of the lens 28, the focal-variable lens or the lens array switching section, each of which is used in the corresponding method mentioned above, is activated in synchronism to the scanning control circuit 32, the laser modulating circuit 14c and the photo-detector 13d.

The beam spot diameter is controlled depending on the scanning density of the light modulator 10. The relation between the scanning density of the light modulator and the beam spot diameter is shown in FIG. 7.

Ideally, a ratio D/p of a scanning pitch p and a beam spot diameter D is controlled to come closer to 1. In reading the image, the ratio D/p is more than 1. In writing the image, however, the ratio D/p is not permitted to be more than 1.

Figure 7A:
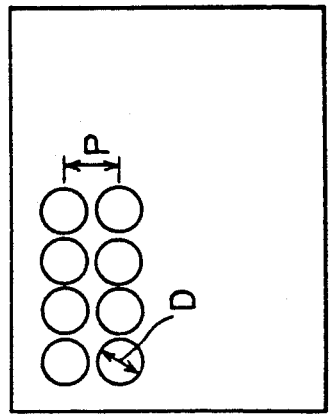
FIGS 7A to 7F are views showing a dot pattern formed on a light modulator used in the embodiment shown in FIG. 5.
Figure 7B:
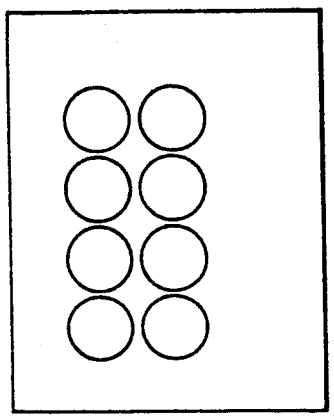
Figure 7C:
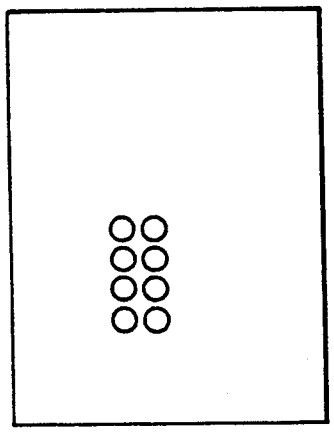
Figure 7D:
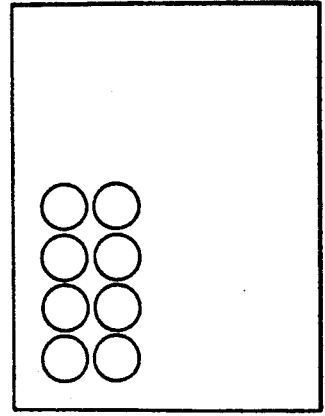
Figure 7E:
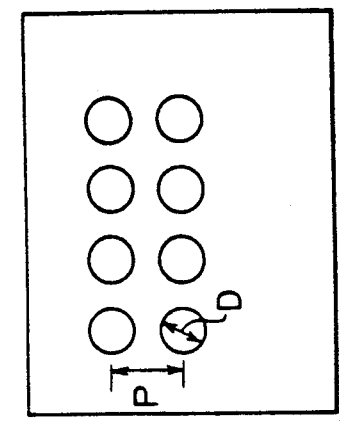
Figure 7F:
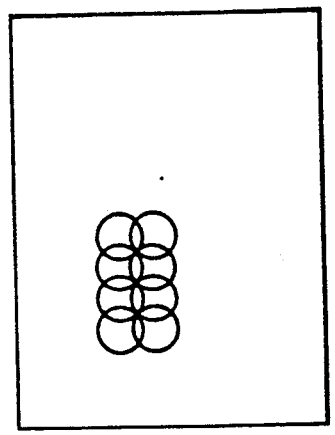

FIGS. 7D, 7E and 7F show dot patterns provided as keeping the beam spot diameter constant though the scanning density is variable. FIG. 7D, shows the dot pattern provided at a normal scanning density, FIG. 7E, shows a dot pattern provided at a low-resolution scanning density, and FIG. 7F shows a dot pattern provided at a high-resolution scanning density.

When reading the image at the low-resolution scanning density shown in FIG. 7E, a large reading error may be generated if the image written in the light modulator has the same spacial frequency as the scanning pitch p. On the other hand, at the high-resolution scanning density shown in FIG. 7F, it is difficult to precisely read the image as the scanning density is kept higher.

It is therefore necessary to control the ratio D/p to come closer to an optimum value when adjusting the beam spot diameter. The control results in offering the most excellent image with fewer errors at each scanning density.

Figure 8:
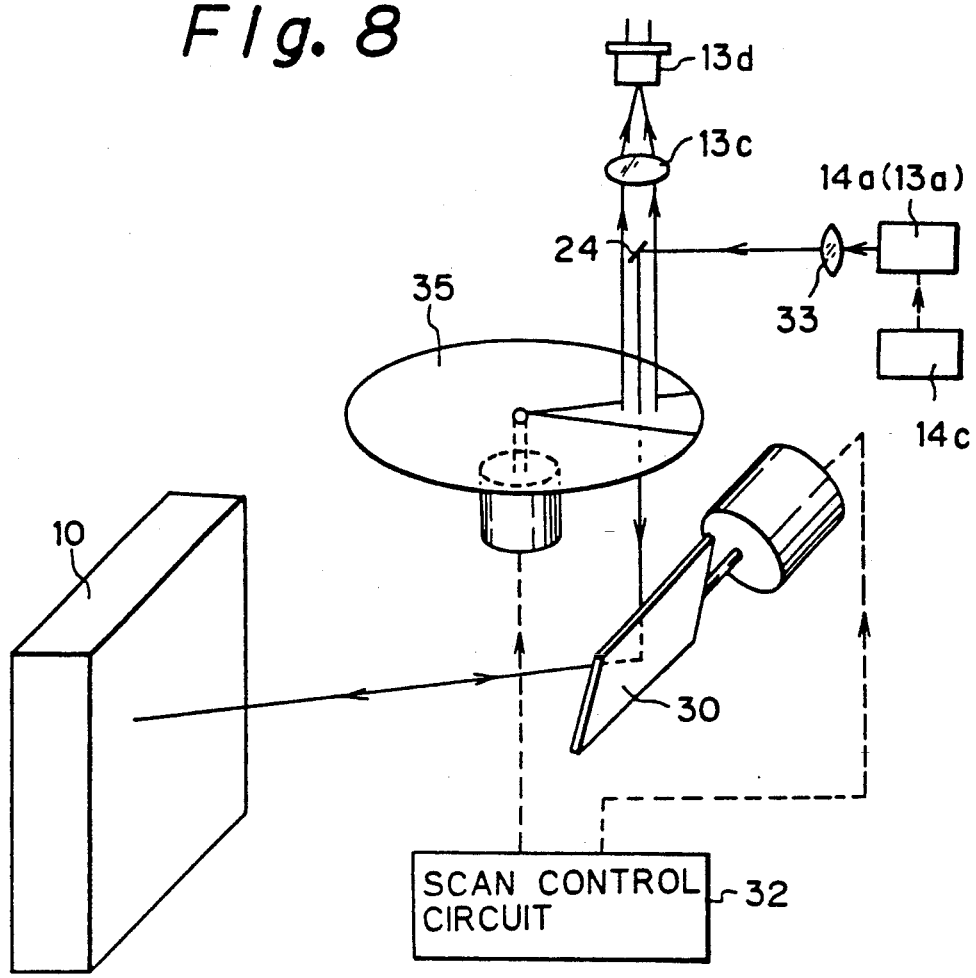
FIG. 8 is a view showing the other concrete arrangement of a laser beam scanning mechanism used in the embodiment shown in FIG. 5.

FIG. 8 schematically shows another arrangement of the laser-beam scanning mechanism according to the present embodiment. The same components as those shown in FIGS. 5 and 6 have the same reference numbers and function in a similar manner to those shown in FIGS. 5 and 6.

As shown, a laser beam emitted by the laser beam source 14a(13a) is converted into a parallel ray through the effect of the lens 33. The parallel ray is reflected on a mirror 34 and reaches a hologram disk 35 in which the parallel ray is deflected toward the main-scanning direction. Then, the deflected beam is also deflected toward the sub-scanning direction by a galvanometer 30. The hologram disk 35 functions as a lens so that the laser beam is image-formed on the light modulator 10 and is scanned in two dimensions.

The light modulated by the light modulator 10 reversely passes through the galvanometer 30 and the hologram disk 35, and reaches a lens 13c in which the light is focused. Then, the focused light is traveled to the photo-detector 13d.

The scanning control circuit 32 transmits a control signal to the hologram disk 35 and the galvanometer 30. The laser modulating circuit 14c and the photo-detector 13d operate in synchronism to the scanning control circuit 32 in response to a signal from the scanning control circuit 32.

As a method for adjusting the beam spot diameter, the present arrangement employs the method for changing a wavelength of the laser beam emitted from the laser beam source 14a (13a).

How to change the wavelength of the laser beam is based on the following equation:

$$F_1 \cdot \lambda_1 = F_2 \cdot \lambda_2$$

wherein $F_1$ denotes a focal length of a reading convergent beam to the light modulator 10, $\lambda_1$ denotes its wavelength, $F_2$ denotes a focal length of a reproducing beam to the element 10, and $\lambda_2$ denotes its wavelength.

It is apparent from the equation that as $\lambda_2$ changes with $F_1$ and $\lambda_1$ being constant, the focal length $F_2$ of the reproducing beam changes so as to adjust the beam spot diameter. If the laser beam source 14a (13a) employs a laser diode, the wavelength $\lambda_2$ can be changed by changing the applied voltage.

Figure 9:
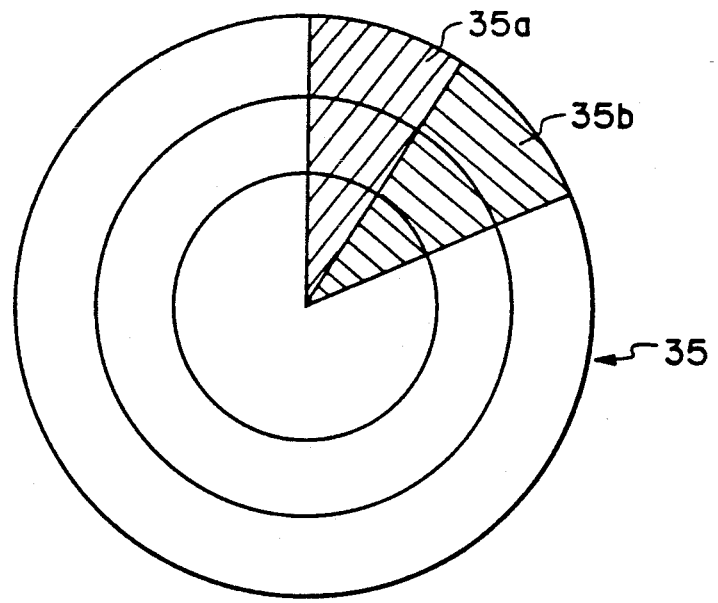
FIG. 9 is a view showing a hologram disk used in the arrangement shown in FIG. 8.

FIG. 9 is a view showing a hologram disk in the arrangement shown in FIG. 8.

As another arrangement, the hologram disk 35 contains the hologram lenses 35a and 35b attached in a concentric manner, which lenses are recorded by the convergent beams of respective focal lengths $F_1$ or wavelengths $\lambda_1$ as shown in FIG. 9. With the movement of the mirror 34 or the hologram disk 35, the laser beam is allowed to selectively pass through the hologram lens 35a or 35b.

In case of using a recording beam with a constant $\lambda_1$ and a variable focal length $F_2$, it means that $F_2$ is controlled by changing $F_1$ with constant values of $\lambda_1$ and $\lambda_2$.

In case of using a reading beam with a constant focal length $F_1$ and a variable wavelength $\lambda_1$, it means that $F_2$ is controlled by changing $\lambda_1$ with constant values of $F_1$ and $\lambda_2$.

Figure 10:
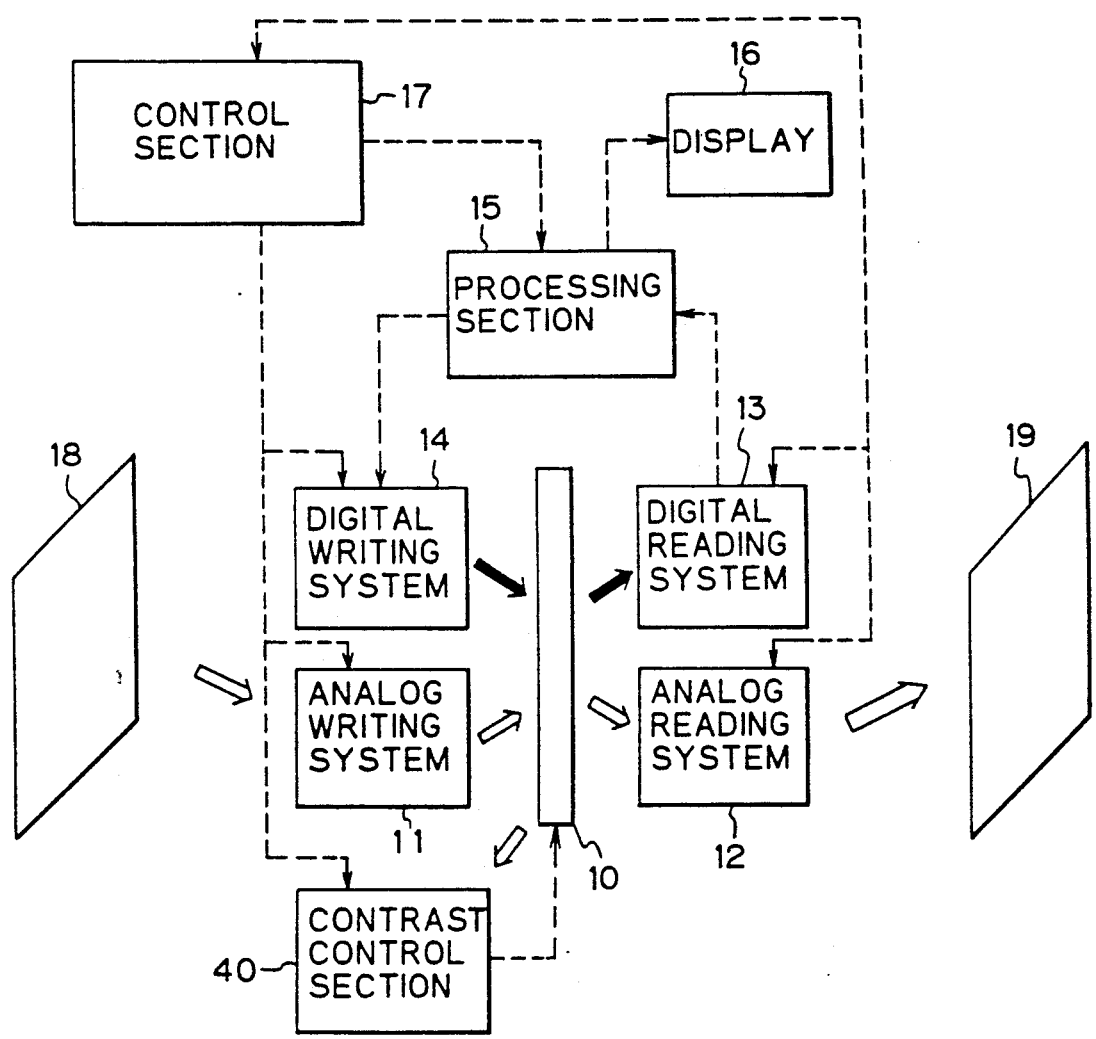
FIG. 10 is a block diagram showing basic arrangement of a color image editing, inputting and outputting apparatus according to another embodiment of the invention.
Figure 11:
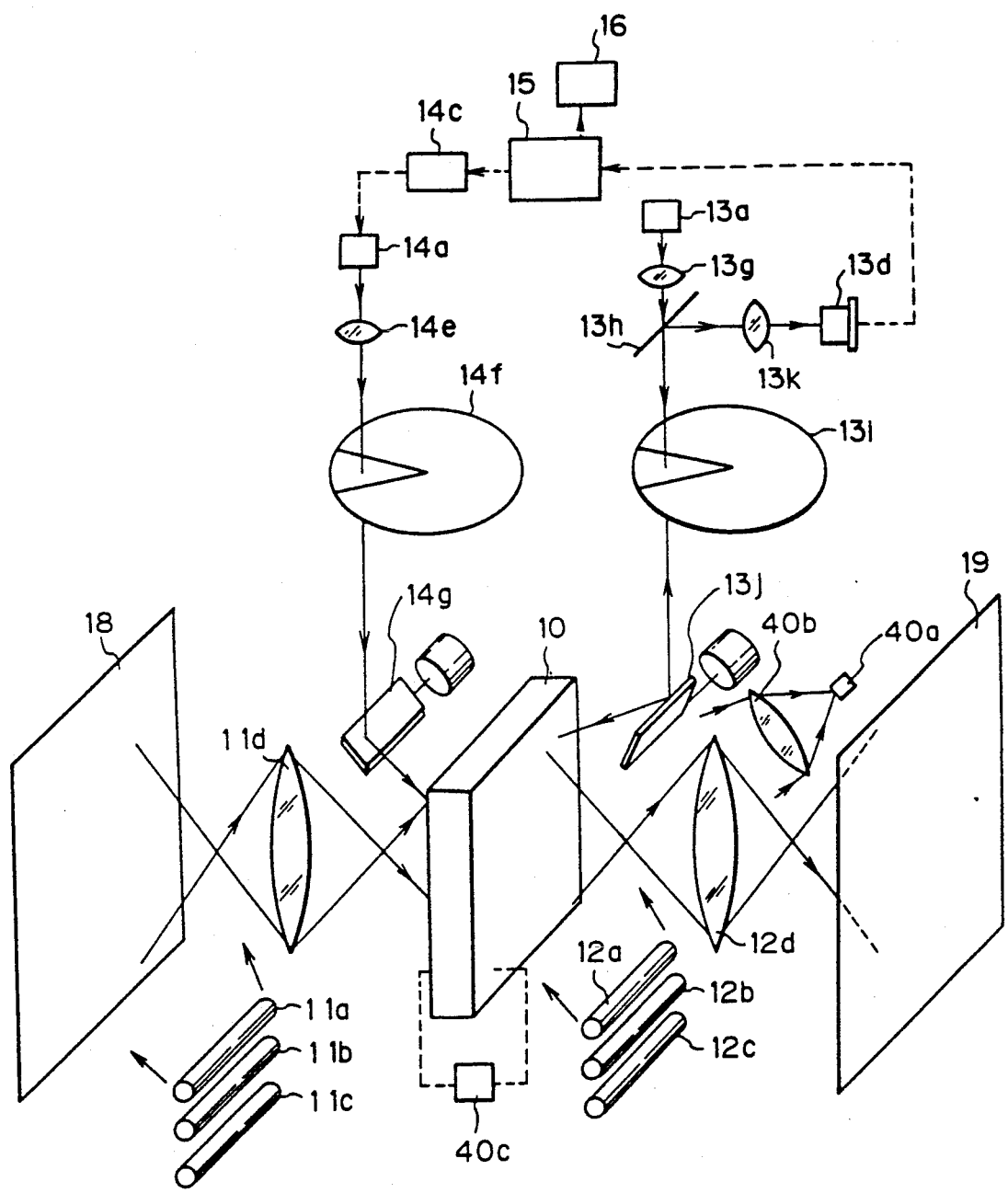
FIG. 11 is a view showing concrete arrangement of the embodiment shown in FIG. 10.
Figure 12:
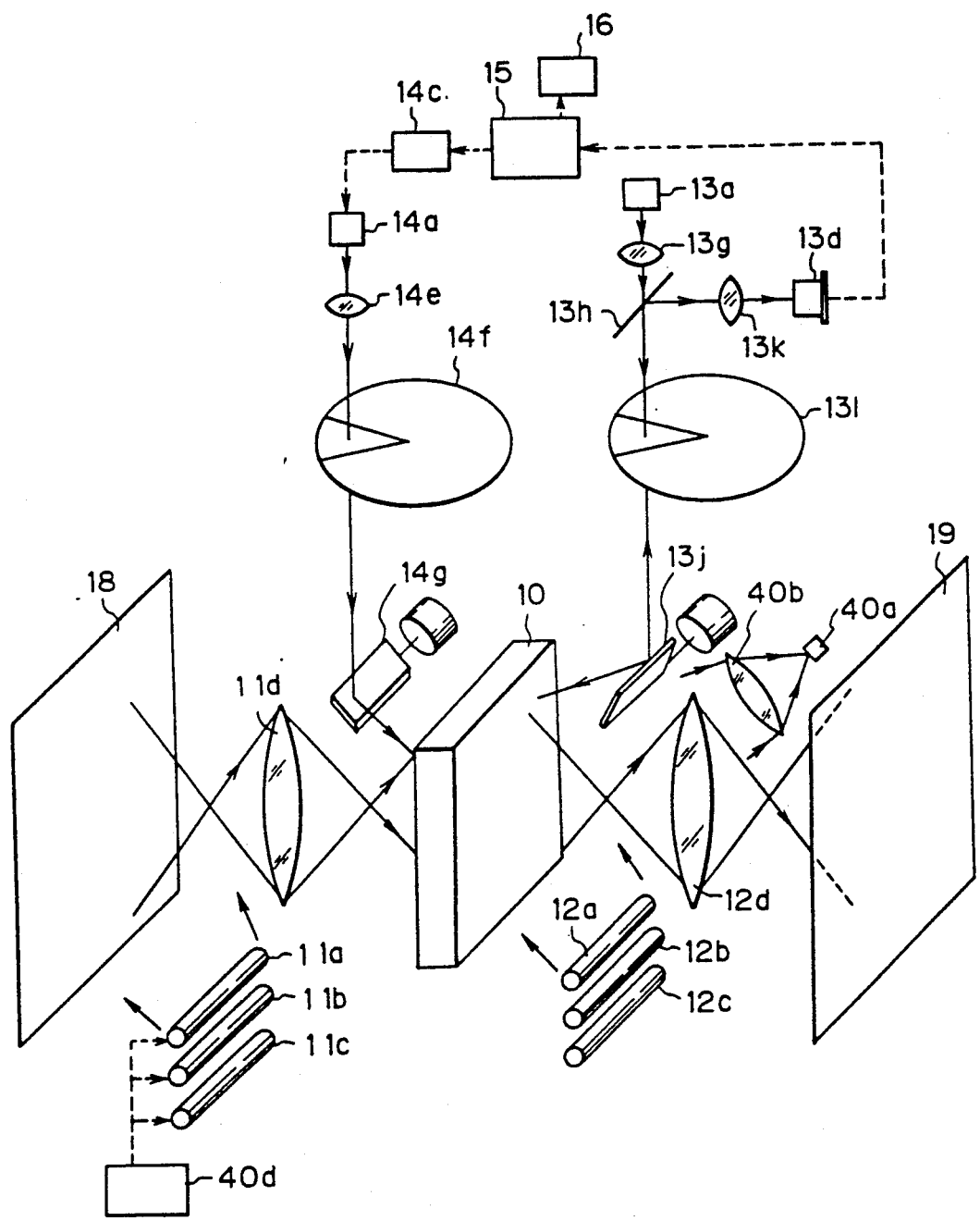
FIG. 12 is a view showing concrete arrangement of the embodiment shown in FIG. 10.

Next, the description will be directed to another embodiment of a color-image editing, inputting and outputting apparatus with reference to FIGS. 10 to 12.

FIG. 10 schematically shows the basic arrangement of the color-image editing, inputting and outputting apparatus according to the embodiment.

It will be apparent from FIG. 10 that the present embodiment is conceptually identical to that shown in FIG. 1 except a contrast control section 40. The description about the identical sections will be left out (see FIG. 1).

As shown in FIG. 10, the contrast control section 40 is connected to the light modulator 10 and the control section 17. The contrast control section 40 consists of a sensing means for sensing brightness of an optical image written in the light modulator 10 and an adjusting means for adjusting input sensitivity of the light modulator 10. It serves to adjust a dynamic range of the light modulator 10 depending on the brightness of the written image.

The quality of the image recorded on the light modulator 10 depends on the image reflected from an original 18. Each original 18 has the corresponding intensity of the reflected light depending on its paper quality. Hence, the reflected image does not always stay in a constant range of brightness. The light modulator 10, on the other hand, has a limited dynamic range. For always recording the image having the optimum contrast, it is necessary to recognize the brightness of the reflected image and match the dynamic range of the light modulator 10 to the brightness.

If the printing color of the information (for example, characters) is similar to the color of the color original, it may be necessary to constantly record an image with excellent contrast at the expense of exact color information.

For that purpose, as shown in FIGS. 11 and 12, the contrast control section 40 includes a photo-detector 40a and a lens 40b located to allow the image-writing plane of the light modulator 10 to be image-formed on the photo-detector 40a as means for sensing the average brightness of an image written in the light modulator 10. The photo-detector 40a is connected to the control section 17 shown in FIG. 10.

In operation, by activating at least one of the light sources 11a, 11b and 11c, the image written in the light modulator 10 is image-formed on the photo-detector 40a so as to measure the brightness of the image. In this case, for grasping the quantity of the light reflected from each paper surface, the photo-detector 40a is designed to catch the light reflected not from the four corners but from the central portion of the image. As an alternate design, the photo-detector 40a may be arranged in an array so that the image written in the light modulator 10 can be divided into a plurality of areas so as to measure the average brightness of each area.

The contrast control section 40 further includes a power source 40c for allowing the voltage applied between the electrodes of the light modulator 10 to be controlled depending on the output sensed by the photo-detector element 40a. This power source 40c is connected to the control section 17 (see FIG. 10) so that the power source 40c can receive a voltage-controlling signal from the control section 17. The output terminal of the power source 40c is connected to both electrodes of the light modulator 10. It means that the light modulator 10, the photo-detector 40a, the control section 17 and the power source 40c compose a closed loop.

As the voltage applied between the electrodes becomes higher, the light modulator 10 enhances the sensitivity to the incident light more. As the voltage becomes lower, it lowers the sensitivity to the incident light. The applied voltage thus serves to control the dynamic range of the light modulator 10. It results in allowing the foregoing closed loop to control the dynamic range of the light modulator 10 for searching the optimum dynamic range of the reflected image of the original 18.

FIG. 11 shows the concrete arrangement of the color-image editing, inputting and outputting apparatus according to the concept of the invention shown in FIG. 10.

The digital reading system 13 shown in FIG. 10 includes a laser beam source 13a, a lens 13g, a perforated mirror 13h, a holographic scanner 13i, a galvanomirror 13j, a lens 13k, and a photo-detector 13d.

The laser beam is emitted from the laser beam source 13a and is guided to the holographic scanner 13i through the lens 13g and the perforated mirror 13h. The holographic scanner 13i serves to traverse the laser beam in the main scanning direction. The laser beam travels to the galvanomirror 13j through the holographic scanner 13i. The galvanomirror 13j serves to traverse the laser beam in the sub scanning direction so that the laser beam can be scanned on the light modulator 10 in two dimensions.

By applying the laser beam spot to the light modulator 10, the transmitted light, the reflected light or the scattered light at the beam-applied spot is modulated depending on the image information at the pixel matched to the laser beam spot. The modulated light is converted into an electric signal by the photo-detector 13d. The present embodiment employs the reflected beam. The reflected beam travels through a reverse path to that of the incident laser beam. That is, the reverse path includes the galvanomirror 13j, the holographic scanner 13i, the perforated mirror 13h, the lens 13k, and the photo-detector 13d ranged in sequence. The holographic scanner 13i functions as a focusing lens.

As set forth above, the foregoing operation allows the image information written in the light modulator 10 to be read out time-serially.

The digital writing system 14 shown in FIG. 10 includes a laser beam source 14a, a lens 14e, a holographic scanner 14f, a galvanomirror 14g, and a laser modulating circuit 14c. The processing section 15 transmits a signal to the laser modulating circuit 14c in which the intensity of the laser beam emitted from the laser beam source 14a is modulated depending on the signal.

If the laser beam source 14a employs a laser diode, the intensity of the laser beam can be modulated simply by modulating the driving current of the laser beam source 14a. If the laser beam source 14a employs a gas laser, it is necessary to provide a modulator (not shown) for modulating the emitted laser beam outside of the laser beam source 14a.

The modulated laser beam is applied to the lens 14e through which it is transformed into a parallel ray. Then, the parallel-ray reaches the holographic scanner 14f and the galvanomirror 14g in which it is deflected vertically and horizontally. It results in allowing the laser beam to be scanned on the light modulator 10 in two dimensions. The laser modulating circuit 14c operates in synchronism to the holographic scanner 14f and the galvanomirror 14g.

The aforementioned operation results in allowing the image data sent from the processing section 15 to be written in the light modulator 10. The laser beam spot applied to the light modulator 10 matches to one pixel, so that the light intensity of the laser beam spot represents the corresponding pixel tone.

The analog reading system 12 functions in the similar fashion to that shown in FIG. 2. Likewise, the laser light sources 13a, 14a, the photo-detector 13d, and the processing section 15 are the same as those shown in FIG. 2.

In the embodiment shown in FIG. 11, it is possible to employ a rotating polygon mirror, a ultrasonic deflector and a galvanomirror in place of the holographic scanners 13i and 14f. The holographic scanner may be used in place of the galvanomirrors 13j and 13g.

FIG. 12 shows another embodiment designed according to the concept of the invention shown in FIG. 10.

The present embodiment is substantially identical to the embodiment shown in FIG. 11 except the construction of the sensing means for sensing brightness of an optical image written in the light modulator 10. Concretely, the contrast control section 40 has means for adjusting intensity of light applied to the original in place of the means for sensing the input sensitivity of the light modulator 10.

The present embodiment uses the digital reading system 13 as means for sensing brightness of an optical image written in the light modulator 10.

The digital reading system 13 serves to generally sense brightness of a recorded image at wider scanning intervals of the laser beam. Then, it calculates an average value or a maximum value and a minimum one based on the sampling data about the brightness of each point for the purpose of extracting a representative value of brightness. For grasping the quantity of the reflected light in the light of the paper nature, it may be possible to focus the laser beam on the four corners of the image formed on the light modulator 10.

For widening the scanning intervals of the laser beam, it is necessary to lower a sampling frequency of the light-photo-detector 13d or increase the number of vibration of the holographic scanner 13i or the galvanomirror 13j.

As means for adjusting intensity of light applied to the original, there is provided a light source control circuit 40d for controlling luminous intensity of at least one of the light sources 11a, 11b and 11c. The light-source control circuit 40d is connected to the control section 17 shown in FIG. 10 so that the control section 17 can control the luminous intensity to match the brightness of the image written in the light modulator 10 to the dynamic range.

The embodiment shown in FIG. 11. may be used for sensing the brightness of the optical image written in the light modulator 10. Conversely, for sensing the brightness of the optical image written thereon, the embodiment shown in FIG. 11 may use the present method.

The foregoing embodiment thus makes it possible to constantly output a high-quality image independently of the original kind.

It means it is effective in compensating for a variation of a reflection factor according to each paper nature and reading information such as characters from the original 18. The embodiment can be used as means for correcting an image written in the light modulator 10 if it applies to an analog copying machine which writes an optical image on the light modulator 10 and projects the optical image on a photosensitive paper.

In addition, the foregoing technique, which controls the brightness of an image written in the light modulator 10 to match to the dynamic range, may be used for respectively controlling color images so that the image having different color tones from those of the original 18 can be written in the light modulator 10.

Figure 13:
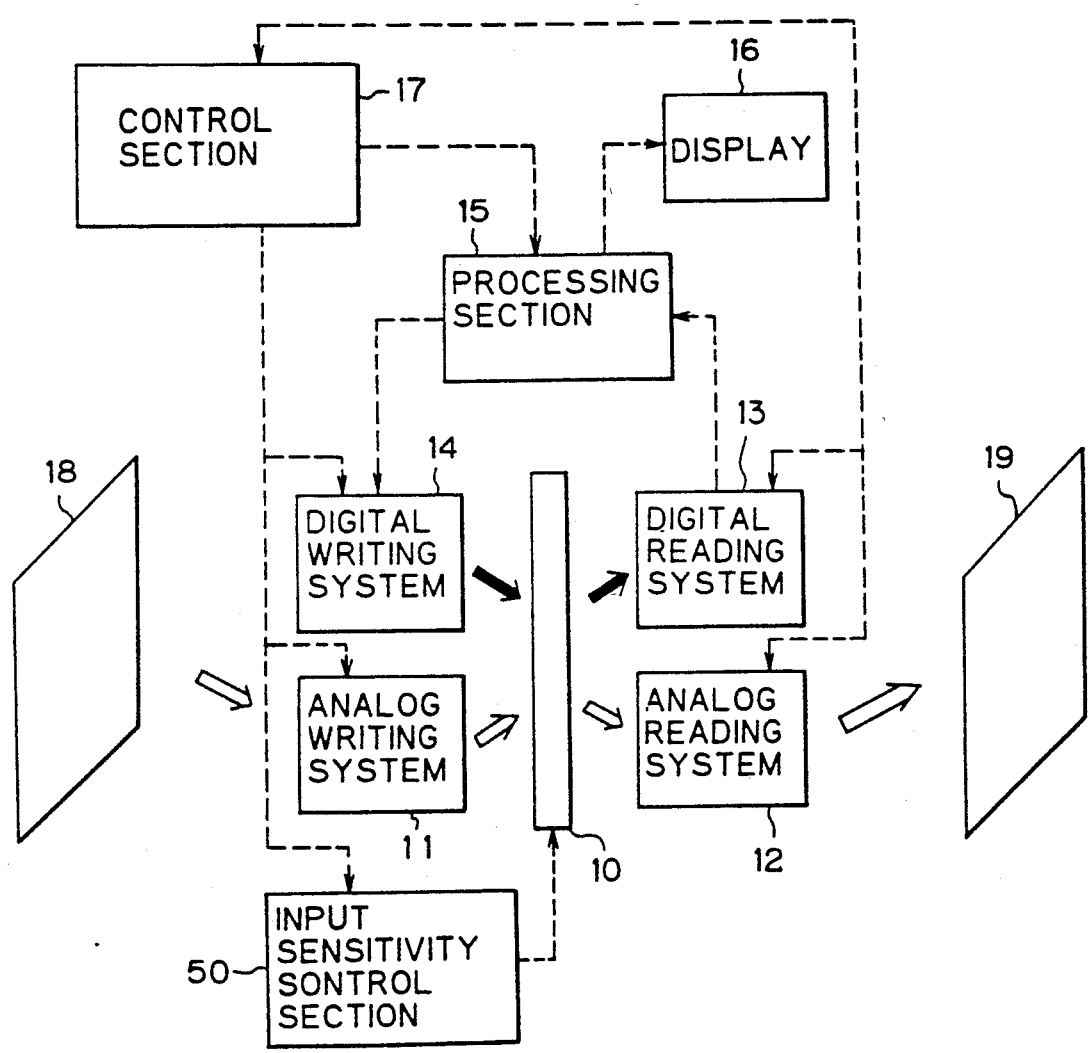
FIG. 13 is a block diagram showing basic arrangement of a color image editing, inputting and outputting apparatus according to another embodiment of the invention.

FIG. 13 shows the concept of a color-image editing, inputting and outputting apparatus designed according to the invention.

It will be apparent from the comparison between FIGS. 10 and 13 that this concept provides an input sensitivity control section 50 in place of the contrast control system 40. As mentioned with respect to the embodiment shown in FIG. 10, therefore, the other systems are identical to those shown in FIG. 13. As to the other systems, please refer to the description about the embodiment shown in FIG. 1. Herein, the input sensitivity control section 50, which is a feature of this embodiment, will be described.

The input sensitivity control section 50 is connected to the light modulator 10 and the control section 17 so that it can partially control input sensitivity of the light modulator 10. The input sensitivity control section 50 is used in combination of the light modulator 10 which is divided into a plurality of areas (to be described later) so that it control the voltage applied to each divided area for partially adjusting the input sensitivity of the light modulator 10.

Figure 14:
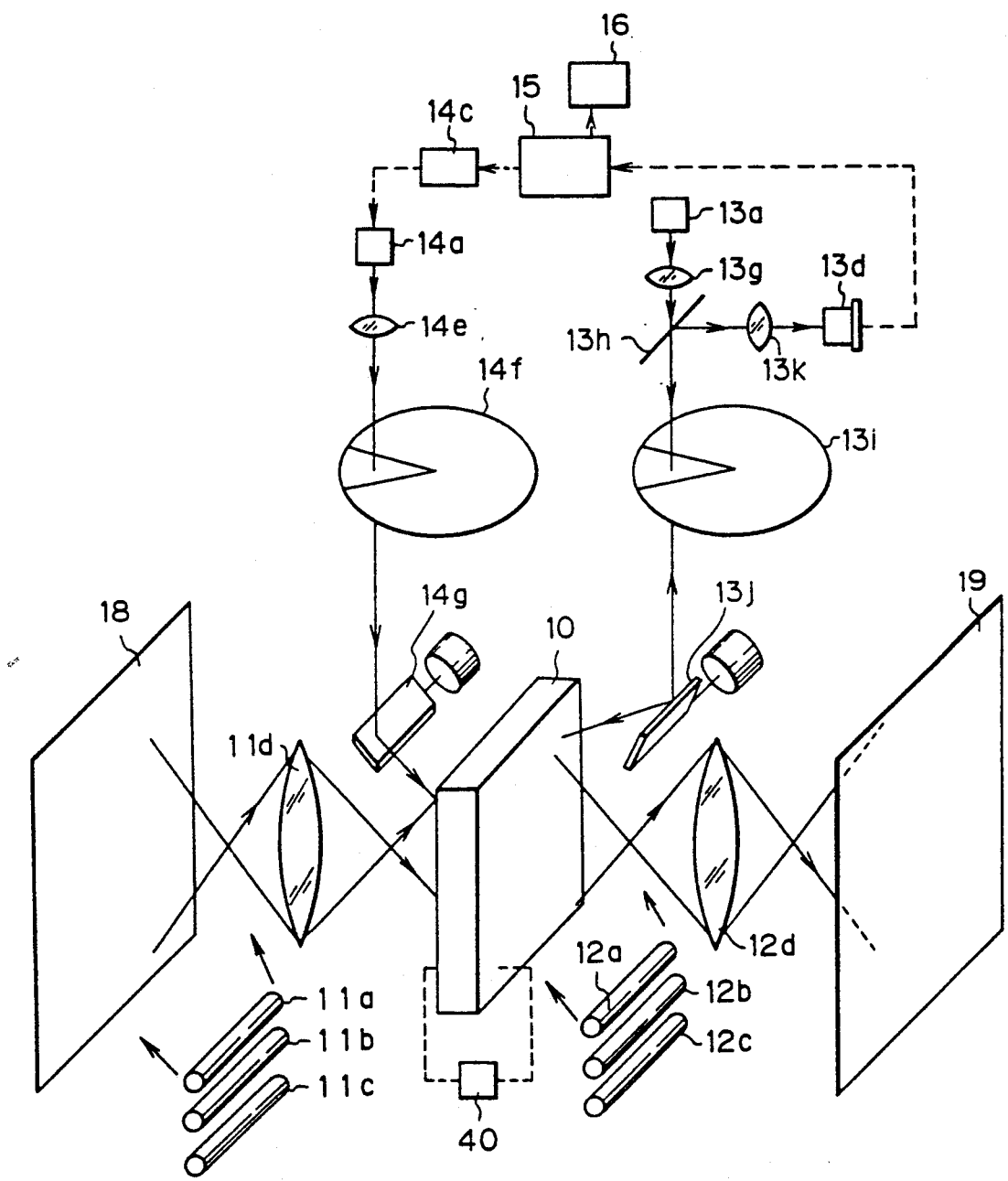
FIG. 14 is a view showing concrete arrangement of the embodiment shown in FIG. 13.

FIG. 14 shows the concrete arrangement of the embodiment shown in FIG. 13.

As shown in FIG. 14, the light modulator 10 often receives an optical image with ununiformity brightness, which results from a planar variation of light quantity emitted from light sources 11a, 11b, 11c and a characteristic of a lens 11d. And, the light modulator 10 may include a planar variation of sensitivity by itself. For overcoming the adverse factors causing the ununiformity brightness of the optical image, the input sensitivity control section 40 serves to partially adjust the applied voltage of the electrode included in the light modulator 10 so as to compensate for (shading-correct) ununiformity brightness. It results in allowing brightness information to be uniformly written in the overall light modulator 10.

As the light modulator 10 receives a higher voltage applied between the electrodes, it keeps a sensitivity to the incident light higher. As it receives a lower voltage, it keeps the sensitivity lower. By controlling the applied voltage, therefore, it is possible to adjust the input sensitivity of each area of the light modulator 10.

Figure 15:
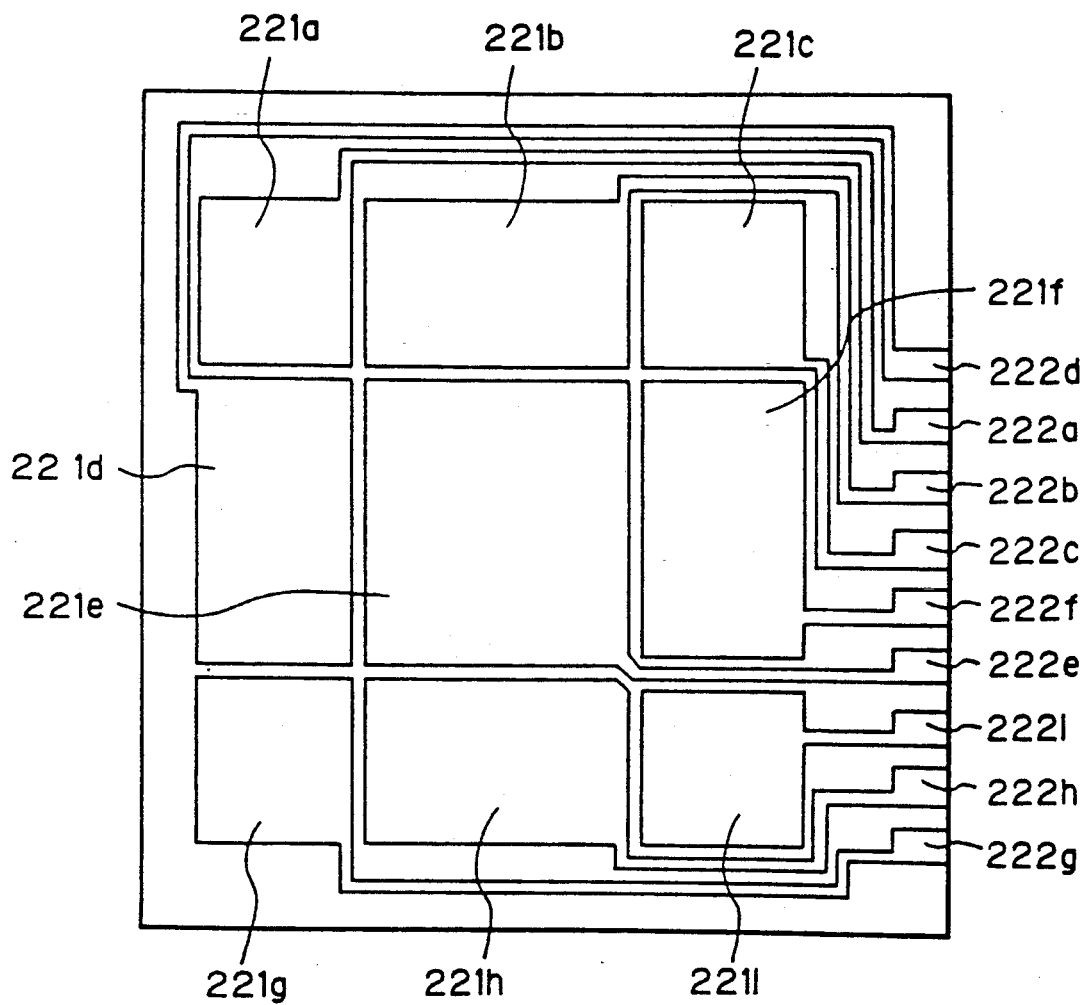
FIG. 15 is a view showing construction of an electrode of the light modulator included in the embodiment shown in FIG. 13.

FIG. 15 shows the area-divided electrode of the light modulator 10 to be used with the input sensitivity control section 50. As shown, the electrode 10c or 10d (see FIG. 20) is divided into nine (9) independent areas 221a, 221b, . . . 221i. These areas have the corresponding terminals 222a, 222b, . . . , 222i being respectively connected to a plurality of power supply lines (not shown) led from the input sensitivity control section 50. The input sensitivity control section 50 can independently supply a voltage to each area. The interval between both areas has to be smaller than the distance between the electrodes 10c and 10d, because a neutral zone may appear if the former is equal to or larger than the latter. The divided areas are arranged in a 3×3 pattern. However, it may be arranged in a 4×4 or other pattern. Each divided area can have an individual form and area.

In operation, the input sensitivity control section 50 applies a d.c. voltage between the electrodes 10c and 10d so that the charges are stored therebetween. Then, the input sensitivity control section 50 stops the application of the voltage between these electrodes. In this state, a planar optical image is projected to or an intensity-modulated laser beam is applied to the photoconductor material (to be described later) included in the light modulator 10 for forming an optical image.

It results in allowing the resistance to be distributed on the photoconductive material 10e (see FIG. 22) depending on how the light intensity is distributed. That is, the light-struck part of the photoconductive material 10e keeps the resistance lower, while the other part keeps the resistance high. Hence, the voltage depending on how the light intensity is distributed is applied to the liquid crystal (to be described later), thereby changing the molecular alignment of the liquid crystal and writing an optical image in the light modulator.

The voltage applied on each pixel of the liquid crystal determines how the liquid-crystal molecules are oriented. The voltage depends on the intensity of light applied to the photoconductive material and the voltage supplied by the input sensitivity control section 50. If, hence, the electrode 10c is divided into nine areas as shown in FIG. 15, the input sensitivity control section 50 functions to independently control the applied voltage at each area 221a, 221b, . . . , 221i so that the input sensitivity can be adjusted at each area.

This function makes it possible to compensate for ununiformity brightness of an input image written in the light modulator 10, which ununiformity brightness results from ununiformity lighting to the original or an optical characteristic of the image-forming lens system. Further, it can compensate for a variation of input sensitivity appearing in the light modulator 10, which variation results from an ununiformity characteristic of the photoconductive material.

Figure 16:
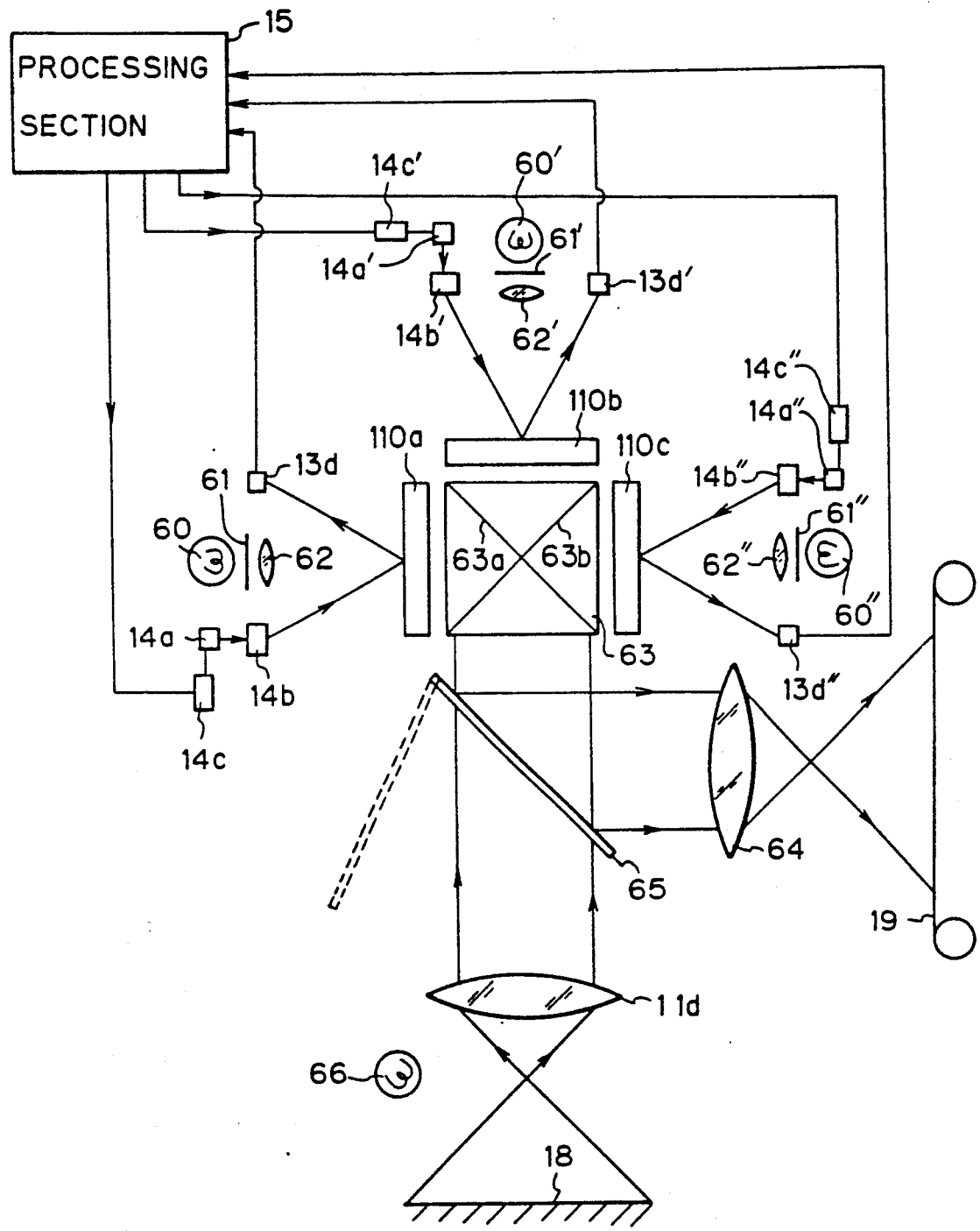
FIG. 16 is a view showing concrete arrangement of the embodiment shown in FIG. 1.

Next, the description will be directed to another embodiment of the color-image editing, inputting and outputting apparatus with reference to FIG. 16. The same components as those described in the foregoing embodiments have the same reference numbers and function in the similar manner to those described in the foregoing embodiments.

In FIG. 16, 110a, 110b and 110c respectively denote light modulators for R(red)-, G(green)- and B(Blue)-component images.

Each light modulator can temporarily store how the light intensity is distributed, that is, an optical image, because the transmittance, reflectance or phase distribution changes depending on how the intensity of the incident light is distributed in each light modulator. By applying another light beam to the light modulator storing the image, the light modulator outputs transmitted light, reflected light or scattered light modulated according to the two-dimensional image information stored in the light modulator. The sensing or exposure of the modulated light results in reading the written image.

The distribution of light intensity in the light modulators 110a, 110b and 110c may be any one of an analog image, that is, an optical image and a digital image formed with the modulated laser beam scanned in two dimensions. To read the image out of the light modulators 110a, 110b and 110c, uniform light is applied to the light modulators 110a, 110b and 110c for forming an analog image or a laser beam with certain intensity is emitted and scanned in two dimensions for forming a digital image.

In FIG. 16, 18 denotes an original to be lit by a white light source 66. The image reflected on the original 18 is image-formed through a lens 11d and struck to a dichroic mirror 63. The dichroic mirror 63 is an optical element serving as decomposing the incident light into three colors Red, Green and Blue or Cyan, Magenta and Yellow. For example, a R image is reflected on the plane 63a, a B image is reflected on the plane 63b, and a G image goes straight without being reflected.

The R image reflected on the plane 63a is struck to the light modulator 110a in which the R image is temporarily stored. At a time, the B and G images are respectively written in the light modulators 110b and 110c.

The lens 11d and the dichroic mirror 63 match to the analog reading system. The dichroic mirror 63 shown in FIG. 16 is an integral type. However, it may be a divisional type consisting of several components. For a mechanism for color decomposition, another component like a filter may be used in place of the dichroic mirror.

The digital reading system for digitally reading the images out of the light modulators 110a, 110b and 110c includes three laser-modulating circuits 14c, 14c' and 14c", three laser beam sources 14a, 14a' and 14a", three laser beam scanning systems 14b, 14b' and 14b", and three photo-detectors 13d, 13d' and 13d", each of which matches to each of the light modulators 110a, 110b and 110c.

The laser-modulating circuits 14c, 14c' and 14c", and the photo-detectors 13d, 13d' and 13d" are electrically connected to the processing section 15.

Then, the description will be directed to how the digital reading system works with respect to the R image.

The laser beam source 14a applies a laser beam with constant light intensity to the laser beam scanning system 14b in which the laser beam is deflected vertically and horizontally. The deflection means that the laser beam is scanned on the light modulator 110a in two dimensions. Then, the light modulator 110a outputs transmitted light, reflected light or scattered light modulated depending on the image information at each pixel matched to the laser beam spot to the photo-detector 13d in which the light is converted into an electric signal. The photoelectric image information is transmitted to the processing section 15.

The foregoing operation allows the R image written in the light modulator 110a to be time-serially read out.

The same operation is carried out for the G and B images at the same time.

The digital writing system for digitally writing an image on the light modulating elements 110a, 110b and 110c use three laser-modulating circuits 14c, 14c' and 14c" three laser beam sources 14a, 14a' and 14a", three laser beam scanning systems 14b, 14b' and 14b", and three photo-detectors 13d, 13d' and 13d" which match to the digital reading system as mentioned above.

Then, the description will be directed to how the digital writing system works with respect to the R image.

The processing section 15 applies a digital image signal to the laser-modulating circuit 14c which serves to modulate the intensity of a laser beam emitted from the laser beam source 14a. The light intensity of the laser beam represents the gradation of a pixel matched to a laser beam spot. Then, the laser beam is applied to the laser beam scanning system 14b in which it is deflected vertically and horizontally. The deflection means that the laser beam is scanned on the light modulator 110a in two dimensions. The laser-modulating circuit 14c works in synchronism to the laser beam scanning system 14b.

This operation allows the digital image to be written in the light modulator 110a.

The same operation is carried out for the G and B images at the same time.

The analog reading system for analogously reading the images written in the light modulators 110a, 110b and 110c includes three white light sources 60, 60' and 60", R, G and B transparent type color filters 61, 61' and 61", lenses 62, 62' and 62", a movable mirror 65, and a lens 64.

The white light emitted from the white light sources 60, 60' and 60" is transformed into each specific spectrum light through the R, G and B color filters 61, 61' and 61". Then, the specific spectrum light is applied to the light modulators 110a, 110b and 110c through the lenses 62, 62' and 62".

This operation allows the R, G and B images stored on the light modulators 110a, 110b and 110c to be read out at a time. The read R, G and B images are applied to the dichroic mirror 63 in which these images are composed.

The composed color image is reflected on the movable mirror 65 and reaches the photosensitive paper 19 through the lens 64. The image is formed and exposed on the paper 19. The developing of the photosensitive paper 19 results in obtaining a hardcopy.

In addition, the color filters 61, 61' and 61" are not essentially required.

The movable mirror 65 is located in the state shown by a broken line of FIG. 16 in analogously writing the image and is located in the state shown by a real line of FIG. 16 in analogously reading the image.

The description is left out about the laser beam sources 14a, 14a' and 14a", the laser beam scanning systems 14b, 14b' and 14b", the photo-detectors 13d, 13d' and 13d", the laser-modulating circuits 14c, 14c' and 14c", and the processing section 15, because they have been described with respect to the foregoing embodiments shown in FIGS. 2 to 5.

The construction shown in FIG. 16 can apply to a color image scanner. In this case, naturally, the color image scanner substantially functions in the similar manner. Hence, the description about the color image scanner will be left out except an optical reading system which is important in the color image scanner.

The resolution of the color image scanner is defined by a spot diameter of the laser beam. If the laser beam source employs a laser diode, the beam spot diameter may be reduced to 10 $\mu$m. Since the signal read at one spot matches to one-pixel information, the light modulator needs only 50×50 mm of effective area if the image scanner is designed to have a resolution consisting of 5000×5000 pixels. Hence, the scanning area of the laser beam is defined by only 50×50 mm. It indicates that the scanning system can be designed far more easily.

Figure 17:
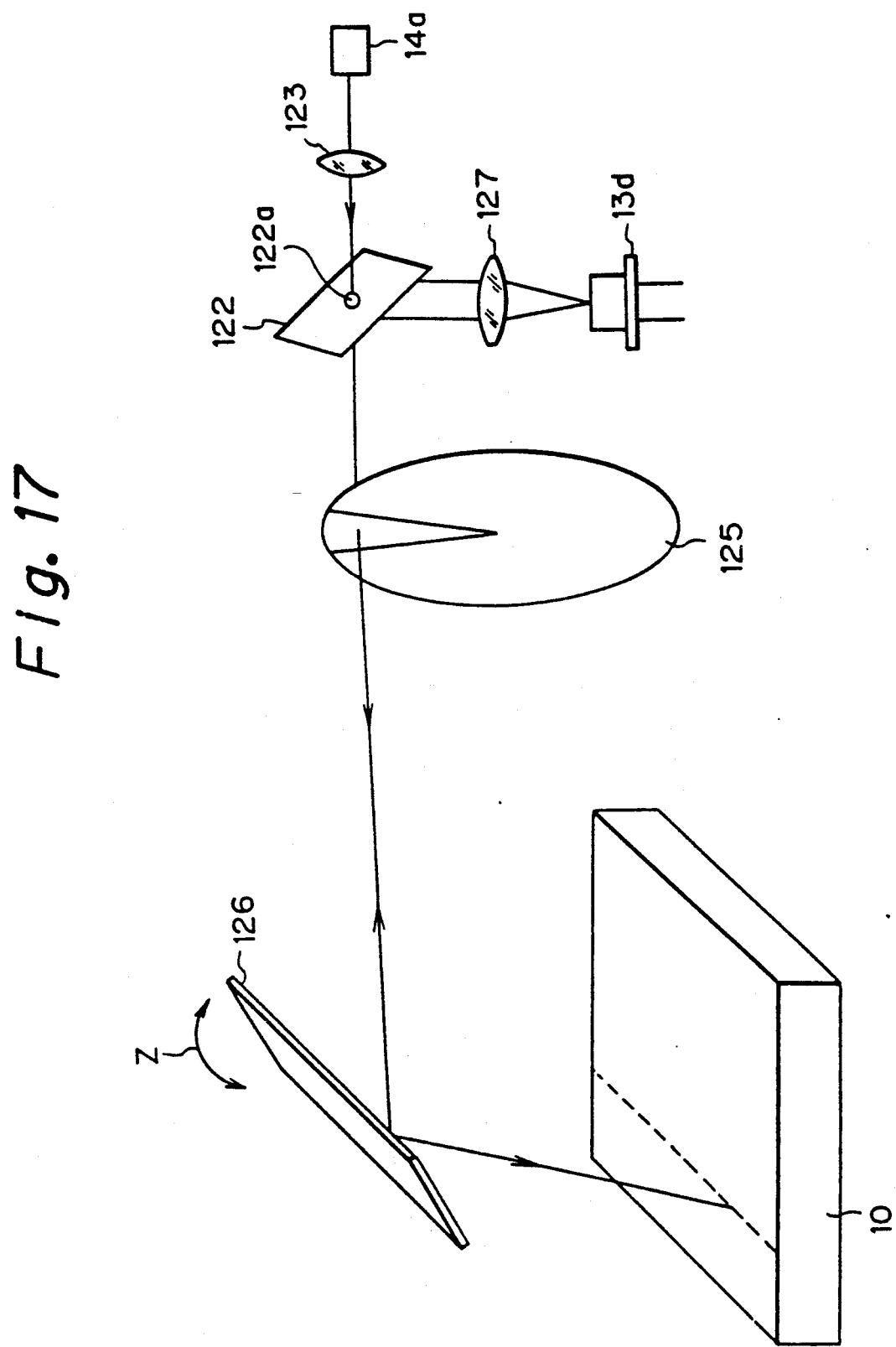
FIG. 17 is a view showing concrete arrangement of an optical reading system of a color image scanner to which the embodiment shown in FIG. 13 is applied.

If the resolution is designed to have 5000×5000 pixels, the reading speed can be estimated on the optical reading system shown in FIG. 17.

According to this system, the system, the laser beam emitted from a laser beam source 14a is converted into parallel ray through a lens 123. Then the parallel ray is applied to a hologram disk 125 included in the main-scan section through a hole 122a of a mirror 122 with a hole. The hologram disk 125 includes a plurality of hologram lens attached thereon. Each hologram lens has an image-forming function toward the main-scanning direction. By rotating the hologram disk 125, therefore, the parallel laser beam is allowed to be scanned in the main-scanning direction.

The laser beam deflected in the main-scanning direction is applied onto a galvanometer 126 which can move in a stepwise manner in Z direction shown in FIG. 17. Then the deflected laser beam is also deflected toward the sub-scanning direction by the galvanometer 126, and is allowed to be scanned on the light modulator 10 in the sub-scanning direction orthogonal to the main-scanning direction.

The light modulated by the light modulator 10 reversely passes through the galvanometer 126, the hologram disk 125 and the hole 122a, and reaches a lens 127 in which the light is focused. Then, the focused light is traveled to the Photo-detector 13d.

As shown, one hologram disk 123 provides twelve hologram lens therearound, one lens of which matches to the main-scanning of one line. Hence, one rotation of the hologram disk 123 allows twelve lines to be read out. By rotating the hologram disk 123 at 1200 rpm, therefore, the image information of one screen (5000 lines) can be read for only 1.25 second. The present embodiment provides three, R, G and B combinations of the optical reading system mainly consisting of the laser beam source, the laser beam scanning system and the photo-detecting system, so that the color image information for one screen can be read at so high a speed as 1.25 second.

The combinations of the optical reading system and the light modulating element is not limited to three but may be any number more than one.

Figure 18:
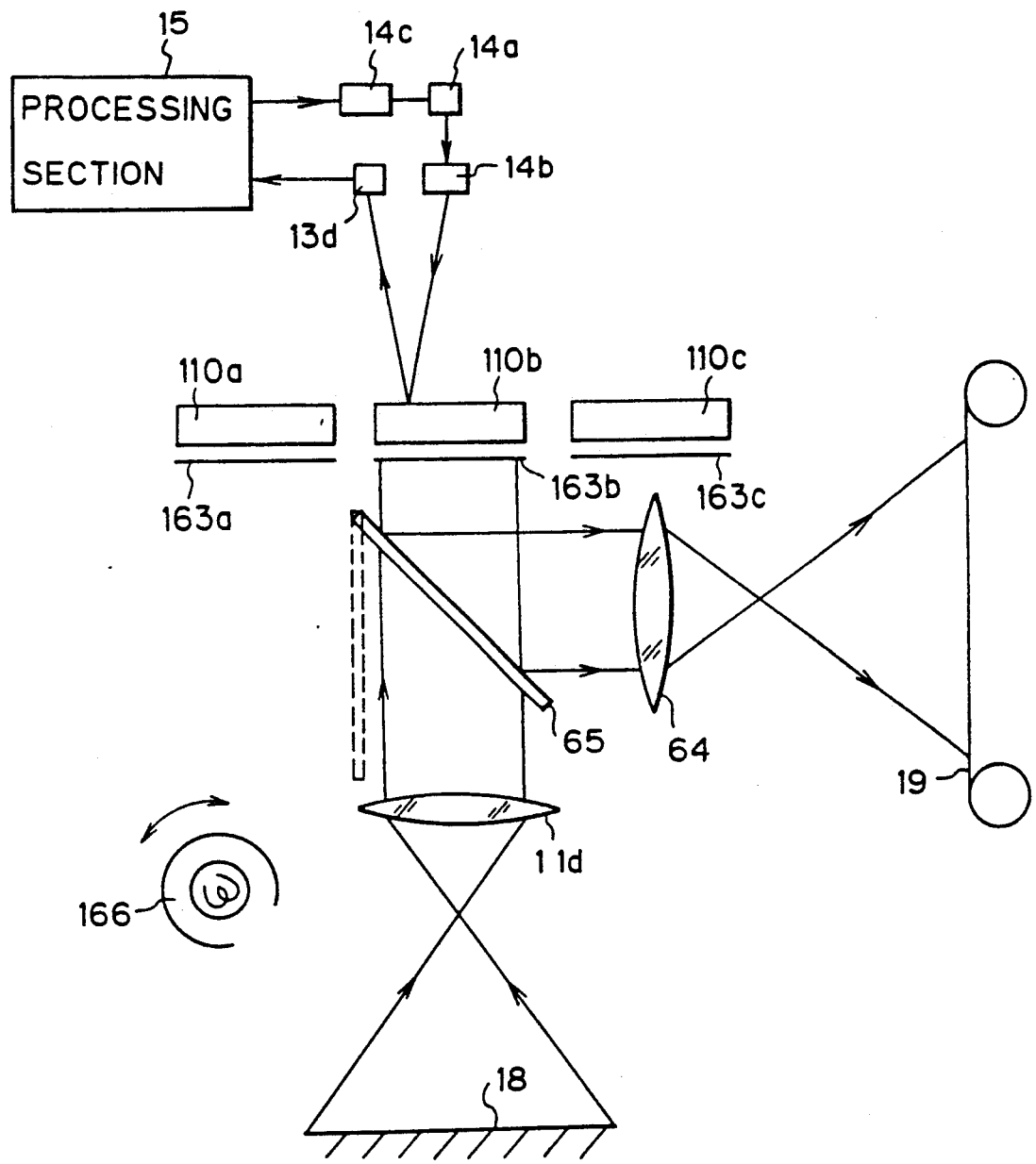
FIG. 18 is a view showing other concrete arrangement of the embodiment shown in FIG. 1.

FIG. 18 shows another embodiment of the color-image editing, inputting and outputting apparatus.

In FIG. 18, the same components as those in FIG. 16 have the same reference numbers and function in the similar manner to those shown in FIG. 16.

The light modulators 110a, 110b and 110c are attached on a rotary body (not shown). As the rotary body rotates, these light modulators are sequentially moved to the writing or reading position (the shown position). This embodiment provides three light modulators, though, more light modulators may be provided (a multiple of 3 is preferable).

Further, these light modulators 110a, 110b and 110c may be attached on a linearly-moving body in place of the rotary body.

The light modulators 110a, 110b and 110c have Red, Green, Blue or Cyan, Magenta, Yellow filters 163a, 163b and 163c respectively fixed on these light modulators.

The white light source 166 gives lightning to the original 18 on which the image is reflected. The reflected image is image-formed through the effect of the lens 11d and then entered into one of the light modulators 110a, 110b and 110c in which the image is temporarily stored. The white light source 166 is allowed to rotate so as to change the emitting direction.

The digital reading system for digitally reading the images out of the light modulators 110a, 110b and 110c and the digital writing system for digitally writing the processed images on the light modulators 110a, 110b and 110c, both uses one combination of a laser-modulating circuit 14c, a laser beam source 14a, a laser beam scanning system 14b, and the photo-detector 13d. The laser-modulating circuit 14c and the photo-detector 13d are electrically connected to the processing section 15.

The digital reading and the digital writing operations are substantially the same as those of the embodiment shown in FIG. 16. This embodiment, however, provides just one combination of the digital reading and writing systems. The light modulators 110a, 110b and 110c are required to sequentially move to the writing or reading positions.

The analog reading operation takes the steps of lightning the light modulator as changing the emitting direction of the white light source 166 and image-forming and exposing the reflected image given by the light modulator located at the writing or reading positions on a photosensitive paper 19 through a lens 64. Each image of R, G and B are exposed on the photosensitive paper 19 three times as sequentially moving the light modulators 110a, 110b and 110c to the writing and reading positions. The developing of the exposed photosensitive paper 19 results in obtaining a hardcopy.

The movable mirror 65 is moved to the state shown by a broken line of FIG. 18 in analogously writing the image and moved back to the state shown by a real line in analogously reading the image.

If the color image is printed on more than one paper, it is necessary to sequentially expose three images reflected on the light modulators 110a, 110b and 110c onto the photosensitive paper 19 per one paper. Since the R, G and B images are respectively stored on the light modulators 110a, 110b and 110c, it is necessary to just repeat the exposure of the images onto the photosensitive paper 19 as the light modulators 110a, 110b and 110c are sequentially being switched the necessary times without having to repeat the initial to the final steps.

More light modulators enable various images to be stored thereon, thereby allowing various color images to be rapidly printed.

In addition, the embodiment shown in FIG. 18 applies to an image scanning device like the embodiment shown in FIG. 16.

Figure 19:
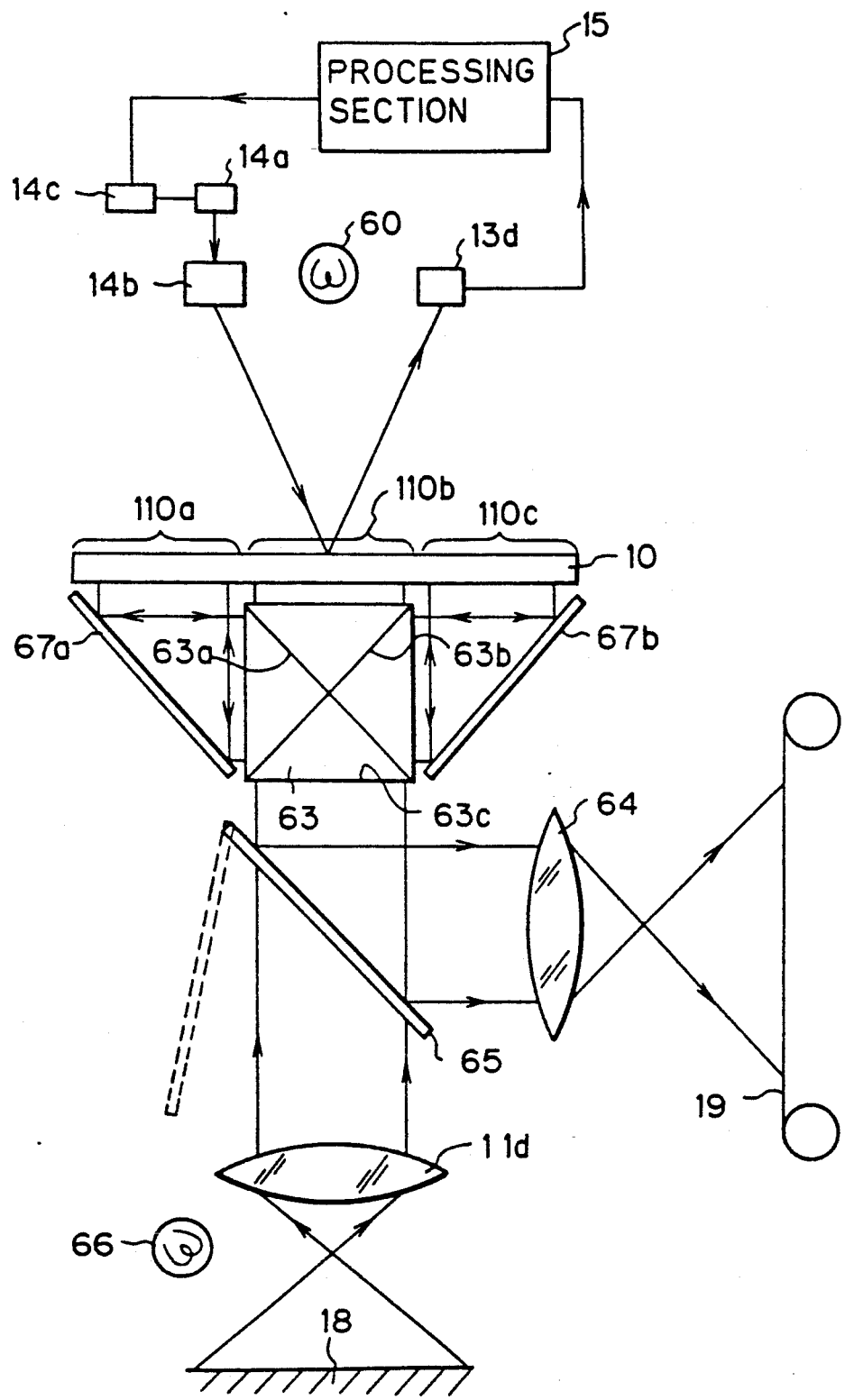
FIG. 19 is a view showing the other concrete arrangement of the embodiment shown in FIG. 1.

Next, the description will be directed to another embodiment of a color image editing, inputting and outputting apparatus with reference to FIG. 19. This embodiment is designed to provide a single light modulator having three regions in place of three light modulators included in the embodiment shown in FIGS. 16 and 18. Hence, the same components as those described in the foregoing embodiments have the same reference numbers and function in the similar manner. The description about those components will be left out.

In FIG. 19, 10 denotes a single tabular light modulator having three different regions 110a, 110b and 110c, which respectively match to a red-, a green- and a blue-component images.

The light modulator 10 can temporarily store how the light intensity is distributed, that is, an optical image, because the transmittance, reflectance or phase distribution changes depending on how the intensity of the incident light is distributed in the light modulator. By applying another light beam to the light modulator storing the image, the light modulator outputs transmitted light, reflected light or scattered light modulated according to the two-dimensional image information stored in the light modulator. The sensing or exposure of the modulated light results in reading the written image.

The distribution of light intensity on the light modulator 10 may be any one of an analog image, that is, an optical image and a digital image formed with the modulated laser beam scanned in two dimensions. To read the image out of the light modulator, uniform light is applied to the light modulator for forming an analog image or a laser beam with certain intensity is emitted and scanned in two dimensions for forming a digital image.

18 denotes an original to be lit by a white light source 66. The image reflected on the original 18 is image-formed through a lens 11d and struck to a dichroic mirror 63.

The dichroic mirror 63 is an optical element serving as decomposing the incident light into three colors Red, Green and Blue or Cyan, Magenta and Yellow. For example, a R image is reflected on the plane 63a, a B image is reflected on the plane 63b, and a G image goes straight without being reflected.

The R image reflected on the plane 63a is struck to one region 110a of the light modulator 10 in which the R image is temporarily stored. At a time, the B image reflected on the plane 63b is reflected on a mirror again. Then, the reflected B image is temporarily stored on another region 110c of the light modulator 10. Likewise, the G image is temporarily stored on the other region 110b of the light modulator 10.

To write a moving image on the light modulator 10, it is necessary to provide between the original 18 and the dichroic mirror 63 a shutter which allows the image reflected on the original 18 to be temporarily shut.

The analog writing system matches to a lens 65, the dichroic mirror 63 and mirrors 67a, 67b.

The digital reading system for digitally reading images out of the regions 110a, 110b and 110c of the light modulator includes a laser beam source 14a common to these regions, a laser beam scanning system 14b, a laser modulating circuit 14c and a photo-detector 13d.

The photo-detector 13d is electrically connected to a processing section 15.

The laser beam source 14a emits a laser beam with constant light intensity to the laser beam scanning system 14b in which the laser beam is deflected vertically and horizontally. The deflection means that the laser beam is scanned on the regions 110a, 110b and 110c of the light modulator 10 in two dimensions. Then, the light modulator 10 outputs transmitted light, reflected light or scattered light modulated depending on the image information at each pixel matched to the laser beam spot to the photo-detector 13d in which the light is converted into an electric signal. The photoelectric image information is transmitted to the processing section 15.

By scanning the region 110a of the light modulator 10 in two dimensions, the R image information is allowed to be time-serially read out. The G image is read out of the region 110b and the B image is read out of the region 110c.

The digital writing system for digitally writing an image on the regions 110a, 110b and 110c of the light modulator 10 use the laser-modulating circuit 14c, the laser beam source 14a, the laser beam scanning systems 14b, and the photo-detector 13d, which match to the digital reading system as mentioned above.

Then, how the digital writing system works with respect to the R image will be described.

The processing section 15 applies a digital image signal to the laser-modulating circuit 14c which serves to modulate the intensity of a laser beam to be emitted from the laser beam source 14a. The light intensity of the laser beam represents the tone of a pixel matched to a laser beam spot. Then, the laser beam is applied to the laser beam scanning system 14b in which it is deflected vertically and horizontally. The deflection means that the laser beam scans the light modulator 10 in two dimensions. The laser-modulating circuit 14c works in synchronism to the laser beam scanning system 14b.

The R digital image is written in the region 110a of the light modulator 10. The G and B digital images are respectively written in the regions 110b and 110c.

The analog reading System for analogously reading the images written in the regions 110a, 110b and 110c of the light modulator 10 includes the white light source 60, the dichromic mirror 63, the movable mirror 65, and the lens 64.

The white light emitted from the white light source 60 travels to the overall plane of the light modulator 10, when the R, G and B images stored on the regions 110a, 110b and 110c of the light modulator 10 are read out at the same time. In this case, each read image is a projection of white color and is directly reflected on the mirror 67a or 67b so that these R, G and B images are applied to the dichromic mirror 63.

The R-image projected on the region 110a is reflected on the plane 63a of the dichromic mirror 63, resulting in allowing a Red projection to reach the plane 63c. The B-image projected on the region 110c is reflected on the plane 63b of the dichromic mirror 63, resulting in allowing a blue projection to reach the plane 63c. The G-image projected on the region 110b directly passes through the region 63b and reaches the plane 63c. The R, G and B images stored on the regions 110a, 110b and 110c are applied as the red, green and blue projections to the plane 63c of the dichromic mirror 63 on which these projections are synthesized for outputting a color image.

The synthesized color image reaches the movable mirror 65 by which the image is oriented to the photosensitive paper 19 through the lens 64 on which paper the image is formed. Then, the developing of the photosensitive paper 19 results in obtaining a hardcopy.

The movable mirror 65 is located in the state shown by a broken line of FIG. 19 in analogously writing the image and is located in the state shown by a real line of FIG. 19 in analogously reading the image.

As set forth above, the color image editing, inputting and outputting apparatus designed according to this embodiment can deal an image on which an analog image and a digital image are mixed and melt. In particular, the single light modulator 10 includes three different regions 110a, 110b and 110c respectively matching to three colors of R, G and B, thereby allowing three images to be concurrently processed. Hence, the image input, edition and output are carried out very rapidly. One analog reading allows the R, G and B images to be concurrently exposed on the photosensitive paper. It results in allowing the same color image to be printed on two or more papers for a very short time and with ease.

In addition, the embodiment shown in FIG. 19 may apply to the image scanning device as well.

Next, the description will be directed to the light modulator 10 which is the other feature of the invention.

Figure 20:
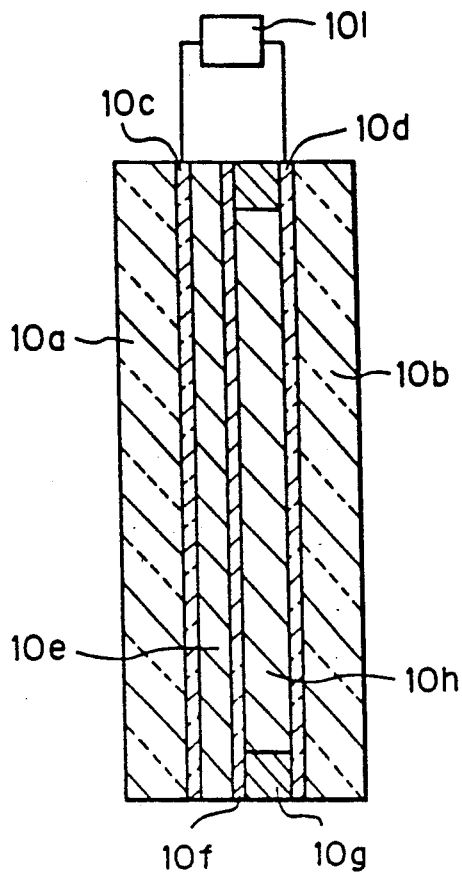
FIG. 20 is a section view showing construction of a light modulator.

FIG. 20 is a section view showing one arrangement of the light modulator 10.

As shown, 10a and 10b denote glass plates located on both sides of the light modulator 10. 10c and 10d denote transparent electrodes, which are preferably made of an Indium-Tin Oxide (ITO) film. These electrodes are respectively laminated on the inner surfaces of the glass plates 10a and 10b. On the inner side of the electrode 10c are serially laminated a photoconductive material 10e and a light-shielding film 10f. Between the electrode 10d and the light-shielding film 10f is inserted a spacer 10g. The space defined by the electrode 10d, the light-shielding film 10f and the spacer 10g contains liquid crystal 10h sealed therein. The electrodes 10c and 10d are connected to a power source 10i.

The light-shielding film 10f is provided to prevent the laser beam from being intruded into the photoconductive material 10e when reading image information from the light modulator 10. This is because the laser beam serves to erase the information stored in the photoconductive material 10e unless the liquid crystal has a storage function. The suitable film as the light-shielding film 10f is an electrically-insulated nontransparent film, for example, a mirror made of a dielectric material such as SiO.

Figure 21:
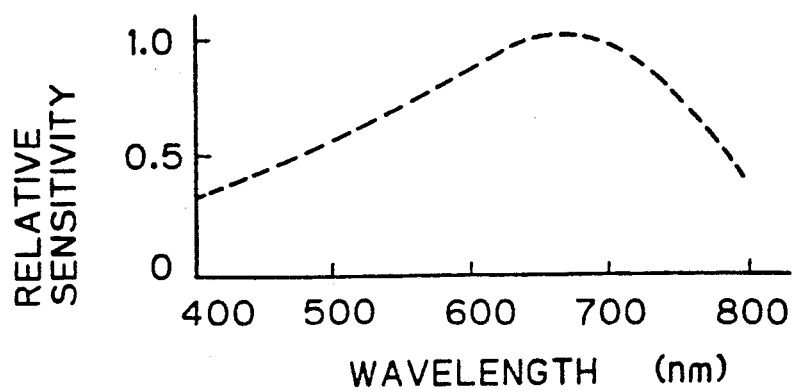
FIG. 21 is a graph showing a wavelength sensitivity of the photoconductive material which is employed the light modulator.

The photoconductive material 10e employs cadmium sulfide (CdS), cadmium telluride (CdTe), selenium (Se), zinc sulfide (ZnS), bismuth silicon oxide (BSO), amorphous silicon, organic photoconductive material, or the like. For handling a color image, the amorphous silicon is the best choice, because the amorphous silicon has a flat wavelength sensitivity in the overall range of the visible light. For reference, the wavelength sensitivity is shown in FIG. 21.

The photoconductive material 10e has a property of changing its resistance depending on the received light. With this property, the photoconductive material 10e changes molecular orientation of the liquid crystal depending on the received light. In place of the photoconductive material 10e, another material may be used such as a material for generating a voltage depending on the received light (for example, a solar cell), a material for generating current depending on the received light, a material for generating heat depending on the received light, or a material for changing the molecular structure depending on the received light (for example, photochromic compound). The materials for generating heat and changing the molecular structure serve to change molecular orientation of the liquid crystal with no use of electricity.

The glass plates 10a and 10b are transparent and function as sealing the liquid crystal 10h. In place of the glass plate, hence, a transparent plastic or ceramic plate may be used.

As the liquid crystal 10h, the present structure employs nematic liquid crystal. In place of it, however, smectic liquid crystal or mixture of the nematic liquid crystal and the smectic liquid crystal may be used. The used electric-optical effects are such as a dynamic scattering effect, a liquid-crystal birefringence effect, a twisted nematic effect, a hybrid electric-field effect (mixture of the birefringence effect and the twisted nematic effect).

The birefringence effect, the twisted nematic effect or the hybrid electric-field effect requires radiation of a linearly-polarized laser beam (for digital reading) and uniform light (for analog reading) to the light modulator when reading information. The light reflected from the light modulator is applied to the photo-detector through a polarizing plate (for digital reading) or projected onto the recording paper through the polarizing plate (for analog reading).

Then, the description will be directed to the writing and reading operations performed when the hybrid electric-field effect is used with the nematic liquid crystal.

When no light reaches the light modulator 10, that is, the photoconductive material 10e keeps the resistance high, the power source 10i is connected between the electrodes 10c and 10d for applying a d.c. voltage therebetween, thereby storing charges in the space between the electrodes 10c and 10d. Then, the power source 10i is disconnected. In this state, when an optical image is struck on the photoconductive material 10e consisting of an image-writing plane from the glass plate 10a, the photoconductive material 10e starts to distribute resistance depending on how the light intensity is distributed. It results in applying to the liquid crystal 10h the electric field distributed depending on how the resistance is distributed, thereby changing the orientation of liquid-crystal molecules, capturing the input image and writing it on the photoconductive material 10e.

Next, the description will be directed to how to overwrite the analog-written image on the digital-written image or vice versa.

If the subject digital image does not have tone and the colors R, G and B are respectively represented by two values or some, it can be directly overwritten in the analog image or vice versa.

If the subject digital image has tone, at first, it is necessary to take the steps of writing the analog image on the photoconductive material 10e, erasing part of the analog image to be overlapped with the digital image, and overwriting the digital image on the analog image. For erasing the part of the analog image, concretely, it is necessary to cause short-circuit between the electrodes 10c and 10d and uniformly apply the laser beam with constant intensity to the part of the analog image to be overlapped with the digital image. It results in lowering the resistance of the part to which the laser beam is applied removing the stored charges stored on the part, and returning the orientation of liquid-crystal molecules of the part to an initial state.

Then, the further steps are taken of applying d.c. current between the electrodes 10c and 10d to store charges in the space therebetween and causing the laser beam to be scanned on the analog-image-erased part. It results in changing the orientation of liquid-crystal molecules of the part depending on the light intensity, that is, writing the digital image having gradation on that part.

To erase all the image written in the light modulator 10, it is necessary to apply uniform light on the overall plane of the photoconductive material 10e in the state of short-circuiting between the electrodes 10c and 10d.

The image is read out of the light modulator 10 with the linearly-polarized light applied from the glass plate 10b opposite to the writing side of the glass plate 10a.

In an image-reading system, a polarizing plate (not shown) is located on the path of the reflected light. The polarizing plate serves to polarize the reflected light orthogonally to the polarizing direction of the incident light. Concretely, in the digital reading system, the polarizing plate is located before the photo-detector 13d and, in the analog reading system, is located before the lens 11d in a manner to be orthogonal to the linearly-polarized light.

For the liquid crystal on which no image is written, the linearly-polarized light passes through the liquid crystal 10h and is reflected on the light-shielding film 10f (dielectric mirror) as keeping the light unchangeable by virtue of the twisted nematic effect of the liquid crystal 10h. Hence, the reflected light is disallowed to pass through the polarizing plate.

On the other hand, for the liquid crystal on which an image is written, the voltage depending on the light intensity has been applied to the image-written part of the liquid crystal. Hence, the birefringence effect occurs on that part so that the applied linearly-polarized light becomes elliptic while the linearly-polarized light passes through the liquid crystal 10h. The elliptic light is reflected on the light-shielding film 10f and then passes through the polarizing plate. The resulting light has the light intensity proportional to that of the input image. That is, the digital reading system applies the linearly-polarized laser beam to the light modulator 10 so that the linear beam is transformed into the elliptic beam for representing the pixel information at the beam spot while the beam passes through the liquid crystal 10h. Then, the transformed beam is reflected on the light-shielding film 10f and passes through the polarizing plate in which it is converted to the change of light intensity.

When the analog reading system applies the linearly-polarized light to the light modulator 10, the similar modulation occurs at each pixel located on the image-written part, resulting in allowing the analog image to be read out of the light modulator 10.

Next, the description will be directed to the light modulator in which employed is the liquid crystal having a storage function.

As the liquid crystal having a storage function, herein, there exists mixed liquid crystal consisting of the nematic liquid crystal and cholesteric liquid crystal, both of which are mixed at a weight rate of about 9 to 1. When a low-frequency (about 100 Hz) a.c. voltage is applied to the mixed liquid crystal, the mixed liquid crystal enters into a dynamic-scattering mode in which an emulsoidal state occurs. This state is kept and stored after the applied voltage is interrupted. This property is applied to the light modulator.

In writing an image, an optical analog image or a laser beam is applied to the light modulator together with the low-frequency (about 100 Hz) voltage applied thereon. It results in lowering the resistance of the beam-applied part of the photoconductive material 10e so that the voltage is applied to the liquid crystal matched to the part. The applied voltage causes the liquid-crystal molecules to enter into a turbulent state. Upon finishing the writing of the image, the low-frequency voltage is stopped and the electrode 10c is short-circuited with the electrode 10d so that the charges left in these electrodes 10c and 10d are removed.

In reading the image, when the light is struck onto the liquid crystal from the outside, the turbulent-state part of the liquid crystal works to scatter the light. Then, by catching the scattered light, it is possible to read out the written information. Concretely, the digital reading system applies a laser beam to the liquid crystal and receives the scattered light reflected from the liquid crystal with the photo-detector. The analog reading system applies parallel ray to the liquid crystal and forms an image transmitted by the scattered light on the recording paper.

Next, the description will be directed to how to overwrite an analog image on a digital image or vice versa.

If the subject digital image does not have gradation and the colors R, G and B are respectively represented by two values or some, the digital image can be directly overwritten in the analog image or vice versa with the low-frequency voltage being applied to the liquid crystal.

If, on the other hand, the subject digital image has tone, it is necessary to take the steps of writing an analog image, erasing part of the analog image to be overlapped with the digital image, and overwriting the digital image on the analog image. Concretely, the step of erasing the analog image includes applying a voltage having a more frequency (700 Hz, for example) than that traceable by the liquid crystal between the electrodes 10c and 10d and uniformly applying a laser beam with constant intensity to the digital-image-written part. It results in lowering the resistance of the defined photoconductive material 10e matched to the laser-beam-applied part and allowing the voltage to be applied only on that part. Hence, the liquid crystal molecules of the portion is returned into the original orientation, that is, the part of the analog image to be overlapped with the digital image is erased. Then, with a low-frequency (about 100 Hz) voltage being applied between the electrodes 10c and 10d, the laser beam is scanned on the light modulator 10 for writing the digital image.

For erasing the overall image written in the light modulator 10, it is necessary to apply a high-frequency (700 Hz, for example) voltage between the electrodes 10c and 10d and apply uniform light to the overall plane of the photoconductive material 10c.

When the light modulator 10 uses the mixed liquid crystal having a storage function, no writing is realized if neither of light and voltage are applied to the photoconductive material 10e at a time. It means that the written image is not subject to change if the reading laser beam or uniform light is applied to the photoconductive material 10e. It means that the light-shielding film 10f as illustrated in the structure of FIG. 20 is not an essential component. Hence, the light modulator 10 can be a transparent type having no light-shielding film or a reflective type having a light-shielding film. The former system is allowed to apply a reading laser beam to any one of the glass plates 10a and 10b. The latter system is allowed to apply a reading laser beam to the side to which the writing laser beam is applied, that is, the glass plate 10a. It results in providing great allowance to the reading optical system. It means that both the digital writing system and reading systems can use the almost components of the optical system as shown in FIG. 4.

Figure 22:
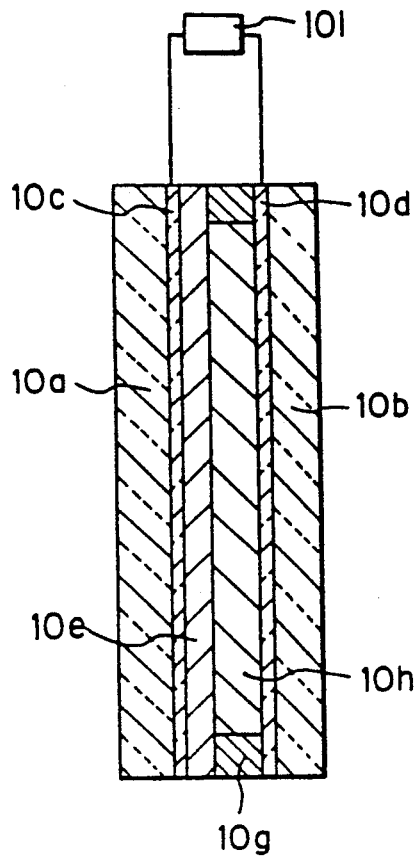
FIG. 22 is a section view showing other construction of the light modulator.

FIG. 22 is a sectional view showing another structure of the light modulator 10 having a storage function. The same components as those shown in FIG. 20 have the same reference numbers and function in the similar manner.

As shown, 10a and 10b denote glass plates located on both ends of the modulating element 10. 10c and 10d denote transparent electrodes, which are preferably made of an Indium-Tin-Oxide (ITO) film. These electrodes are respectively laminated on the inner surfaces of the glass plates 10a and 10b. On the inner side of the electrode 10c is serially laminated a photoconductive material 10e. Between the electrode 10d and the photoconductive material 10e is inserted a spacer 10g. The space defined by the electrode 10d, the photoconductive material 10e and the spacer 10g contains liquid crystal 10h sealed therein. The electrodes 10c and 10d are connected to a power source 10i.

The materials of the photoconductive material 10e and the glass plates 10a and 10b have been already described with respect to the structure shown in FIG. 20. Hence, the description will be directed to the liquid crystal 10h which characterizes this structure shown in FIG. 22.

The liquid crystal 10h is a phase-transition type liquid crystal having a storage function.

Herein, the phase-transition type liquid crystal is P-type cholesteric liquid crystal or mixed liquid crystal consisting of P-type cholesteric and P-type nematic liquid crystals.

Figure 23:
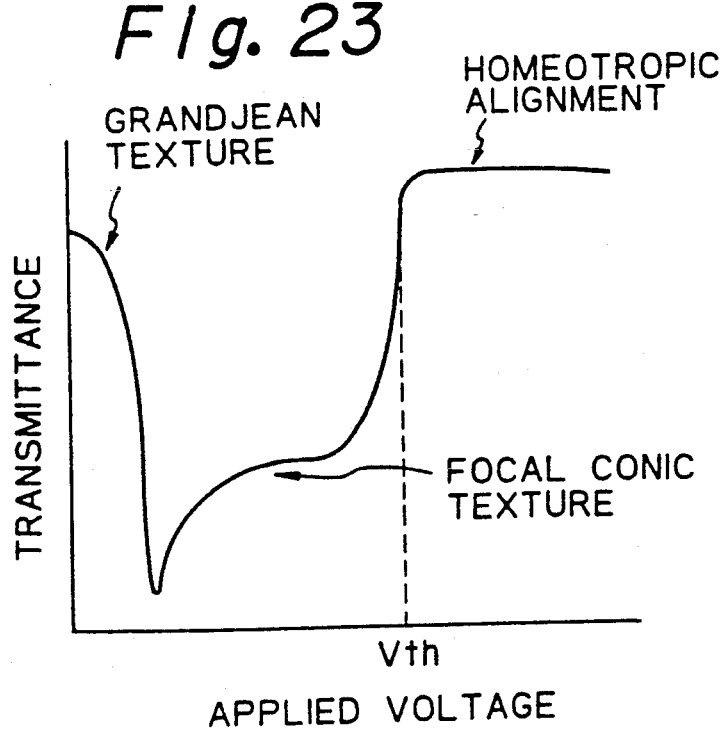
FIG. 23 is a graph showing an electric-optical characteristic of a liquid crystal layer.

FIG. 23 is a graph showing an electric-optical characteristic of this kind of liquid crystal.

As shown in FIG. 23, in an initial state, the cholesteric liquid crystal molecules have spiral axes oriented orthogonally to the electrode (Grandjean texture). In this state, the liquid crystal is transparent.

As a larger voltage is applied to the liquid crystal, the spiral axes aligned in one direction are out of order so that they may be oriented in various directions (focal conic texture). In this state, the birefringence becomes so irregular on the liquid crystal layer that the liquid crystal scatters light. Hence, the liquid crystal enters into the emulsoidal state.

As a far larger voltage is applied to the liquid crystal, the spiral pitch of the cholesteric liquid crystal becomes larger. When the applied voltage rises to a threshold voltage Vth or more (see FIG. 23), the liquid crystal is transited to nematic liquid crystal whose liquid crystal molecules are oriented toward the electric field (homeotropic texture). In the homeotropic texture, the liquid crystal is optically transparent. The applied voltage may be an a.c. voltage or d.c. voltage.

By lowering the applied voltage to 0 V, the liquid crystal is allowed to store information. In the focal conic texture, by lowering the applied voltage to 0 V, the liquid crystal keeps and stores the state. In the homeotropic texture, by abruptly lowering the applied voltage to 0 V, the liquid crystal changes to the Grandjean texture and stores the state, as it still remains transparent.

Next, the description will be directed how to control and activate this type liquid crystal 10h used in the light modulator 10.

Before writing, the liquid crystal 10h stays in the initial state, that is, Grandjean texture. At first, the power source 10i is connected between the electrodes 10c and 10d so that a lower d.c. or a.c. voltage than a threshold voltage Vth can be applied between the electrodes.

Then, an optical image is struck to the photoconductive material 10e composing an image-writing plane. The photoconductive material 10e distributes its resistance depending on the distribution of light intensity. It results in applying to the liquid crystal 10h the electric field distributed depending on how the resistance is distributed in the photoconductive material 10e and changing the orientation of liquid crystal molecules for writing the optical image.

That is, the light-struck part of the photoconductive material 10e lower its resistance so that the voltage is applied to the liquid crystal 10h matched to the light-struck part. The light-struck part of the liquid crystal changes from the Grandjean texture to the focal conic texture. The other part of the photoconductive material 10e keeps the resistance high so that the corresponding part of the liquid crystal remains in the Grandjean texture.

Upon finishing the writing, for storing the written image, it is necessary to cut off the power source 10i and cause short-circuit between the electrodes 10c and 10d.

When writing a digital image, likewise, it is necessary to apply a lower d.c. or a.c. voltage than the threshold voltage Vth between the electrodes 10c and 10d and apply a laser beam to the photoconductive material 10e. The liquid crystal matched to the beam-applied part of the photoconductive material 10e changes the molecular orientation depending on how the light intensity is distributed.

When reading the image from the light modulator 10, it is necessary to apply light to the liquid crystal and capture the scattered light, the reflected light and the transparent light sent from the liquid crystal. The digital reading system applies a laser beam to the liquid crystal and receives the scattered light and the like of the liquid crystal with the photo-detector. The analog reading system applies uniform light to the liquid crystal and image-forms the image represented by the scattered light and the like of the liquid crystal on the recording paper.

When the light modulator 10 uses the mixed liquid crystal having a storage function, no writing is realized if neither of light and voltage are applied to the photoconductive material 10e at a time. It means that the written image is not subject to change if the reading laser beam or uniform light is applied to the photoconductive material 10e. It means that the light-shielding film 10f as illustrated in the structure of FIG. 20 is not an essential component. Hence, the light modulator 10 can be a transparent type having no light-shielding film or a reflective type having a light-shielding film.

The use of the transparent type allows the laser beam to be emitted from one side in both writing and reading the image as shown in FIG. 22. Both the digital writing and reading systems can thus use the almost components of the optical system.

For erasing the overall image written in the light modulator 10, it is necessary to apply a larger d.c. or a.c. voltage than the threshold voltage Vth and apply uniform light to the overall plane of the photoconductive material 10e. It results in transiting the liquid crystal 10h to the nematic liquid crystal having the homeotropic texture. Then, by abruptly lowering the applied voltage to 0 V, the nematic liquid crystal is returned to the Grandjean cholesteric liquid crystal, that is, the initial state.

Next, the description will be directed to how to overwrite an analog image on a digital image or vice versa.

If the subject digital image does not have tone and the colors R, G and B are respectively represented by two values or some, the digital image can be directly overwritten in the analog image or vice versa with the low-frequency voltage being applied to the liquid crystal.

If, on the other hand, the subject digital image has tone, it is necessary to take the steps of writing an analog image, erasing part of the analog image to be overlapped with the digital image, and overwriting the digital image on the analog image.

For partially erasing the analog image, at first, a larger a.c. or d.c. voltage than the threshold voltage Vth is applied between the electrodes 10c and 10d. Secondly, the laser beam with certain light intensity is applied to the proper part of the photoconductive material 10e to be overlapped with the digital image. Thirdly, the radiation of the laser beam is stopped. That is, the beam-applied part of the photoconductive material 10e lowers its resistance so that the voltage is applied only on the part of the liquid crystal matched to the beam-applied part. It results in entering that part into the nematic liquid crystal having the homeotropic texture. With the radiation of the laser beam being stopped, the molecular orientation of that part is returned into the Grandjean texture, that is, the initial state.

Then, with a lower d.c. or a.c. voltage than the threshold voltage Vth being applied between the electrodes 10c and 10d, the laser beam is scanned for writing the digital image on that part.

In partially erasing the analog image, the applied voltage has to be controlled unless the photoconductive material 10e has sufficiently high dark resistance. While the laser beam spot is applied to one point of the photoconductive material 10e, the applied voltage is changed from the threshold voltage Vth or more to 0 V for erasing the image at the point. For reference, the waveforms of the d.c. applied voltage and the a.c. applied voltage are shown in FIGS. 24A and 24B, respectively, in which T denotes a period when a laser beam is applied to one spot. The voltage is applied in synchronism with the scanning of the laser beam.

Next, the description will be directed to how to write an image with a current effect and to erase it with an electric field effect in case the light modulator 10 employs N-type cholesteric liquid crystal or mixture of N-type cholesteric crystal and N-type nematic liquid crystal.

FIGS. 25A to 25D model views illustrating how the liquid crystal works.

As shown in FIG. 25 A, in the initial state, the spiral axes of the cholesteric liquid crystal molecules are oriented orthogonally to an electrode plane (Grandjean texture). In this state, the liquid crystal is transparent.

As a larger a.c. or d.c. voltage is applied to the liquid crystal, the negative ions are moved in the liquid crystal. It results in messing up the spiral axes aligned in one direction and changing the Grandjean texture into the focal conic texture. In this state, the liquid crystal is optically opaque (see FIG. 25B).

This state is stored even if the electric field is removed (see FIG. 25 C).

In erasing the image, as shown in FIG. 25D, it is necessary to apply such a high-frequency (several KHz) voltage as not causing the current effect. It results in orienting the messed molecules in one direction with the electric field effect and returning the focal conic texture into the Grandjean texture.

If this type liquid crystal is used as the liquid crystal 10h of the light modulator 10, it functions in the similar manner as the P-type cholesteric liquid crystal.

Before writing, the liquid crystal 10h stays in the initial state, that is, Grandjean texture. At first, the power source 10i is connected between the electrodes 10c and 10d so that a lower d.c. or a.c. voltage than a threshold voltage Vth can be applied between the electrodes.

Then, an optical image is struck to the photoconductive material 10e composing an image-writing plane. The photoconductive material 10e distributes its resistance depending on the distribution of light intensity. It results in applying to the liquid crystal 10h the electric field distributed depending on how the resistance is distributed in the photoconductive material 10e and changing the orientation of liquid crystal molecules for writing the optical image.

That is, the light-struck part of the photoconductive material 10e lower its resistance so that the voltage is applied to the liquid crystal 10h matched to the light-struck part. The light-struck part of the liquid crystal changes from the Grandjean texture to the focal conic texture. The other part of the photoconductive material 10e keeps the resistance high so that the corresponding part of the liquid crystal remains in the Grandjean texture.

Upon finishing the writing, for storing the written image, it is necessary to cut off the power source 10i and cause short-circuit between the electrodes 10c and 10d.

When writing a digital image, likewise, it is necessary to apply a lower d.c. or a.c. voltage than the threshold voltage Vth between the electrodes 10c and 10d and apply a laser beam to the photoconductive material 10e. The liquid crystal matched to the beam-applied part of the photoconductive material 10e changes the molecular orientation depending on how the light intensity is distributed.

When reading the image from the light modulator 10, it is necessary to apply light to the liquid crystal and capture the scattered light, the reflected light and the transparent light sent from the liquid crystal. The digital reading system applies a laser beam to the liquid crystal and receives the scattered light and the like of the liquid crystal with the photo-detector. The analog reading system applies uniform light to the liquid crystal and image-forms the image represented by the scattered light and the like of the liquid crystal on the recording paper.

In the structure of the light modulator 10, P-type smectic A liquid crystal having a storage function may be used as the liquid crystal 10h. The description will be directed to how the P-type smectic A liquid crystal works.

The smectic liquid crystal includes molecules whose longer axes are aligned in one direction. The gravity center of each molecule is formed to be lamellar, so that the smectic liquid crystal has quite high viscosity. The thickness of the lamellar gravity center is as long as or about twice as long as the length of the molecule.

Negative ions are doped into the P-type smectic A liquid crystal so as to orient the molecules of the smectic liquid crystal orthogonally to the electrode plane (homeotropic texture). In the homeotropic texture, the liquid crystal is optically transparent.

With a d.c. or a.c. voltage being applied to the liquid crystal, the negative ions are moved in the liquid crystal. It results in messing up the spiral axes aligned in one direction. The refraction factor becomes so irregular on the liquid crystal layer that the liquid crystal scatters light (focal conic texture). In the focal conic texture, the liquid crystal is opaque.

The smectic liquid crystal has so high viscosity that the focal conic texture is kept and stored even after the electric field is removed.

For changing the liquid crystal into the focal conic state, it is necessary to apply a larger voltage than the threshold voltage $Vth_{(H-F)}$. $Vth_{(H-F)}$ can be represented by the equation (1) of;

$$Vth_{(H-F)} = 2\pi \cdot K_{11} \cdot d / \{\epsilon_0 \epsilon_\parallel (1 - \delta_\parallel / \delta_\perp) \lambda\} \tag{1}$$

wherein $K_{11}$ denotes an elastic coefficient against splang, d denotes a cell thickness, $\epsilon_\parallel$ and $\delta_\parallel$ denote a dielectric constant and conductance in the parallel direction to the molecules, $\epsilon_\perp$ and $\delta_\perp$ denote a dielectric constant and conductance in the vertical direction to the molecules, and $\epsilon_0$ denotes a vacuum dielectric constant.

The threshold voltage $Vth_{(H-F)}$ depends on a liquid crystal type, a dopant, a temperature and the like. The normal smectic liquid crystal has a value of $Vth_{(H-F)} = 50$ to 80 V.

For realizing the foregoing change in response to a pulse signal of 10 to 80 msec, it is necessary to apply a large voltage, which is three to four times as large as the threshold voltage $Vth_{(H-F)}$.

For returning the liquid crystal from the focal conic texture into the original homeotropic texture, it is necessary to apply such a high-frequency electric field as not attracting the negative ions. The high-frequency electric field is required to be higher than a cut-off frequency. The threshold voltage $Vth_{(F-H)}$ used herein can be represented by the equation of;

$$Vth_{(F-H)} = 2\pi \cdot K_{11} \cdot d / \{\epsilon_0(\epsilon_\parallel - \epsilon_\perp)\lambda\} \quad (2)$$

The normal smectic liquid crystal has a value of $Vth_{(F-H)} = 30$ to 40 V.

Next, the description will be directed to how to control and work the smectic liquid crystal if the light modulator 10 employs it as the liquid crystal 10h shown in FIG. 22.

Before writing, the liquid crystal 10h changes the initial state into the homeotropic texture.

The power source 10i is connected between the electrodes 10c and 10d so that a d.c. voltage or a low-frequency a.c. voltage of about several hundreds Hz is applied between these electrodes. The a.c., voltage is preferable in the light of the life of the liquid crystal.

Then, an optical image is struck to the photoconductive material 10e composing an image-writing plane. The photoconductive material 10e distributes its resistance depending on the distribution of light intensity. It results in applying to the liquid crystal 10h the electric field distributed depending on how the resistance is distributed in the photoconductive material 10e and changing the orientation of liquid crystal molecules for writing the optical image.

That is, the light-struck part of the photoconductive material 10e lower its resistance so that the voltage is applied to the liquid crystal 10h matched to the light-struck part. The light-struck part of the liquid crystal changes from the homeotropic texture to the focal conic texture. The other part of the photoconductive material 10e keeps the resistance high so that the corresponding part of the liquid crystal remains in the homeotropic orientation.

Upon finishing the writing, for storing the written image, it is necessary to cut off the power source 10i and cause short-circuit between the electrodes 10c and 10d.

When writing a digital image, likewise, it is necessary to apply a lower d.c. or a.c. voltage than the threshold voltage Vth between the electrodes 10c and 10d and apply. laser beam to the photoconductive material 10e. The liquid crystal matched to the beam-applied part of the photoconductive material 10e changes the molecular orientation depending on how the light intensity is distributed.

When reading the image from the light modulator 10, it is necessary to apply light to the liquid crystal and capture the scattered light, the reflected light and the transparent light sent from the liquid crystal. The digital reading system applies a laser beam to the liquid crystal and receives the scattered light and the like of the liquid crystal with the photo-detector. The analog reading system applies uniform light to the liquid crystal and image-forms the image represented by the scattered light and the like of the liquid crystal on the recording paper.

When the light modulator 10 uses the mixed liquid crystal having a storage function, no writing is realized if neither of light and voltage are applied to the photoconductive material 10e at a time. It means that the written image is not subject to change if the reading laser beam or uniform light is applied to the photoconductive material 10e. It means that the light-shielding film 10f as illustrated in the structure of FIG. 20 is not an essential component. Hence, the light modulator 10 can be a transparent type having no light-shielding film or a reflective type having a light-shielding film.

The use of the transparent type allows the laser beam to be emitted from one side in both writing and reading the image as shown in FIG. 4. Both the digital writing and reading systems can thus use the almost components of the optical system.

For erasing the overall image written in the light modulator 10, it is necessary to apply a larger high-frequency a.c. voltage than the cut-off frequency between the electrodes 10c and 10d and apply uniform light to the overall plane of the photoconductive material 10e. It results in changing the liquid crystal 10h from the focal conic texture to the homeotropic texture.

Next, the description will be directed to how to overwrite an analog image on a digital image or vice versa.

If the subject digital image does not have gradation and the colors R, G and B are respectively represented by two values or some, the digital image can be directly overwritten in the analog image or vice versa with the low-frequency voltage being applied to the liquid crystal.

If, on the other hand, the subject digital image has gradation, it is necessary to take the steps of writing an analog image, erasing part of the analog image to be overlapped with the digital image, and overwriting the digital image on the analog image.

For partially erasing the analog image, with a larger a.c. high-frequency voltage than the cut-off frequency being applied between the electrodes 10c and 10d, the laser beam with certain light intensity is applied to the proper part of the photoconductive material 10e to be overlapped with the digital image and is scanned in two dimensions. It results in lowering the resistance of the laser-beam-applied part of the photoconductive material 10e and applying a high-frequency voltage only on that part, thereby returning that part into the homeotropic texture.

Then, with a d.c. voltage or a low-frequency a.c. voltage of about several hundreds Hz being applied between the electrodes 10c and 10d, the laser beam is scanned on that part for writing a digital image.

Figure 26:
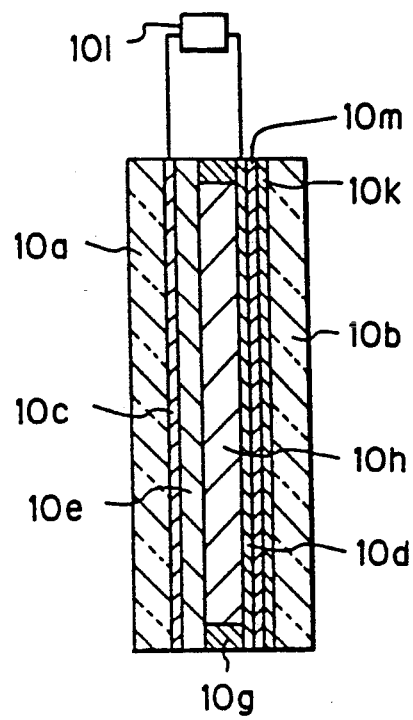
FIG. 26 is a section showing the other construction of the light modulator used in the foregoing embodiments.

Next, the description will be directed to another construction of the light modulator 10 with reference to FIG. 26.

As shown, 10a and 10b denote glass plates located on both ends of the modulating element 10. 10c and 10d denote transparent electrodes, which are preferably made of an Indium-Tin-Oxide (ITO) film. These electrodes are respectively laminated on the inner surfaces of the glass plates 10a and 10b. A photoconductive material 10e is laminated on the inner side of the electrode 10c. A film heater 10k and an insulating film 10m are serially laminated on the inner side of the other glass plate 10b. On the inside of the insulating film 10m is laminated the electrode 10d.

Between the electrode 10d and the photoconductive material 10e is inserted a spacer 10g. The space defined by the electrode 10d, the photoconductive material 10e and the spacer 10g contains liquid crystal 10h sealed therein. The electrodes 10c and 10d are connected to a power source 10i.

The photoconductive material 10e, and the glass plates 10a and 10b have been already described with respect to the structure shown in FIG. 20. Hence, the description will be directed to the film heater 10k and the liquid crystal 10h which characterize this structure shown in FIG. 26.

For composing a transparent-type light modulator, it is necessary to employ an ITO film or the like for the film heater 10k. The insulating film 10m uses a transparent film made of silicon oxide (SiO$_2$), silicon nitride (Si$_3$N$_4$), aluminium oxide (Al$_2$O$_3$), and the like.

And, the liquid crystal 10h employs ferroelectric liquid crystal having a storage function.

The ferroelectric liquid crystal, in general, has a quite quick response characteristic (for example, at the level of μsec), because spontaneous polarization Ps utilizes torque PsE effected by the electric field E.

The ferroelectric liquid crystal is made of chiral smectic C liquid crystal (SmC*), mixed liquid crystal consisting of chiral smectic C liquid crystal and non-chiral smectic C liquid crystal (SmC), or mixed liquid crystal consisting of chiral smectic C liquid crystal and an optical active material.

The chiral smectic C liquid crystal consists of layer-structured molecules. Each molecule has a longer axis tilted by a certain angle against a perpendicular of the layer. In a bulking state, the longer axis of each molecule is spirally rotated as keeping the tilt angle stable.

Then, the liquid crystal having thick cells will be described.

The ferroelectric liquid crystal is homogeneously oriented so that it can have a relatively large cell thickness of about 10 μm or more when it is inserted between the electrodes. By applying a pulsewise voltage between the electrodes, the liquid crystal is changed from an opaque state to a transparent state, because the applied field effect breaks down the spiral texture of the molecules, thereby enlarging the form of a domain. As the domain is getting larger, the scattered light is getting smaller.

In this state, the electric-optical characteristic indicates a relatively smooth curve enough to use its middle value.

By selecting the liquid crystal with slightly higher viscosity, the liquid crystal can obtain a storage function, though, the liquid crystal lowers its response as the viscosity becomes higher. By applying a high-frequency voltage between the electrodes, the stored information can be erased, because the high-frequency voltage effects to return the liquid crystal into the original spiral molecular texture.

It will be apparent from the above description that the use of a thick cell makes it possible to compose the light modulator which can represent gradation on an image as keeping the storage function. In this case, it is unnecessary to provide the film heater 10k and the insulating film 10m shown in FIG. 26.

The light modulator employing thick liquid crystal cells can be controlled below.

For writing an image on the light modulator 10, it is necessary to take the following steps.

At a first step, a plane image light is projected onto the photoconductive material 10e composing an image-written plane or the intensity-modulated laser beam is applied to the photoconductive material 10e so that the resistance is distributed in the photoconductive material 10e according to how the light intensity is distributed. It results in lowering the resistance on the light-applied part of the photoconductive material 10e and keeping the high resistance on the other part.

At a second step, a pulsewise voltage is applied between the electrodes 10c and 10d. It results in applying to the liquid crystal 10h the voltage distributed depending on how the light intensity is distributed. Hence, the transparent state of the liquid crystal 10h changes on the distribution of the applied voltage so that the optical image written in the liquid crystal 10h can be stored.

For reading the image out of the light modulator 10, uniform light is applied to the overall plane of the light modulator 10, thereby obtaining scattered light or reflected light modulated depending on the information written in each spot. The obtained light is image-formed through the effect of the lens so as to form an analog image, which is the image read out of the light modulator 10. Further, by emitting a laser beam spot, likewise, the information at the spot-applied spot can be read out.

For erasing the overall image written in the light modulator 10, with the high-frequency a.c. voltage being applied between the electrodes 10c and 10d, it is necessary to apply uniform light onto the overall plane of the photoconductive material 10e.

For partially erasing the image written in the light modulator 10, with the high-frequency a.c. voltage being applied between the electrodes 10c and 10d, a laser beam with certain light intensity is applied to the to-be-erased part of the photoconductive material 10e and scanned on the part in two dimensions.

Next, the liquid crystal having thin cells will be described.

By providing the ferroelectric liquid crystal having quite thin cells between the electrodes, the liquid crystal provides a storage function and operates in a bistable manner.

SmC* liquid crystal is homogeneously oriented so that it can have a relatively large cell thickness of 5 μm or less (normally, 3 μm or less) when it is inserted between the electrodes. It results in the effect of the planar orientation disallows the spiral structure to be realized. The tilt angles of the molecular longer axis take only two titlt angles $(+\theta, -\theta)$.

By applying a d.c. electric field to the cells, the spontaneous polarization Ps of the liquid crystal matches to the orientation of the electric field +E, thereby orienting all the liquid-crystal molecules in the $+\theta$ direction. By applying the electric field $-E$, all the liquid crystal molecules are oriented in the $-\theta$ direction. That is, by switching the polarity of the electric field, the liquid-crystal molecules are allowed to be oriented in the $+\theta$ or $-\theta$ direction, thereby allowing the liquid crystal to function in a bistable manner. After removing the electric field, the molecular orientation does not change through the effect of the planar orientation, which brings about the storage function.

The thin cells are expected to apply to a large display element.

For applying the thin cells to the light modulator, it is necessary to represent mesophase. That is, an important point is how to represent the mesophase as keeping the storage function.

Figure 27:
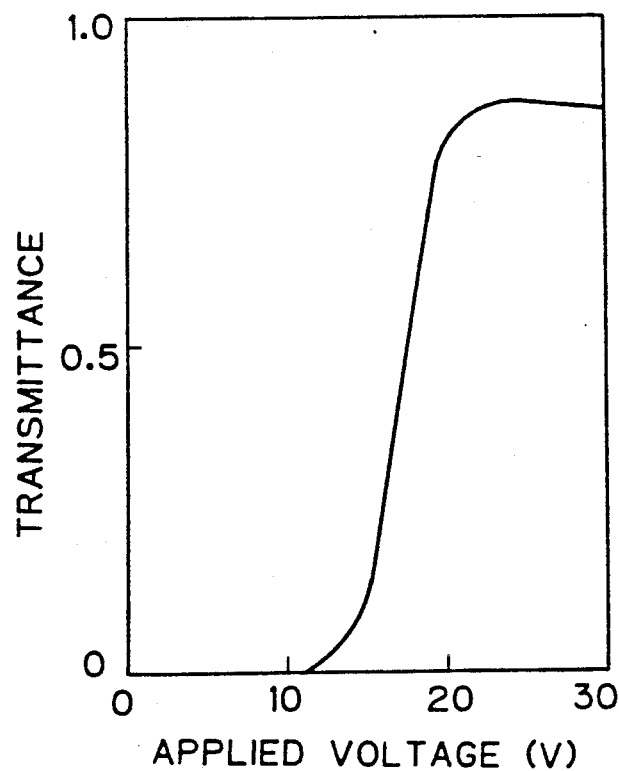
FIG. 27 is a graph showing an electric-optical characteristic of the ferroelectric liquid crystal used in the light modulator.

FIG. 27 shows an electric-optical characteristic of the ferroelectric liquid crystal composed of the thin cells.

As shown, the curve is so sharp that the liquid crystal functions bistably. Then, the description will be directed to how the ferroelectric liquid crystal having the electro-optical characteristic represents mesophase with area gradation by controlling a threshold voltage.

The threshold voltage depends on the torque PsE and the viscosity of the SmC* liquid crystal. As the viscosity becomes smaller, the liquid-crystal molecules moves more easily, thereby reducing the threshold voltage. As the spontaneous polarization Ps becomes larger, the liquid-crystal molecules have more driving force, thereby flipping the liquid-crystal molecules with a small threshold voltage.

Of some liquid-crystal materials, the spontaneous polarization Ps depends on its temperature. With those liquid-crystal materials, therefore, the threshold voltage can be changed by forming a temperature gradient.

To represent area tone, the temperature is distributed in a matrix manner so as to distribute the threshold voltage in the liquid-crystal cells. This is effected by the film heater 10k.

Figure 28:
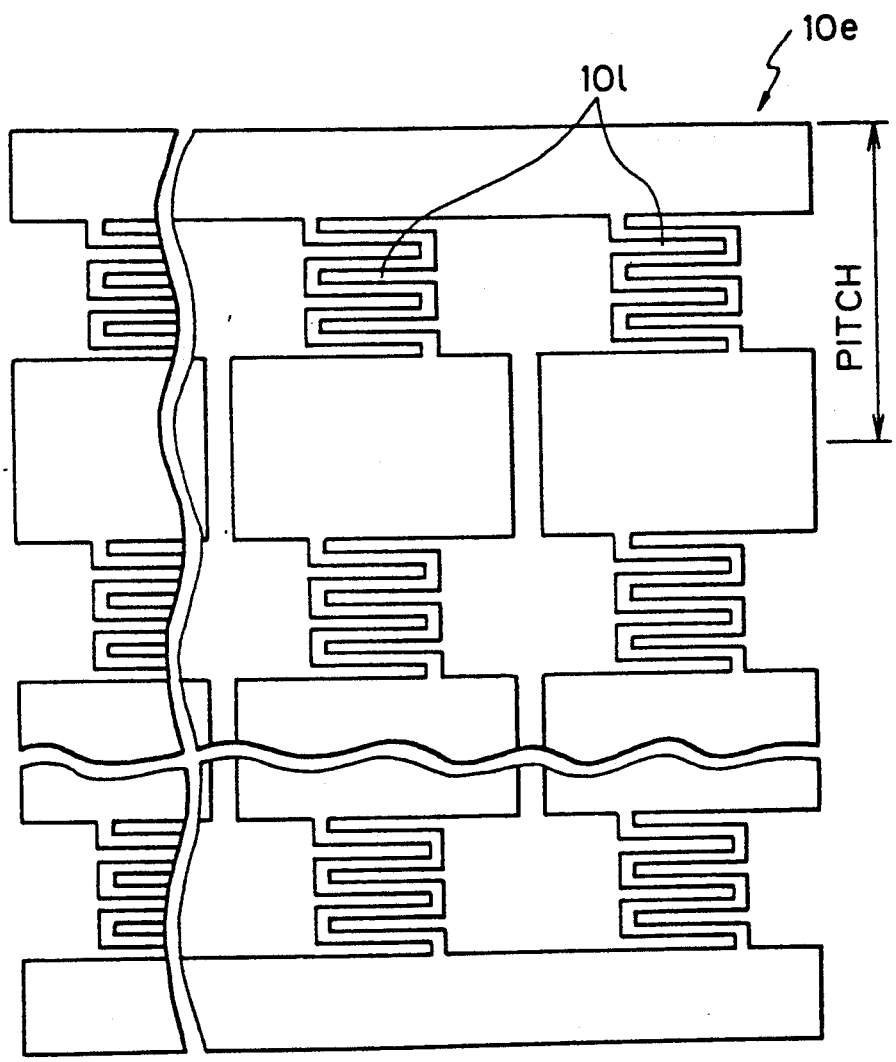
FIG. 28 is a plane view showing a film heater used in the light modulator.

As shown in FIG. 28, the film heater 10k is composed of a plurality of micro-heaters 10l ranged in lines. Each micro-heater 10l matches to one pixel, the pitch of which should be smaller, because it is effected on resolution. It is preferable that the diameter of each micro-heater 10l is 10 μm or less and the pitch is 20 μm or less.

As mentioned above, the liquid crystal can have the temperature distributed in matrix fashion through the effect of the film heater 10k. The liquid crystal can have the threshold distributed depending on how the temperature level is distributed. It results in changing the area on which the liquid-crystal molecules are flipped depending on the voltage applied on both sides of the liquid crystal.

The film heater 10k is connected to a power source (not shown) so that the current can pass through the film heater 10k.

The light modulator having thin liquid-crystal cells will be controlled as follows.

For writing the image on the light modulator 10, a planar image light is projected on the photoconductive material 10e composing the image-writing plane. As a result, the photoconductive material 10e has the resistance distributed depending on how the light intensity is distributed. That is, the photoconductive material 10e lowers the resistance on the light-applied part and keeps the high resistance on the other part.

In that state, a d.c. voltage may be applied, but the pulsewise voltage is preferable in the light of the life of the liquid crystal. The voltage +V is required for flipping the liquid-crystal molecules matched to the light-applied part of the photoconductive material 10e.

With the voltage +V, the liquid-crystal molecules are flipped depending on how the resistance is distributed in the photoconductive material 10e and how the temperature is distributed in the liquid-crystal cells. In general, the liquid-crystal flipping is large on the part on which the light radiation is strong, while it is small on the part on which the light radiation is weak. This is how the optical image is written in the liquid crystal 10h and stored thereon.

For writing an image with a laser beam, likewise, with the pulsewise voltage +V being applied between the electrodes 10c and 10d, the intensity-modulated laser beam is applied to the photoconductive material 10e for writing information on one pixel. It is scanned in two dimensions for writing an image on the photoconductive material 10e. Since area gradation is used, one pixel is required to match to the pitch of the micro-heaters: 10l and the intensity of the laser beam spot.

The description will be directed to how to read the image out of the light modulator 10.

The reading method basically includes the steps of flipping the orientation of the liquid-crystal molecules and changing the polarizing state. Hence, the method requires a polarizer and an analyzer (not shown).

The light is linearly-polarized through the polarizer. Without voltage being applied between the electrodes 10c and 10d, the linearly-polarized light is applied to the overall plane of the light modulator 10. The reflected light or the scattered light is converted into light-intensity variation through the analyzer, resulting in achieving the image reading. The polarizer serves to polarize light orthogonally and the analyzer does parallelly.

The storage function of the liquid crystal 10h makes it possible to keep the written image if the reading light is applied to the photoconductive material 10e.

The polarized light is applied to the overall plane of the light modulator 10 so that the scattered light or the reflected light modulated according to the information written in each point can be obtained. The light is passed through the analyzer and is image-formed through the lens, thereby reading the analog image out of the light modulator 10. Likewise, the laser beam spot is allowed to be emitted for reading the information on each pixel.

In case the light modulator 10 uses the liquid crystal having a storage function, no writing is realized if neither of light and voltage are applied to the photoconductive material 10e at a time. It means that the written image is not subject to change if the reading laser beam or uniform light is applied to the photoconductive material 10e. It means that the light-shielding film 10f as illustrated in the structure of FIG. 20 is not an essential component. Hence, the light modulator 10 can be a transparent type having no light-shielding film or a reflective type having a light-shielding film.

The use of the transparent type allows the laser beam to be emitted from one side in both writing and reading the image as shown in FIG. 4. Both the digital writing and reading systems can thus use the almost components of the optical system.

For erasing the overall image written in the light modulator 10, with the pulsewise voltage −V being applied between the electrodes 10c and 10d, it is necessary to apply uniform light with relatively strong light intensity to the overall plane of the photoconductive material 10e. It results in allowing all the liquid-crystal molecules to be oriented in the −θ 8 direction. The voltage −V is large enough to flip the liquid-crystal molecules.

For partially erasing the image written in the light modulator 10, with the pulsewise voltage −V being applied between the electrodes 10c and 10d, the laser beam with relatively strong light intensity is applied to the to-be-erased part of the photoconductive material 10e and is scanned in two dimensions.

Next, the description will be directed to how to overwrite an analogously-written image on a digitally-written image.

If the subject digital image does not have tone and the colors R, G and B are respectively represented by two values or some (8 colors), the digital image can be directly overwritten in the analog image or vice versa.

If, on the other hand, the subject digital image has gradation, at first, it is necessary to take the steps of writing an analog image and erasing part of the analog image to be overlapped with the digital image. The partial erasing is required for returning the part to be overlapped with the digital image into an initial state before writing the digital image.

The method for partially erasing the analog image allows the liquid-crystal molecules to which the laser beam is applied to be oriented in the $-\theta$ direction for returning those molecules into the initial state.

Then, likewise, with the pulsewise voltage $+V$ being applied between the electrodes 10c and 10d, the laser beam with modulated intensity is applied to the liquid-crystal molecules and is scanned one pixel by one pixel.

In the light modulator shown in FIG. 20, the liquid crystal 10h may use dynamic-scattering liquid crystal having a storage function. Hereinafter, the description will be directed to the writing and reading operations of the light modulator using the dynamic-scattering type crystal.

With a d.c. voltage or a low-frequency a.c. voltage of about 100 Hz being applied to the dynamic-scattering liquid crystal the liquid crystal brings about dynamic scattering so that it enters into an emulsoidal state. After stopping the application of the voltage, the liquid crystal keeps the emulsoidal state. For erasing the image stored therein, it is necessary to apply a voltage having a higher frequency than the cut-off frequency (about 700 Hz) and uniformly emit relatively strong light. This phenomenon is applied to the light modulator.

For writing an image on the light modulator 10, with a d.c. voltage or a low-frequency a.c. voltage of about 100 Hz being applied between the electrodes 10c and 10d, a plane image light is projected onto the photoconductive material 10e composing an image-written plane or the intensity-modulated laser beam is applied into the photoconductive material 10e so that the resistance is distributed in the photoconductive material 10e according to how the light intensity is distributed. It results in lowering the resistance on the light-applied part of the photoconductive material 10e and keeping the high resistance on the other part. Hence, the voltage depending on how the light intensity is distributed is applied to the liquid crystal 10h so that the voltage-applied part of the liquid crystal 10h is subject to a scattering phenomenon.

For reading the image out of the light modulator 10, with uniform light being applied to the overall plane of the element 10, the scattering light or reflected light is provided which is modulated depending on the information written in each point. The light is image-formed as the image through the lens. Alternatively, by emitting a spot beam such as a laser beam, the pixel information at each spot is allowed to be read.

For erasing the overall image written in the light modulator 10, with a high-frequency a.c..voltage being applied between the electrodes 10c and 10d, it is necessary to uniformly apply the relatively strong light on the overall plane of the photoconductive material 10e.

For partially erasing the image written in the light modulator 10, with a high-frequency a.c. voltage being applied between the electrodes 10c and 10d, it is necessary to uniformly apply the laser beam with constant light intensity to the to-be-erased part of the photoconductive material 10e. The partial erasing method is essential to overwriting a digital image having color gradation on an analog image.

In case the light modulator 10 uses the liquid crystal having a storage function, no writing is realized if neither of light and voltage are applied to the photoconductive material 10e at a time. It means that the written image is not subject to change if the reading laser beam or uniform light is applied to the photoconductive material 10e. It means that the lights shielding film 10f as illustrated in the structure of FIG. 4 is not an essential component. Hence, the light modulator 10 can be a transparent type having no light-shielding film or a reflective type having a light-shielding film.

The use of the transparent type allows the laser beam to be emitted from one side in both writing and reading the image as shown in FIG. 4. Both the digital writing and reading systems can thus use the almost components of the optical system.

FIG. 29 is a flowchart schematically showing part of control program run in a computer provided in the control section 17 shown in FIG. 1. The program is run for executing the process of a color image edition, input and output mode. When the mode is indicated, the computer starts to execute the following process.

At a step S1, the process initializes a flag n for switching R, G and B to n←0. At a step S2, n=0 is checked.

If n=0, the process goes to a step S3 at which the R light source 11a of the analog writing system 11 is lit. The uniform light emitted by the R light source 11a forms an optical image of the original 18. Then, at a step S4, the optical image is written in the light modulator 10 through the lens 11d.

If n≠0 at the step S2, the process goes to a step S5 at which n=1 is checked. If n=1, at a step S6, the G light source 11b is lit for emitting uniform light to form an optical image of the original 18. At the step S4, the optical image is written in the light modulator 10 through the lens 11d. If n≠0, at a step S7, the B light source 11c is lit for emitting uniform light to form an optical image of the subject copy 18. At the step S4, the optical image is written in the light modulator 10 through the lens 11d.

At a step S8, the digital reading system 13 starts to work. The laser beam source 13a applies a laser beam to the light modulator 10 and is scanned on the element 10 in two dimensions. Then, the transparent light, the reflected light or the scattered light is applied to the photo-detector 13d so that the image information written in the light modulator 10 is read out.

Proceeding to a step S9, the processing section 15 starts to perform various processings over the read image information.

At a step S10, the digital writing system 14 starts to work. In the system 14, a signal sent from the processing section 15 is applied into the laser modulating circuit 14c in which the signal is modulated. Then, the modulated laser bee is scanned on the light modulator 10 in two dimensions so that the image is written in the element 10. The digital image may be written in the overall or partial plane of the light modulator 10. It results in being able to obtain an image on which the analog image and the digital image are mixed and melt.

At a step S11, the process determines whether or not all the image processing is finished in the processing section 15. If not, the routine at the steps S8 to S10 is executed.

Proceeding to a step S12, n=0 is checked. If n=0, the process goes to a step S13 at which the R light source 12a of the analog reading system 12 is lit. Then, at a step S14, the image information written in the light modulator 10 is read out by the uniform light emitted from the R light source 12a. The read optical image is exposed to the recording paper 19 through the lens 12d.

If, at the step S12, n≠0, the process goes to a step S15 at which n=1 is checked. If n=1, at a step S16, the G light source 12b is lit. Then, at the step S14, the image information written in the light modulator 10 is read out by the uniform light emitted from the G light source 12b. The read optical image is exposed to the recording paper 19 through the lens 12d. If n≠1, at a step S17, the B light source 12c is lit. Then, at the step S14, the image information written in the light modulator 10 is read out by the uniform light read from the B light source 12c. Then, the read optical image is exposed to the recording paper 19 through the lens 12d.

Proceeding to a step S18, n is incremented as n←n+1. Next, at a step S19, n=3 is checked. If n=3, all the color processings of R, G and B are determined to be finished. Then, the program terminates. If n≠3, the process returns to the step S2 from which the foregoing routine is repeated.

If the color image editing mode is indicated, the computer repetitively executes only the routine from the steps S8 to S11 with respect to the colors of R, G and B.

If an image scanner mode is indicated, the computer repetitively executes only the routine from the steps S1 to S8 with respect to the colors of R, G and B until n=3 is reached.

If a printer mode is indicated, the program executes the step S20 at first so that the image information is input from the control section 17 or the other external device to the program. Then, the program repetitively executes the routine of the step S10 or later with respect to the colors of R, G and B.

If an analog copying mode is indicated, the program shown in FIG. 5 is allowed to constantly jump from the step S4 to the step S12 in executing the routine.

The present embodiment is designed to select analog processing or digital processing according to an image type. Concretely, the line-based or character-based image is suitable to the analog copying mode and the analog processing under which smoother lines can be reproduced. The color-stressed image is suitable to the color image edition, input and output mode and the analog processing under which color is more properly reproduced by correcting color.

On the other hand, the image separation is suitable to the combination of the digital processing and the color image edition, input and output mode under which the image is partially erased for separating the image more easily. Further, the digital processing makes it possible to obtain an image on which an analog image and a digital image are mixed and melt, though the analog processing cannot practically synthesize more than one image.

As mentioned above, by indicating the color image edition, input and output mode or the color image edition mode, it is possible to carry out the digital processings such as tone processing (gamma correction, shading correction), sharpness, area specification (trimming, masking), color processing (color reproduction, painting, color cutting), movement (rotation), edition (image-embedded synthesizing, character synthesizing), and the like.

When reading an image from the light modulator, the digital processing is capable of lowering resolution in a stepwise manner by gradually widening the scanning intervals or the sampling intervals of the photo-detector. And, for obtaining a zoomed image, the digital processing is capable of narrowing the scanning intervals more than the normal ones and returning the image intervals into the normal ones when displaying the image. By increasing the area of the light modulator, it is possible to keep the quality of the zoomed image. The zooming function is made possible without moving the graphic material or the optical lens.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image processing apparatus comprising:
    a liquid modulator having a photoconductive material including an image-writing plane, a liquid crystal layer laminated on said photoconductive material, a pair of electrodes sandwiching said photoconductive material and said liquid crystal layer, and a spacer inserted between said photoconductive material and one of said electrodes surrounding said liquid crystal layer;
    an analog writing system for analogously writing an original image in said liquid modulator;
    a digital reading system for digitally reading the image written in said liquid modulator by emitting a laser beam for scanning said light modulator in two dimensions;
    a processing section for image-processing the read image data;
    a digital writing system for digitally writing processed image data in said light modulator by applying said laser beam for scanning on said light modulator in two dimensions; and
    an analog reading system for analogously reading an image written in said light modulator,
    wherein said liquid crystal layer comprises a liquid crystal which is selected from a group consisting of:
        (1) a phase-transition type liquid crystal providing a storage function,
        (2) a p-type smectic A liquid crystal providing a storage function, and
        (3) a ferroelectric liquid crystal providing a storage function;
    wherein the phase-transition type liquid crystal is selected from a group consisting of:
        a p-type cholesteric liquid crystal,
        a mixture of p-type cholesteric liquid crystal and p-type nematic liquid crystal, and
    wherein the ferroelectric liquid crystal is selected from a group consisting of:
        a chiral smectic C liquid crystal,
        a mixture of chiral smectic C liquid crystal and non-chiral smectic C liquid crystal, and
        a mixture of chiral smectic C liquid crystal and a photoactive material.

2. An apparatus according to claim 1, wherein said apparatus further comprises means for variably controlling a scanning density of said laser beam to a desired value and means for adjusting a beam spot diameter of said laser beam according to said scanning density controlled by said means for variably controlling a scanning density of said laser beam to a desired value.

3. An apparatus according to claim 1, wherein said apparatus further comprises means for sensing brightness of an image written on said light modulator by said analog writing system and means for adjusting input sensitivity of said light modulator.

4. An apparatus according to claim 1, wherein said light modulator includes a film heater consisting of a plurality of micro-heaters ranged in a pattern, said film heater serving to apply temperature distributed in a matrix to said liquid crystal layer.

5. An apparatus according to claim 1, wherein at least one of said electrodes are divided into a plurality of areas to be independently driven.

6. An apparatus according to claim 1, wherein said apparatus further comprises a plurality of light modulators, and an original image is decomposed into a plurality of color-component images and said color-component images are analogously and digitally written in or read our of said light modulators.

7. An apparatus according to claim 1, wherein said light modulator is divided into a plurality of regions and said analog writing system for decomposing an original image is decomposed into a plurality of color-component images and said color-component images are analogously and digitally written in or read out of said regions.

8. An apparatus according to claim 6, wherein a dichroic mirror is used for decomposing said original image into of said color-component images.

* * * * *